(12) United States Patent
Doucette et al.

(10) Patent No.: US 11,188,841 B2
(45) Date of Patent: Nov. 30, 2021

(54) PERSONALIZED CONTENT DISTRIBUTION

(71) Applicant: Pearson Education, Inc., New York, NY (US)

(72) Inventors: Alison Doucette, Stow, MA (US);
Victoria Kortan, Centennial, CO (US);
Daniel Ensign, Fort Lupton, CO (US);
Mark Potter, Pittsburgh, PA (US);
Chadwick Reimers, Larkspur, CO (US); Brian Moriarty, Fort Lee, NJ (US)

(73) Assignee: PEARSON EDUCATION, INC., Bloomington, MN (US)

( * ) Notice: Subject to any disclaimer, the term of this patent is extended or adjusted under 35 U.S.C. 154(b) by 0 days.

(21) Appl. No.: 16/120,068

(22) Filed: Aug. 31, 2018

(65) Prior Publication Data

US 2018/0373994 A1 Dec. 27, 2018

Related U.S. Application Data

(63) Continuation-in-part of application No. 15/442,325, filed on Feb. 24, 2017, now Pat. No. 10,949,763.
(Continued)

(51) Int. Cl.
*G06F 15/16* (2006.01)
*G06N 7/08* (2006.01)
(Continued)

(52) U.S. Cl.
CPC .............. *G06N 7/08* (2013.01); *G06F 16/35* (2019.01); *G06F 16/9535* (2019.01);
(Continued)

(58) Field of Classification Search
CPC .. G06F 16/35; G06F 16/9535; G06F 17/2705; G06F 17/2775; G06N 7/08; G06N 7/005; G06K 9/6282
(Continued)

(56) References Cited

U.S. PATENT DOCUMENTS 6,202,062 B1 3/2001 Cameron et al.
7,212,985 B2 5/2007 Sciuk
(Continued)

FOREIGN PATENT DOCUMENTS

WO 2009/149262 A1 12/2009

OTHER PUBLICATIONS

Mobasher, Bamshad, Honghua Dai, Tao Luo, Yuqing Sun, and Jiang Zhu. "Integrating web usage and content mining for more effective personalization." In International Conference on Electronic Commerce and Web Technologies, pp. 165-176. Springer, Berlin, Heidelberg, 2000.
(Continued)

*Primary Examiner* — Liang Che A Wang
(74) *Attorney, Agent, or Firm* — Quarles & Brady LLP

(57) ABSTRACT

Systems and methods for content provisioning are disclosed herein. The method includes receiving content corresponding to at least one source document, parsing the content, identifying segments from the parsed content, generating a networked grouping of the segments, receiving historical user information about a plurality of users, training a model by using the historical user information, receiving activities of a user, parsing the activities of the user, identifying components from the parsed activities, correlating the components with the segments, extracting features from the activities of the user based on the correlation, and using the trained model to estimate a mastery level of the user based on the features.

20 Claims, 20 Drawing Sheets

Related U.S. Application Data

(60) Provisional application No. 62/320,213, filed on Apr. 8, 2016.

(51) Int. Cl.

| | | |
|---|---|---|
| *G06K 9/62* | (2006.01) | |
| *G06N 7/00* | (2006.01) | |
| *G06F 16/35* | (2019.01) | |
| *G06F 16/9535* | (2019.01) | |
| *G06Q 10/10* | (2012.01) | |
| *G06N 5/00* | (2006.01) | |
| *G06N 5/04* | (2006.01) | |
| *G06N 20/20* | (2019.01) | |
| *G06F 40/131* | (2020.01) | |
| *G06F 40/137* | (2020.01) | |
| *G06F 40/205* | (2020.01) | |
| *G06F 40/289* | (2020.01) | |
| *G06N 3/02* | (2006.01) | |
| *G06N 5/02* | (2006.01) | |

(52) U.S. Cl.
CPC .......... *G06F 40/131* (2020.01); *G06F 40/137* (2020.01); *G06F 40/205* (2020.01); *G06F 40/289* (2020.01); *G06K 9/6282* (2013.01); *G06N 5/003* (2013.01); *G06N 5/046* (2013.01); *G06N 7/005* (2013.01); *G06N 20/20* (2019.01); *G06Q 10/1097* (2013.01); *G06N 3/02* (2013.01); *G06N 5/022* (2013.01); *G06N 5/045* (2013.01)

(58) Field of Classification Search
USPC .......................................... 709/201–203, 217
See application file for complete search history.

(56) References Cited

U.S. PATENT DOCUMENTS

| | | |
|---|---|---|
| 7,828,552 B2 | 11/2010 | Shute |
| 7,885,844 B1 | 2/2011 | Cohen |
| 8,200,527 B1 | 6/2012 | Thompson |
| 8,249,868 B2 | 8/2012 | Lloyd |
| 8,550,822 B2 | 10/2013 | Templin |
| 8,666,740 B2 | 3/2014 | Lloyd |
| 2002/0168621 A1 | 11/2002 | Cook et al. |
| 2002/0184020 A1 | 12/2002 | Shinoda |
| 2003/0124493 A1 | 7/2003 | Kulack |
| 2005/0234763 A1 | 10/2005 | Pinto |
| 2005/0267770 A1 | 12/2005 | Banavar et al. |
| 2006/0010217 A1 | 1/2006 | Sood |
| 2006/0040247 A1 | 2/2006 | Templin |
| 2006/0117077 A1 | 6/2006 | Kiiveri |
| 2006/0156307 A1 | 7/2006 | Kunjithapatham et al. |
| 2006/0204040 A1 | 9/2006 | Freeman |
| 2006/0212386 A1 | 9/2006 | Willey |
| 2006/0286533 A1 | 12/2006 | Hansen |
| 2007/0172808 A1 | 7/2007 | Capone |
| 2007/0180119 A1 | 8/2007 | Khivesara et al. |
| 2008/0015793 A1 | 1/2008 | Ben-Menahem |
| 2008/0319829 A1 | 12/2008 | Hunt |
| 2009/0037398 A1 | 2/2009 | Horvitz |
| 2009/0204471 A1 | 8/2009 | Elenbaas |
| 2009/0268830 A1 | 10/2009 | Birru |
| 2009/0276233 A1 | 11/2009 | Brimhall |
| 2010/0010878 A1 | 1/2010 | Pinto |
| 2010/0120422 A1 | 5/2010 | Cheung |
| 2010/0190142 A1 | 7/2010 | Gal |
| 2012/0072845 A1 | 3/2012 | John et al. |
| 2012/0265783 A1 | 10/2012 | Kenedy |
| 2012/0278274 A1 | 11/2012 | Agrawal et al. |
| 2013/0073343 A1 | 3/2013 | Richardson et al. |
| 2013/0163837 A1 | 6/2013 | Zabair |
| 2013/0204652 A1 | 8/2013 | Marins et al. |
| 2013/0226839 A1 | 8/2013 | Archambeau |
| 2013/0266925 A1 | 10/2013 | Nunamaker, Jr. |
| 2013/0288222 A1 | 10/2013 | Stacy |
| 2014/0006342 A1* | 1/2014 | Love ...................... G06F 16/23 707/609 |
| 2014/0141888 A1 | 5/2014 | Pavlish |
| 2014/0157371 A1 | 6/2014 | Le Chevalier |
| 2014/0272901 A1 | 9/2014 | Abdelkrim et al. |
| 2014/0342320 A1* | 11/2014 | Nielson ................... G09B 7/08 434/156 |
| 2015/0147740 A1 | 5/2015 | Barnhart |
| 2015/0147741 A1 | 5/2015 | Spagnola |
| 2015/0206441 A1 | 7/2015 | Brown |
| 2015/0242978 A1 | 8/2015 | Zaslavsky et al. |
| 2015/0269941 A1 | 9/2015 | Jones |
| 2015/0316383 A1 | 11/2015 | Donikian |
| 2015/0317582 A1 | 11/2015 | Nath |
| 2015/0332372 A1 | 11/2015 | Hariri |
| 2015/0347508 A1 | 12/2015 | Lang |
| 2015/0356420 A1 | 12/2015 | Byron |
| 2016/0034993 A1 | 2/2016 | Rodriguez |
| 2016/0124999 A1 | 5/2016 | Brenes et al. |
| 2016/0127010 A1 | 5/2016 | Rho et al. |
| 2016/0127244 A1 | 5/2016 | Brenes et al. |
| 2016/0127248 A1 | 5/2016 | Brenes et al. |
| 2016/0132213 A1 | 5/2016 | Binotto et al. |
| 2016/0180248 A1* | 6/2016 | Regan ..................... G09B 5/00 706/12 |

OTHER PUBLICATIONS

Jyoti Bawane & J. Michael Spector (2009) Prioritization of online instructor roles: implications for competency-based teachereducation programs, Distance Education, 30:3, 383-397, DOI: 10.1080/01587910903236536 (Year: 2009).

* cited by examiner

PERSONALIZED CONTENT DISTRIBUTION

CROSS-REFERENCES TO RELATED APPLICATIONS

This application is a continuation-in-part of U.S. patent application Ser. No. 15/442,325, filed on Feb. 24, 2017 and entitled "PERSONALIZED CONTENT DISTRIBUTION", which claims the benefit of U.S. Provisional Application No. 62/320,213, filed on Apr. 8, 2016 and entitled "ADAPTIVE PATHWAYS AND COGNITIVE TUTORING", the entireties of which are hereby incorporated by reference herein.

BACKGROUND

A computer network or data network is a telecommunications network which allows computers to exchange data. In computer networks, networked computing devices exchange data with each other along network links (data connections). The connections between nodes are established using either cable media or wireless media. The best-known computer network is the Internet.

Network computer devices that originate, route, and terminate the data are called network nodes. Nodes can include hosts such as personal computers, phones, servers, as well as networking hardware. Two such devices can be said to be networked together when one device is able to exchange information with the other device, whether or not they have a direct connection to each other.

Computer networks differ in the transmission media used to carry their signals, the communications protocols to organize network traffic, the network's size, topology and organizational intent. In most cases, communications protocols are layered on (i.e. work using) other more specific or more general communications protocols, except for the physical layer that directly deals with the transmission media.

BRIEF SUMMARY

One aspect of the present disclosure relates to a system for content provisioning. The system includes a memory including a content database including content for delivery to a user; a task database including data identifying a plurality of tasks; and a user profile database including information identifying one of several attributes of the user. The system also includes a user device. The user device includes a first network interface that can exchange data via a communication network and a first I/O subsystem that can convert electrical signals to user interpretable outputs via a user interface. In addition, the system includes one or several servers. The one or several servers are configured to receive content corresponding to at least one source document, parse the content; identify segments from the parsed content; generate a networked grouping of the segments; receive historical user information about a plurality of users from the user profile database; train a model by using the historical user information; receive activities of the user; parse the activities of the user; identify components from the parsed activities; correlate the components with the segments; extract features from the activities of the user based on the correlation; and use the trained model to estimate a mastery level of the user based on the features.

In some embodiments, the segments include portions of words, words, phrases, sentences, paragraphs, images, video, and/or sections of the content. In some embodiments, the one or several servers are further configured to generate the networked grouping of the segments based on a table of contents of the at least one source document or HTML tags of the at least one source document. In some embodiments, the networked grouping includes an acyclic directed network of the segments.

In some embodiments, the one or several servers are further configured to train the model by deriving features from the historical user information, deriving a labeled data set from the historical user information, wherein labels of the labeled data set correspond to outcomes associated with the features, inputting a first portion of the features and a first portion of the labeled data set into the model, and adjusting the model until correct outcomes are generated for the first portion of the features. In some embodiments, the one or several servers are further configured to train the model by inputting a second portion of the features and a second portion of the labeled data set into the model, using the model to generate predicted outcomes based on the second portion of the features, and evaluating the model by comparing the predicted outcomes with outcomes associated with the second portion of the features.

In some embodiments, the model is a random forest classifier. In some embodiments, the one or several servers are further configured to train a plurality of models corresponding to different segments of the parsed content. In some embodiments, the mastery level of the user is estimated for each of a plurality of skills. In some embodiments, the features are extracted based on a position of a correlated segment within the networked grouping.

Another aspect of the present disclosure relates to a method for content provisioning. The method includes receiving content corresponding to at least one source document, parsing the content, identifying segments from the parsed content, generating a networked grouping of the segments, receiving historical user information about a plurality of users, training a model by using the historical user information, receiving activities of a user, parsing the activities of the user, identifying components from the parsed activities, correlating the components with the segments, extracting features from the activities of the user based on the correlation, and using the trained model to estimate a mastery level of the user based on the features.

In some embodiments, the segments include portions of words, words, phrases, sentences, paragraphs, images, video, and/or sections of the content. In some embodiments, the networked grouping of the segments is generated based on a table of contents of the at least one source document or HTML tags of the at least one source document. In some embodiments, the networked grouping includes an acyclic directed network of the segments.

In some embodiments, the method also includes deriving features from the historical user information, deriving a labeled data set from the historical user information, wherein labels of the labeled data set correspond to outcomes associated with the features, inputting a first portion of the features and a first portion of the training data set into the model, and adjusting the model until correct outcomes are generated for the first portion of features. In some embodiments, training the model also includes inputting a second portion of the features and a second portion of the labeled data set into the model, using the model to generate predicted outcomes based on the second portion of the features, and evaluating the model by comparing the predicted outcomes with outcomes associated with the second portion of the features.

In some embodiments, the model is a random forest classifier. In some embodiments, the method also includes training a plurality of models corresponding to different segments of the parsed content. In some embodiments, the mastery level of the user is estimated for each of a plurality of skills. In some embodiments, the features are extracted based on a position of a correlated segment within the networked grouping.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides illustrative embodiment(s) only and is not intended to limit the scope, applicability, or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1:
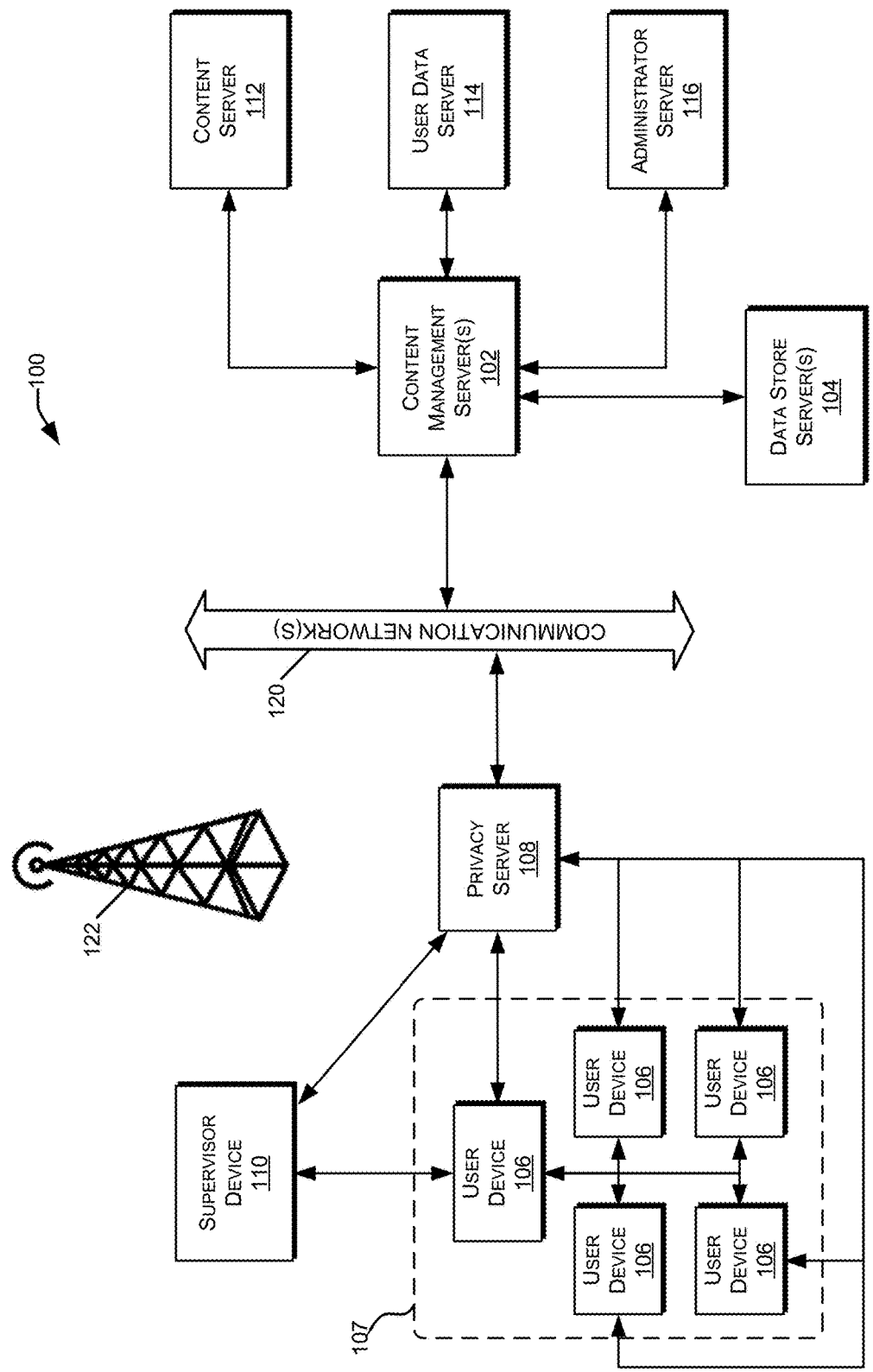
FIG. 1 is a block diagram illustrating an example of a content distribution network.

With reference now to FIG. 1, a block diagram is shown illustrating various components of a content distribution network (CDN) 100 which implements and supports certain embodiments and features described herein. In some embodiments, the content distribution network 100 can comprise one or several physical components and/or one or several virtual components such as, for example, one or several cloud computing components. In some embodiments, the content distribution network 100 can comprise a mixture of physical and cloud computing components.

Content distribution network 100 may include one or more content management servers 102. As discussed below in more detail, content management servers 102 may be any desired type of server including, for example, a rack server, a tower server, a miniature server, a blade server, a mini rack server, a mobile server, an ultra-dense server, a super server, or the like, and may include various hardware components, for example, a motherboard, a processing unit, memory systems, hard drives, network interfaces, power supplies, etc. Content management server 102 may include one or more server farms, clusters, or any other appropriate arrangement and/or combination or computer servers. Content management server 102 may act according to stored instructions located in a memory subsystem of the server 102, and may run an operating system, including any commercially available server operating system and/or any other operating systems discussed herein.

The content distribution network 100 may include one or more data store servers 104, such as database servers and file-based storage systems. The database servers 104 can access data that can be stored on a variety of hardware components. These hardware components can include, for example, components forming tier 0 storage, components forming tier 1 storage, components forming tier 2 storage, and/or any other tier of storage. In some embodiments, tier 0 storage refers to storage that is the fastest tier of storage in the database server 104, and particularly, the tier 0 storage is the fastest storage that is not RAM or cache memory. In some embodiments, the tier 0 memory can be embodied in solid state memory such as, for example, a solid-state drive (SSD) and/or flash memory.

In some embodiments, the tier 1 storage refers to storage that is one or several higher performing systems in the memory management system, and that is relatively slower than tier 0 memory, and relatively faster than other tiers of memory. The tier 1 memory can be one or several hard disks that can be, for example, high-performance hard disks. These hard disks can be one or both of physically or communicatingly connected such as, for example, by one or several fiber channels. In some embodiments, the one or several disks can be arranged into a disk storage system, and specifically can be arranged into an enterprise class disk storage system. The disk storage system can include any desired level of redundancy to protect data stored therein, and in one embodiment, the disk storage system can be made with grid architecture that creates parallelism for uniform allocation of system resources and balanced data distribution.

In some embodiments, the tier 2 storage refers to storage that includes one or several relatively lower performing systems in the memory management system, as compared to the tier 1 and tier 2 storages. Thus, tier 2 memory is relatively slower than tier 1 and tier 0 memories. Tier 2 memory can include one or several SATA-drives or one or several NL-SATA drives.

In some embodiments, the one or several hardware and/or software components of the database server 104 can be arranged into one or several storage area networks (SAN), which one or several storage area networks can be one or several dedicated networks that provide access to data storage, and particularly that provides access to consolidated, block level data storage. A SAN typically has its own network of storage devices that are generally not accessible through the local area network (LAN) by other devices. The SAN allows access to these devices in a manner such that these devices appear to be locally attached to the user device.

Data stores 104 may comprise stored data relevant to the functions of the content distribution network 100. Illustrative examples of data stores 104 that may be maintained in certain embodiments of the content distribution network 100 are described below in reference to FIG. 3. In some embodiments, multiple data stores may reside on a single server 104, either using the same storage components of server 104 or using different physical storage components to assure data security and integrity between data stores. In other embodiments, each data store may have a separate dedicated data store server 104.

Content distribution network 100 also may include one or more user devices 106 and/or supervisor devices 110. User devices 106 and supervisor devices 110 may display content received via the content distribution network 100, and may support various types of user interactions with the content. User devices 106 and supervisor devices 110 may include mobile devices such as smartphones, tablet computers, personal digital assistants, and wearable computing devices. Such mobile devices may run a variety of mobile operating systems and may be enabled for Internet, e-mail, short message service (SMS), Bluetooth®, mobile radio-frequency identification (M-RFID), and/or other communication protocols. Other user devices 106 and supervisor devices 110 may be general purpose personal computers or special-purpose computing devices including, by way of example, personal computers, laptop computers, workstation computers, projection devices, and interactive room display systems. Additionally, user devices 106 and supervisor devices 110 may be any other electronic devices, such as a thin-client computers, an Internet-enabled gaming systems, business or home appliances, and/or a personal messaging devices, capable of communicating over network(s) 120.

In different contexts of content distribution networks 100, user devices 106 and supervisor devices 110 may correspond to different types of specialized devices, for example, student devices and teacher devices in an educational network, employee devices and presentation devices in a company network, different gaming devices in a gaming network, etc.

In some embodiments, user devices 106 and supervisor devices 110 may operate in the same physical location 107, such as a classroom or conference room. In such cases, the devices may contain components that support direct communications with other nearby devices, such as wireless transceivers and wireless communications interfaces, Ethernet sockets or other Local Area Network (LAN) interfaces, etc. In other implementations, the user devices 106 and supervisor devices 110 need not be used at the same location 107, but may be used in remote geographic locations in which each user device 106 and supervisor device 110 may use security features and/or specialized hardware (e.g., hardware-accelerated SSL and HTTPS, WS-Security, firewalls, etc.) to communicate with the content management server 102 and/or other remotely located user devices 106. Additionally, different user devices 106 and supervisor devices 110 may be assigned different designated roles, such as presenter devices, teacher devices, administrator devices, or the like, and in such cases the different devices may be provided with additional hardware and/or software components to provide content and support user capabilities not available to the other devices.

The content distribution network 100 also may include a privacy server 108 that maintains private user information at the privacy server 108 while using applications or services hosted on other servers. For example, the privacy server 108 may be used to maintain private data of a user within one jurisdiction even though the user is accessing an application hosted on a server (e.g., the content management server 102) located outside the jurisdiction. In such cases, the privacy server 108 may intercept communications between a user device 106 or supervisor device 110 and other devices that include private user information. The privacy server 108 may create a token or identifier that does not disclose the private information and may use the token or identifier when communicating with the other servers and systems, instead of using the user's private information.

As illustrated in FIG. 1, the content management server 102 may be in communication with one or more additional servers, such as a content server 112, a user data server 114, and/or an administrator server 116. Each of these servers may include some or all of the same physical and logical components as the content management server(s) 102, and in some cases, the hardware and software components of these servers 112-116 may be incorporated into the content management server(s) 102, rather than being implemented as separate computer servers.

Content server 112 may include hardware and software components to generate, store, and maintain the content resources for distribution to user devices 106 and other devices in the network 100. For example, in content distribution networks 100 used for professional training and educational purposes, content server 112 may include data stores of training materials, presentations, plans, syllabi, reviews, evaluations, interactive programs and simulations, course models, course outlines, and various training interfaces that correspond to different materials and/or different types of user devices 106. In content distribution networks 100 used for media distribution, interactive gaming, and the like, a content server 112 may include media content files such as music, movies, television programming, games, and advertisements.

User data server 114 may include hardware and software components that store and process data for multiple users relating to each user's activities and usage of the content distribution network 100. For example, the content management server 102 may record and track each user's system usage, including their user device 106, content resources accessed, and interactions with other user devices 106. This data may be stored and processed by the user data server 114, to support user tracking and analysis features. For instance, in the professional training and educational contexts, the user data server 114 may store and analyze each user's training materials viewed, presentations attended, courses completed, interactions, evaluation results, and the like. The user data server 114 may also include a repository for user-generated material, such as evaluations and tests completed by users, and documents and assignments prepared by users. In the context of media distribution and interactive gaming, the user data server 114 may store and process resource access data for multiple users (e.g., content titles accessed, access times, data usage amounts, gaming histories, user devices and device types, etc.).

Administrator server 116 may include hardware and software components to initiate various administrative functions at the content management server 102 and other components within the content distribution network 100. For example, the administrator server 116 may monitor device status and performance for the various servers, data stores, and/or user devices 106 in the content distribution network 100. When necessary, the administrator server 116 may add or remove devices from the network 100, and perform device maintenance such as providing software updates to the devices in the network 100. Various administrative tools on the administrator server 116 may allow authorized users to set user access permissions to various content resources, monitor resource usage by users and devices 106, and perform analyses and generate reports on specific network users and/or devices (e.g., resource usage tracking reports, training evaluations, etc.).

The content distribution network 100 may include one or more communication networks 120. Although only a single network 120 is identified in FIG. 1, the content distribution network 100 may include any number of different communication networks between any of the computer servers and devices shown in FIG. 1 and/or other devices described herein. Communication networks 120 may enable communication between the various computing devices, servers, and other components of the content distribution network 100. As discussed below, various implementations of content distribution networks 100 may employ different types of networks 120, for example, computer networks, telecommunications networks, wireless networks, and/or any combination of these and/or other networks.

The content distribution network 100 may include one or several navigation systems or features including, for example, the Global Positioning System ("GPS"), GALILEO, or the like, or location systems or features including, for example, one or several transceivers that can determine location of the one or several components of the content distribution network 100 via, for example, triangulation. All of these are depicted as navigation system 122.

In some embodiments, navigation system 122 can include or several features that can communicate with one or several components of the content distribution network 100 including, for example, with one or several of the user devices 106 and/or with one or several of the supervisor devices 110. In some embodiments, this communication can include the transmission of a signal from the navigation system 122 which signal is received by one or several components of the content distribution network 100 and can be used to determine the location of the one or several components of the content distribution network 100.

Figure 2:
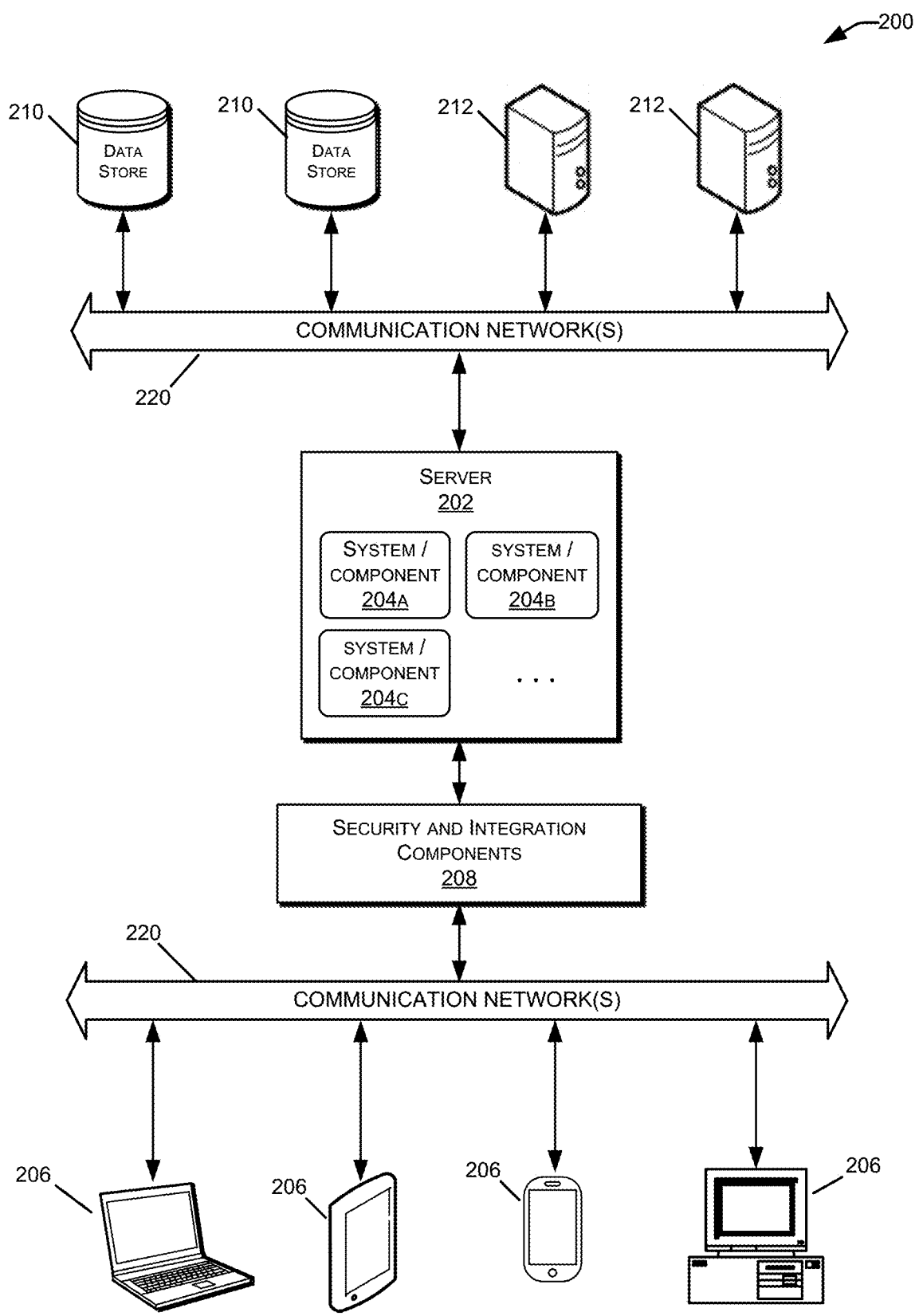
FIG. 2 is a block diagram illustrating a computer server and computing environment within a content distribution network.

With reference to FIG. 2, an illustrative distributed computing environment 200 is shown including a computer server 202, four client computing devices 206, and other components that may implement certain embodiments and features described herein. In some embodiments, the server 202 may correspond to the content management server 102 discussed above in FIG. 1, and the client computing devices 206 may correspond to the user devices 106. However, the computing environment 200 illustrated in FIG. 2 may correspond to any other combination of devices and servers configured to implement a client-server model or other distributed computing architecture.

Client devices 206 may be configured to receive and execute client applications over one or more networks 220. Such client applications may be web browser based applications and/or standalone software applications, such as mobile device applications. Server 202 may be communicatively coupled with the client devices 206 via one or more communication networks 220. Client devices 206 may receive client applications from server 202 or from other application providers (e.g., public or private application stores). Server 202 may be configured to run one or more server software applications or services, for example, web-based or cloud-based services, to support content distribution and interaction with client devices 206. Users operating client devices 206 may in turn utilize one or more client applications (e.g., virtual client applications) to interact with server 202 to utilize the services provided by these components.

Various different subsystems and/or components 204 may be implemented on server 202. Users operating the client devices 206 may initiate one or more client applications to use services provided by these subsystems and components. The subsystems and components within the server 202 and client devices 206 may be implemented in hardware, firmware, software, or combinations thereof. Various different system configurations are possible in different distributed computing systems 200 and content distribution networks 100. The embodiment shown in FIG. 2 is thus one example of a distributed computing system and is not intended to be limiting.

Although exemplary computing environment 200 is shown with four client computing devices 206, any number of client computing devices may be supported. Other devices, such as specialized sensor devices, etc., may interact with client devices 206 and/or server 202.

As shown in FIG. 2, various security and integration components 208 may be used to send and manage communications between the server 202 and user devices 206 over one or more communication networks 220. The security and integration components 208 may include separate servers, such as web servers and/or authentication servers, and/or specialized networking components, such as firewalls, routers, gateways, load balancers, and the like. In some cases, the security and integration components 208 may correspond to a set of dedicated hardware and/or software operating at the same physical location and under the control of the same entities as server 202. For example, components 208 may include one or more dedicated web servers and network hardware in a datacenter or a cloud infrastructure. In other examples, the security and integration components 208 may correspond to separate hardware and software components which may be operated at a separate physical location and/or by a separate entity.

Security and integration components 208 may implement various security features for data transmission and storage, such as authenticating users and restricting access to unknown or unauthorized users. In various implementations, security and integration components 208 may provide, for example, a file-based integration scheme or a service-based integration scheme for transmitting data between the various devices in the content distribution network 100. Security and integration components 208 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 208 and/or elsewhere within the content distribution network 100. Such web services, including cross-domain and/or cross-platform web services, may be developed for enterprise use in accordance with various web service standards, such as RESTful web services (i.e., services based on the Representation State Transfer (REST) architectural style and constraints), and/or web services designed in accordance with the Web Service Interoperability (WS-I) guidelines. Some web services may use the Secure Sockets Layer (SSL) or Transport Layer Security (TLS) protocol to provide secure connections between the server 202 and user devices 206. SSL or TLS may use HTTP or HTTPS to provide authentication and confidentiality. In other examples, web services may be implemented using REST over HTTPS with the OAuth open standard for authentication, or using the WS-Security standard which provides for secure SOAP messages using XML, encryption. In other examples, the security and integration components 208 may include specialized hardware for providing secure web services. For example, security and integration components 208 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 220 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. Merely by way of example, network(s) 220 may be local area networks (LAN), such as one based on Ethernet, Token-Ring, and/or the like. Network(s) 220 also may be wide-area networks, such as the Internet. Networks 220 may include telecommunication networks such as a public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 220.

Computing environment 200 also may include one or more data stores 210 and/or back-end servers 212. In certain examples, the data stores 210 may correspond to data store server(s) 104 discussed above in FIG. 1, and back-end servers 212 may correspond to the various back-end servers 112-116. Data stores 210 and servers 212 may reside in the same datacenter or may operate at a remote location from server 202. In some cases, one or more data stores 210 may reside on a non-transitory storage medium within the server 202. Other data stores 210 and back-end servers 212 may be remote from server 202 and configured to communicate with server 202 via one or more networks 220. In certain embodiments, data stores 210 and back-end servers 212 may reside in a storage-area network (SAN), or may use storage-as-a-service (STaaS) architectural model.

Figure 3:
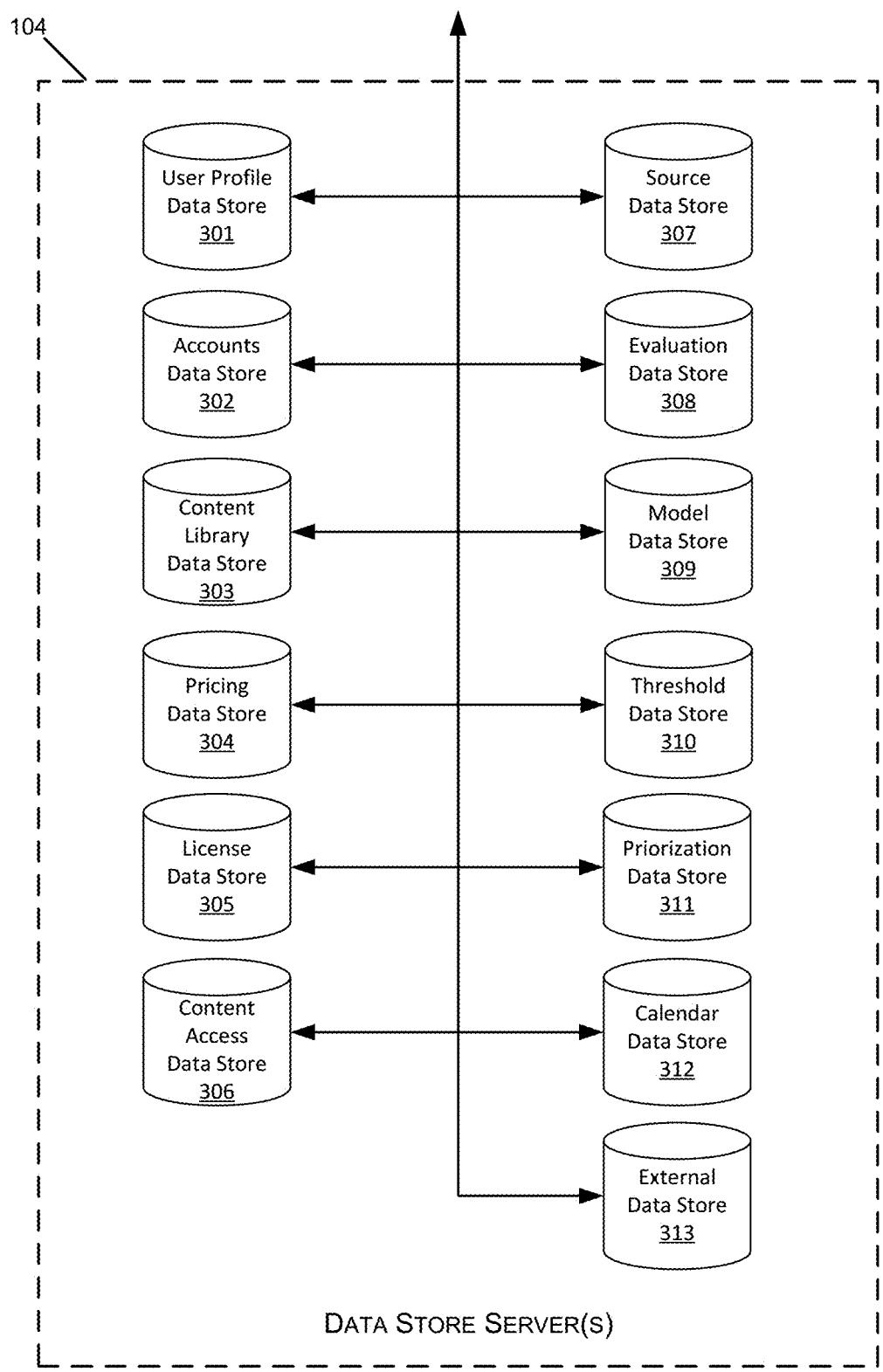
FIG. 3 is a block diagram illustrating an embodiment of one or more data store servers within a content distribution network.

With reference to FIG. 3, an illustrative set of data stores and/or data store servers is shown, corresponding to the data store servers 104 of the content distribution network 100 discussed above in FIG. 1. One or more individual data stores 301-313 may reside in storage on a single computer server 104 (or a single server farm or cluster) under the control of a single entity, or may reside on separate servers operated by different entities and/or at remote locations. In some embodiments, data stores 301-313 may be accessed by the content management server 102 and/or other devices and servers within the network 100 (e.g., user devices 106, supervisor devices 110, administrator servers 116, etc.). Access to one or more of the data stores 301-313 may be limited or denied based on the processes, user credentials, and/or devices attempting to interact with the data store.

The paragraphs below describe examples of specific data stores that may be implemented within some embodiments of a content distribution network 100. It should be understood that the below descriptions of data stores 301-313, including their functionality and types of data stored therein, are illustrative and non-limiting. Data stores server architecture, design, and the execution of specific data stores 301-313 may depend on the context, size, and functional requirements of a content distribution network 100. For example, in content distribution systems 100 used for professional training and educational purposes, separate databases or file-based storage systems may be implemented in data store server(s) 104 to store trainee and/or student data, trainer and/or professor data, training module data and content descriptions, training results, evaluation data, and the like. In contrast, in content distribution systems 100 used for media distribution from content providers to subscribers, separate data stores may be implemented in data stores server(s) 104 to store listings of available content titles and descriptions, content title usage statistics, subscriber profiles, account data, payment data, network usage statistics, etc.

A user profile data store 301, also referred to herein as a user profile database 301, may include information relating to the end users within the content distribution network 100. This information may include user characteristics such as the user names, access credentials (e.g., logins and passwords), user preferences, and information relating to any previous user interactions within the content distribution network 100 (e.g., requested content, posted content, content modules completed, training scores or evaluations, other associated users, etc.). In some embodiments, this information can relate to one or several individual end users such as, for example, one or several students, teachers, administrators, or the like, and in some embodiments, this information can relate to one or several institutional end users such as, for example, one or several schools, groups of schools such as one or several school districts, one or several colleges, one or several universities, one or several training providers, or the like. In some embodiments, this information can identify one or several user memberships in one or several groups such as, for example, a student's membership in a university, school, program, grade, course, class, or the like.

The user profile database 301 can include information relating to a user's status, location, or the like. This information can identify, for example, a device a user is using, the location of that device, or the like. In some embodiments, this information can be generated based on any location detection technology including, for example, a navigation system 122, or the like.

Information relating to the user's status can identify, for example, logged-in status information that can indicate whether the user is presently logged-in to the content distribution network 100 and/or whether the log-in is active. In some embodiments, the information relating to the user's status can identify whether the user is currently accessing content and/or participating in an activity from the content distribution network 100.

In some embodiments, information relating to the user's status can identify, for example, one or several attributes of the user's interaction with the content distribution network 100, and/or content distributed by the content distribution network 100. This can include data identifying the user's interactions with the content distribution network 100, the content consumed by the user through the content distribution network 100, or the like. In some embodiments, this can include data identifying the type of information accessed through the content distribution network 100 and/or the type of activity performed by the user via the content distribution network 100, the lapsed time since the last time the user accessed content and/or participated in an activity from the content distribution network 100, or the like. In some embodiments, this information can relate to a content program comprising an aggregate of data, content, and/or activities, and can identify, for example, progress through the content program, or through the aggregate of data, content, and/or activities forming the content program. In some embodiments, this information can track, for example, the amount of time since participation in and/or completion of one or several types of activities, the amount of time since communication with one or several supervisors and/or supervisor devices 110, or the like.

In some embodiments in which the one or several end users are individuals, and specifically are students, the user profile database 301 can further include information relating to these students' academic and/or educational history. This information can identify one or several courses of study that the student has initiated, completed, and/or partially completed, as well as grades received in those courses of study. In some embodiments, the student's academic and/or educational history can further include information identifying student performance on one or several tests, quizzes, and/or assignments. In some embodiments, this information can be stored in a tier of memory that is not the fastest memory in the content delivery network 100.

The user profile database 301 can include information relating to one or several student learning preferences. In some embodiments, for example, the user, also referred to herein as the student or the student-user, may have one or several preferred learning styles, one or several most effective learning styles, and/or the like. In some embodiments, the student's learning style can be any learning style describing how the student best learns or how the student prefers to learn. In one embodiment, these learning styles can include, for example, identification of the student as an auditory learner, as a visual learner, and/or as a tactile learner. In some embodiments, the data identifying one or several student learning styles can include data identifying a learning style based on the student's educational history such as, for example, identifying a student as an auditory learner when the student has received significantly higher grades and/or scores on assignments and/or in courses favorable to auditory learners. In some embodiments, this information can be stored in a tier of memory that is not the fastest memory in the content delivery network 100.

In some embodiments, the user profile data store 301 can further include information identifying one or several user skill levels. In some embodiments, these one or several user skill levels can identify a skill level determined based on past performance by the user interacting with the content delivery network 100, and in some embodiments, these one or several user skill levels can identify a predicted skill level determined based on past performance by the user interacting with the content delivery network 100 and one or several predictive models.

The user profile database 301 can further include information relating to one or several teachers and/or instructors who are responsible for organizing, presenting, and/or managing the presentation of information to the student. In some embodiments, user profile database 301 can include information identifying courses and/or subjects that have been taught by the teacher, data identifying courses and/or subjects currently taught by the teacher, and/or data identifying courses and/or subjects that will be taught by the teacher. In some embodiments, this can include information relating to one or several teaching styles of one or several teachers. In some embodiments, the user profile database 301 can further include information indicating past evaluations and/or evaluation reports received by the teacher. In some embodiments, the user profile database 301 can further include information relating to improvement suggestions received by the teacher, training received by the teacher, continuing education received by the teacher, and/or the like. In some embodiments, this information can be stored in a tier of memory that is not the fastest memory in the content delivery network 100.

An accounts data store 302, also referred to herein as an accounts database 302, may generate and store account data for different users in various roles within the content distribution network 100. For example, accounts may be created in an accounts data store 302 for individual end users, supervisors, administrator users, and entities such as companies or educational institutions. Account data may include account types, current account status, account characteristics, and any parameters, limits, restrictions associated with the accounts.

A content library data store 303, also referred to herein as a content library database 303, may include information describing the individual content items (or content resources or data packets) available via the content distribution network 100. In some embodiments, these data packets in the content library database 303 can be linked to from an object network. In some embodiments, these data packets can be linked in the object network according to one or several prerequisite relationships that can, for example, identify the relative hierarchy and/or difficulty of the data objects. In some embodiments, this hierarchy of data objects can be generated by the content distribution network 100 according to user experience with the object network, and in some embodiments, this hierarchy of data objects can be generated based on one or several existing and/or external hierarchies such as, for example, a syllabus, a table of contents, or the like. In some embodiments, for example, the object network can correspond to a syllabus such that content for the syllabus is embodied in the object network.

In some embodiments, the content library data store 303 can comprise a syllabus, a schedule, or the like. In some embodiments, the syllabus or schedule can identify one or several tasks and/or events relevant to the user. In some embodiments, for example, when the user is a member of a group such as, a section or a class, these tasks and/or events relevant to the user can identify one or several assignments, quizzes, exams, or the like.

In some embodiments, the library data store 303 may include metadata, properties, and other characteristics associated with the content resources stored in the content server 112. Such data may identify one or more aspects or content attributes of the associated content resources, for example, subject matter, access level, or skill level of the content resources, license attributes of the content resources (e.g., any limitations and/or restrictions on the licensable use and/or distribution of the content resource), price attributes of the content resources (e.g., a price and/or price structure for determining a payment amount for use or distribution of the content resource), rating attributes for the content resources (e.g., data indicating the evaluation or effectiveness of the content resource), and the like. In some embodiments, the library data store 303 may be configured to allow updating of content metadata or properties, and to allow the addition and/or removal of information relating to the content resources. For example, content relationships may be implemented as graph structures, which may be stored in the library data store 303 or in an additional store for use by selection algorithms along with the other metadata.

In some embodiments, the content library data store 303 can contain information used in evaluating responses received from users. In some embodiments, for example, a user can receive content from the content distribution network 100 and can, subsequent to receiving that content, provide a response to the received content. In some embodiments, for example, the received content can comprise one or several questions, prompts, or the like, and the response to the received content can comprise an answer to those one or several questions, prompts, or the like. In some embodiments, information, referred to herein as "comparative data," from the content library data store 303 can be used to determine whether the responses are the correct and/or desired responses.

In some embodiments, the content library database 303 and/or the user profile database 301 can comprise an aggregation network also referred to herein as a content network or content aggregation network. The aggregation network can comprise a plurality of content aggregations that can be linked together by, for example: creation by common user; relation to a common subject, topic, skill, or the like; creation from a common set of source material such as source data packets; or the like. In some embodiments, the content aggregation can comprise a grouping of content comprising the presentation portion that can be provided to the user in the form of, for example, a flash card and an extraction portion that can comprise the desired response to the presentation portion such as for example, an answer to a flash card. In some embodiments, one or several content aggregations can be generated by the content distribution network 100 and can be related to one or several data packets they can be, for example, organized in object network. In some embodiments, the one or several content aggregations can be each created from content stored in one or several of the data packets.

In some embodiments, the content aggregations located in the content library database 303 and/or the user profile database 301 can be associated with a user-creator of those content aggregations. In some embodiments, access to content aggregations can vary based on, for example, whether a user created the content aggregations. In some embodiments, the content library database 303 and/or the user profile database 301 can comprise a database of content aggregations associated with a specific user, and in some embodiments, the content library database 303 and/or the user profile database 301 can comprise a plurality of databases of content aggregations that are each associated with a specific user. In some embodiments, these databases of content aggregations can include content aggregations created by their specific user and in some embodiments, these databases of content aggregations can further include content aggregations selected for inclusion by their specific user and/or a supervisor of that specific user. In some embodiments, these content aggregations can be arranged and/or linked in a hierarchical relationship similar to the data packets in the object network and/or linked to the object network in the object network or the tasks or skills associated with the data packets in the object network or the syllabus or schedule.

In some embodiments, the content aggregation network, and the content aggregations forming the content aggregation network, can be organized according to the object network and/or the hierarchical relationships embodied in the object network. In some embodiments, the content aggregation network, and/or the content aggregations forming the content aggregation network, can be organized according to one or several tasks identified in the syllabus, schedule or the like.

A pricing data store 304 may include pricing information and/or pricing structures for determining payment amounts for providing access to the content distribution network 100 and/or the individual content resources within the network 100. In some cases, pricing may be determined based on a user's access to the content distribution network 100, for example, a time-based subscription fee or pricing based on network usage. In other cases, pricing may be tied to specific content resources. Certain content resources may have associated pricing information, whereas other pricing determinations may be based on the resources accessed, the profiles and/or accounts of the user, and the desired level of access (e.g., duration of access, network speed, etc.). Additionally, the pricing data store 304 may include information relating to compilation pricing for groups of content resources, such as group prices and/or price structures for groupings of resources.

A license data store 305 may include information relating to licenses and/or licensing of the content resources within the content distribution network 100. For example, the license data store 305 may identify licenses and licensing terms for individual content resources and/or compilations of content resources in the content server 112, the rights holders for the content resources, and/or common or large-scale right holder information such as contact information for rights holders of content not included in the content server 112.

A content access data store 306 may include access rights and security information for the content distribution network 100 and specific content resources. For example, the content access data store 306 may include login information (e.g., user identifiers, logins, passwords, etc.) that can be verified during user login attempts to the network 100. The content access data store 306 also may be used to store assigned user roles and/or user levels of access. For example, a user's access level may correspond to the sets of content resources and/or the client or server applications that the user is permitted to access. Certain users may be permitted or denied access to certain applications and resources based on their subscription level, training program, course/grade level, etc. Certain users may have supervisory access over one or more end users, allowing the supervisor to access all or portions of the end user's content, activities, evaluations, etc. Additionally, certain users may have administrative access over some users and/or some applications in the content management network 100, allowing such users to add and remove user accounts, modify user access permissions, perform maintenance updates on software and servers, etc.

A source data store 307 may include information relating to the source of the content resources available via the content distribution network. For example, a source data store 307 may identify the authors and originating devices of content resources, previous pieces of data and/or groups of data originating from the same authors or originating devices and the like.

An evaluation data store 308 may include information used to direct the evaluation of users and content resources in the content management network 100. In some embodiments, the evaluation data store 308 may contain, for example, the analysis criteria and the analysis guidelines for evaluating users (e.g., trainees/students, gaming users, media content consumers, etc.) and/or for evaluating the content resources in the network 100. The evaluation data store 308 also may include information relating to evaluation processing tasks, for example, the identification of users and user devices 106 that have received certain content resources or accessed certain applications, the status of evaluations or evaluation histories for content resources, users, or applications, and the like. Evaluation criteria may be stored in the evaluation data store 308 including data and/or instructions in the form of one or several electronic rubrics or scoring guides for use in the evaluation of the content, users, or applications. The evaluation data store 308 also may include past evaluations and/or evaluation analyses for users, content, and applications, including relative rankings, characterizations, explanations, and the like.

A model data store 309, also referred to herein as a model database 309, can store information relating to one or several predictive models. In some embodiments, these can include one or several evidence models, risk models, skill models, or the like. In some embodiments, an evidence model can be a mathematically-based statistical model. The evidence model can be based on, for example, Item Response Theory (IRT), Bayesian Network (Bayes net), Performance Factor Analysis (PFA), or the like. The evidence model can, in some embodiments, be customizable to a user and/or to one or several content items. Specifically, one or several inputs relating to the user and/or to one or several content items can be inserted into the evidence model. These inputs can include, for example, one or several measures of user skill level, one or several measures of content item difficulty and/or skill level, or the like. The customized evidence model can then be used to predict the likelihood of the user providing desired or undesired responses to one or several of the content items.

In some embodiments, the risk models can include one or several models that can be used to calculate one or several model function values. In some embodiments, these one or several model function values can be used to calculate a risk probability, which risk probability can characterize the risk of a user such as a student-user failing to achieve a desired outcome such as, for example, failing to correctly respond to one or several data packets, failure to achieve a desired level of completion of a program, for example in a pre-defined time period, failure to achieve a desired learning outcome, or the like. In some embodiments, the risk probability can identify the risk of the student-user failing to complete 60% of the program.

In some embodiments, these models can include a plurality of model functions including, for example, a first model function, a second model function, a third model function, and a fourth model function. In some embodiments, some or all of the model functions can be associated with a portion of the program such as, for example a completion stage and/or completion status of the program. In one embodiment, for example, the first model function can be associated with a first completion status, the second model function can be associated with a second completion status, the third model function can be associated with a third completion status, and the fourth model function can be associated with a fourth completion status. In some embodiments, these completion statuses can be selected such that some or all of these completion statuses are less than the desired level of completion of the program. Specifically, in some embodiments, these completion statuses can be selected to all be at less than 60% completion of the program, and more specifically, in some embodiments, the first completion status can be at 20% completion of the program, the second completion status can be at 30% completion of the program, the third completion status can be at 40% completion of the program, and the fourth completion status can be at 50% completion of the program. Similarly, any desired number of model functions can be associated with any desired number of completion statuses.

In some embodiments, a model function can be selected from the plurality of model functions based on a student-user's progress through a program. In some embodiments, the student-user's progress can be compared to one or several status trigger thresholds, each of which status trigger thresholds can be associated with one or more of the model functions. If one of the status triggers is triggered by the student-user's progress, the corresponding one or several model functions can be selected.

The model functions can comprise a variety of types of models and/or functions. In some embodiments, each of the model functions outputs a function value that can be used in calculating a risk probability. This function value can be calculated by performing one or several mathematical operations on one or several values indicative of one or several user attributes and/or user parameters, also referred to herein as program status parameters. In some embodiments, each of the model functions can use the same program status parameters, and in some embodiments, the model functions can use different program status parameters. In some embodiments, the model functions use different program status parameters when at least one of the model functions uses at least one program status parameter that is not used by others of the model functions.

In some embodiments, a skill model can comprise a statistical model identifying a predictive skill level of one or several students. In some embodiments, this model can identify a single skill level of a student and/or a range of possible skill levels of a student. In some embodiments, this statistical model can identify a skill level of a student-user and an error value or error range associated with that skill level. In some embodiments, the error value can be associated with a confidence interval determined based on a confidence level. Thus, in some embodiments, as the number of student interactions with the content distribution network increases, the confidence level can increase and the error value can decrease such that the range identified by the error value about the predicted skill level is smaller.

A threshold data store 310, also referred to herein as a threshold database, can store one or several threshold values. These one or several threshold values can delineate between states or conditions. In one exemplary embodiment, for example, a threshold value can delineate between an acceptable user performance and an unacceptable user performance, between content appropriate for a user and content that is inappropriate for a user, between risk levels, or the like.

A prioritization data store 311, also referred to herein as the prioritization database 311, can include data relating to one or several tasks and the prioritization of those one or several tasks with respect to each other. In some embodiments, the prioritization database 311 can be unique to a specific user, and in some embodiments, the prioritization database 311 can be applicable to a plurality of users. In some embodiments in which the prioritization database 311 is unique to a specific user, the prioritization database 311 can be a sub-database of the user profile database 301. In some embodiments, the prioritization database 311 can include information identifying a plurality of tasks and a relative prioritization amongst that plurality of tasks. In some embodiments, this prioritization can be static and in some embodiments, this prioritization can be dynamic in that the prioritization can change based on updates, for example, one or several of the tasks, the user profile database 301, or the like. In some embodiments, the prioritization database 311 can include information relating to tasks associated with a single course, group, class, or the like, and in some embodiments, the prioritization database 311 can include information relating to tasks associated with a plurality of courses, groups, classes, or the like.

A task can define an objective and/or outcome and can be associated with one or several data packets that can, for example, contribute to user attainment of the objective and/or outcome. In some embodiments, some or all of the data packets contained in the content library database 303 can be linked with one or several tasks stored in the prioritization database 311 such that a single task can be linked and/or associated with one or several data packets.

The prioritization database 311 can further include information relevant to the prioritization of one or several tasks and/or the prioritization database 311 can include information that can be used in determining the prioritization of one or several tasks. In some embodiments, this can include weight data which can identify a relative and/or absolute weight of a task. In some embodiments, for example, the weight data can identify the degree to which a task contributes to an outcome such as, for example, a score or a grade. In some embodiments, this weight data can specify the portion and/or percent of a grade of a class, section, course, or study that results from, and/or that is associated with the task.

The prioritization database 311 can further include information relevant to the composition of the task. In some embodiments, for example, this information, also referred to herein as a composition value, can identify one or several sub-tasks and/or content categories forming the tasks, as well as a contribution of each of those sub-tasks and/or content categories to the task. In some embodiments, the application of the weight data to the composition value can result in the identification of a contribution value for the task and/or for the one or several sub-tasks and/or content categories forming the task. This contribution value can identify the contribution of one, some, or all of the sub-tasks and/or content categories to the outcome such as, for example, the score or the grade.

The calendar data store 312, also referred to herein as the calendar database 312, can include timing information relevant to the tasks contained in the prioritization database 311. In some embodiments, this timing information can identify one or several dates by which the tasks should be completed, one or several event dates associated with the task such as, for example, one or several due dates, test dates, or the like, holiday information, or the like. In some embodiments, the calendar database 312 can further include any information provided to the user relating to other goals, commitments, or the like.

In addition to the illustrative data stores described above, data store server(s) 104 (e.g., database servers, file-based storage servers, etc.) may include one or more external data stores 313 or external data aggregators 313. External data aggregators 313 may include third-party data sources accessible to the content management network 100, but not maintained by the content management network 100. External data aggregators 313 may include any electronic information source relating to the users, content resources, or applications of the content distribution network 100. For example, external data aggregators 313 may be third-party data stores containing demographic data, education related data, consumer sales data, health related data, and the like. Illustrative external data aggregators 313 may include, for example, social networking web servers, public records data stores, learning management systems, educational institution servers, business servers, consumer sales data stores, medical record data stores, etc. Data retrieved from various external data aggregators 313 may be used to verify and update user account information, suggest user content, and perform user and content evaluations.

Figure 4:
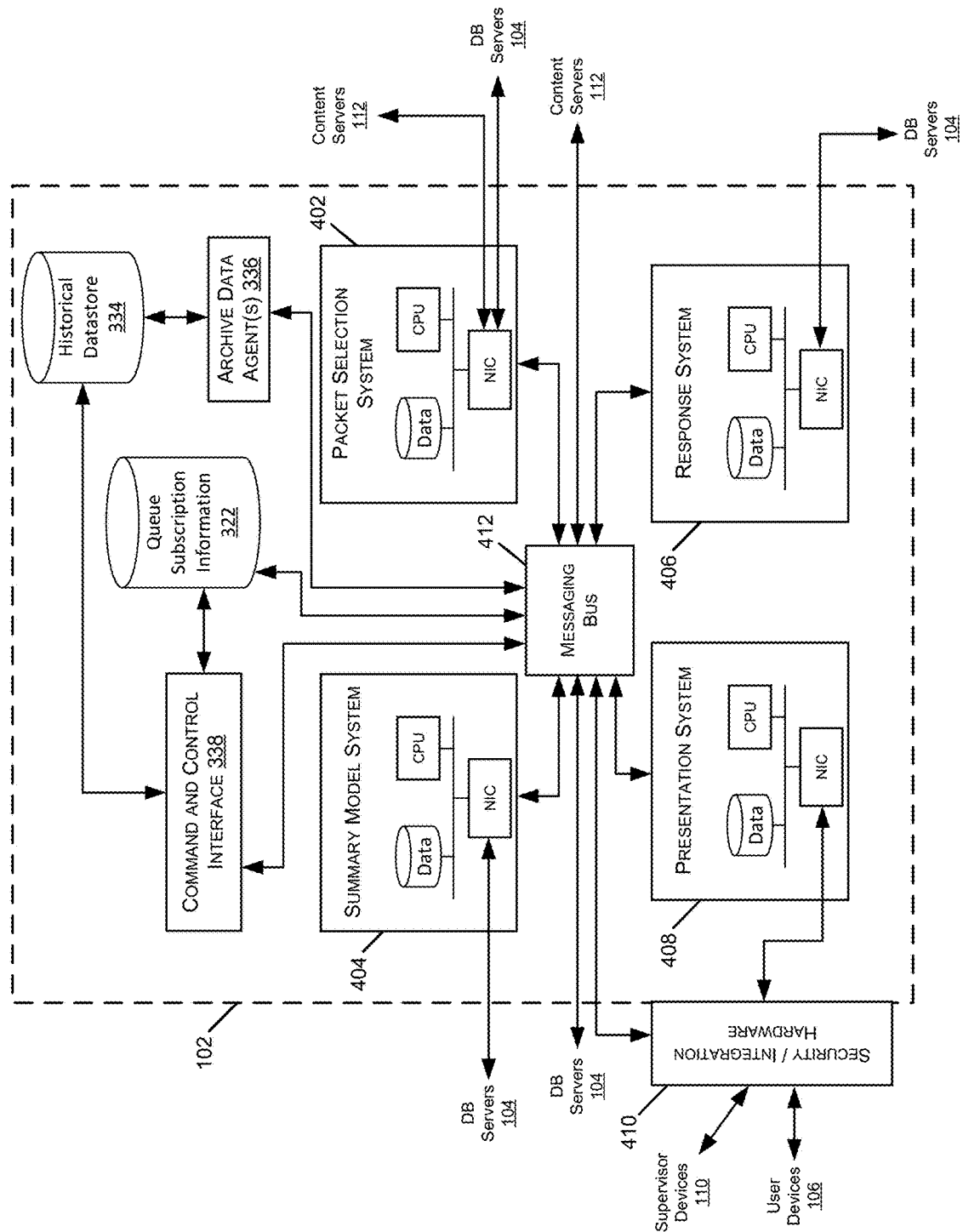
FIG. 4 is a block diagram illustrating an embodiment of one or more content management servers within a content distribution network.

With reference now to FIG. 4, a block diagram is shown illustrating an embodiment of one or more content management servers 102 within a content distribution network 100. In such an embodiment, content management server 102 performs internal data gathering and processing of streamed content along with external data gathering and processing. Other embodiments could have either all external or all internal data gathering. This embodiment allows reporting timely information that might be of interest to the reporting party or other parties. In this embodiment, the content management server 102 can monitor gathered information from several sources to allow it to make timely business and/or processing decisions based upon that information. For example, reports of user actions and/or responses, as well as the status and/or results of one or several processing tasks could be gathered and reported to the content management server 102 from a number of sources.

Internally, the content management server 102 gathers information from one or more internal components 402-408. The internal components 402-408 gather and/or process information relating to such things as: content provided to users; content consumed by users; responses provided by users; user skill levels; content difficulty levels; next content for providing to users; etc. The internal components 402-408 can report the gathered and/or generated information in real-time, near real-time or along another time line. To account for any delay in reporting information, a time stamp or staleness indicator can inform others of how timely the information was sampled. The content management server 102 can opt to allow third parties to use internally or externally gathered information that is aggregated within the server 102 by subscription to the content distribution network 100.

A command and control (CC) interface 338 configures the gathered input information to an output of data streams, also referred to herein as content streams. APIs for accepting gathered information and providing data streams are provided to third parties external to the server 102 who want to subscribe to data streams. The server 102 or a third party can design as yet undefined APIs using the CC interface 338. The server 102 can also define authorization and authentication parameters using the CC interface 338 such as authentication, authorization, login, and/or data encryption. CC information is passed to the internal components 402-408 and/or other components of the content distribution network 100 through a channel separate from the gathered information or data stream in this embodiment, but other embodiments could embed CC information in these communication channels. The CC information allows throttling information reporting frequency, specifying formats for information and data streams, deactivation of one or several internal components 402-408 and/or other components of the content distribution network 100, updating authentication and authorization, etc.

The various data streams that are available can be researched and explored through the CC interface 338. Those data stream selections for a particular subscriber, which can be one or several of the internal components 402-408 and/or other components of the content distribution network 100, are stored in the queue subscription information database 322. The server 102 and/or the CC interface 338 then routes selected data streams to processing subscribers that have selected delivery of a given data stream. Additionally, the server 102 also supports historical queries of the various data streams that are stored in an historical data store 334 as gathered by an archive data agent 336. Through the CC interface 338 various data streams can be selected for archiving into the historical data store 334.

Components of the content distribution network 100 outside of the server 102 can also gather information that is reported to the server 102 in real-time, near real-time, or along another time line. There is a defined API between those components and the server 102. Each type of information or variable collected by server 102 falls within a defined API or multiple APIs. In some cases, the CC interface 338 is used to define additional variables to modify an API that might be of use to processing subscribers. The additional variables can be passed to all processing subscribes or just a subset. For example, a component of the content distribution network 100 outside of the server 102 may report a user response, but define an identifier of that user as a private variable that would not be passed to processing subscribers lacking access to that user and/or authorization to receive that user data. Processing subscribers having access to that user and/or authorization to receive that user data would receive the subscriber identifier along with the response reported to that component. Encryption and/or unique addressing of data streams or sub-streams can be used to hide the private variables within the messaging queues.

The user devices 106 and/or supervisor devices 110 communicate with the server 102 through security and/or integration hardware 410. The communication with security and/or integration hardware 410 can be encrypted or not. For example, a socket using a TCP connection could be used. In addition to TCP, other transport layer protocols like SCTP and UDP could be used in some embodiments to intake the gathered information. A protocol such as SSL could be used to protect the information over the TCP connection. Authentication and authorization can be performed to any user devices 106 and/or supervisor device interfacing to the server 102. The security and/or integration hardware 410 receives the information from one or several of the user devices 106 and/or the supervisor devices 110 by providing the API and any encryption, authorization, and/or authentication. In some cases, the security and/or integration hardware 410 reformats or rearranges this received information The messaging bus 412, also referred to herein as a messaging queue or a messaging channel, can receive information from the internal components of the server 102 and/or components of the content distribution network 100 outside of the server 102 and distribute the gathered information as a data stream to any processing subscribers that have requested the data stream from the messaging queue 412. As indicated in FIG. 4, processing subscribers are indicated by a connector to the messaging bus 412, the connector having an arrow head pointing away from the messaging bus 412. Only data streams within the messaging queue 412 that a particular processing subscriber has subscribed to may be read by that processing subscriber if received at all. Gathered information sent to the messaging queue 412 is processed and returned in a data stream in a fraction of a second by the messaging queue 412. Various multicasting and routing techniques can be used to distribute a data stream from the messaging queue 412 that a number of processing subscribers have requested. Protocols such as Multicast or multiple Unicast could be used to distributed streams within the messaging queue 412. Additionally, transport layer protocols like TCP, SCTP and UDP could be used in various embodiments.

Through the CC interface 338, an external or internal processing subscriber can be assigned one or more data streams within the messaging queue 412. A data stream is a particular type of messages in a particular category. For example, a data stream can comprise all of the data reported to the messaging bus 412 by a designated set of components. One or more processing subscribers could subscribe and receive the data stream to process the information and make a decision and/or feed the output from the processing as gathered information fed back into the messaging queue 412. Through the CC interface 338 a developer can search the available data streams or specify a new data stream and its API. The new data stream might be determined by processing a number of existing data streams with a processing subscriber.

The CDN 110 has internal processing subscribers 402-408 that process assigned data streams to perform functions within the server 102. Internal processing subscribers 402-408 could perform functions such as providing content to a user, receiving a response from a user, determining the correctness of the received response, updating one or several models based on the correctness of the response, recommending new content for providing to one or several users, or the like. The internal processing subscribers 402-408 can decide filtering and weighting of records from the data stream. To the extent that decisions are made based upon analysis of the data stream, each data record is time stamped to reflect when the information was gathered such that additional credibility could be given to more recent results, for example. Other embodiments may filter out records in the data stream that are from an unreliable source or stale. For example, a particular contributor of information may prove to have less than optimal gathered information and that could be weighted very low or removed altogether.

Internal processing subscribers 402-408 may additionally process one or more data streams to provide different information to feed back into the messaging queue 412 to be part of a different data stream. For example, hundreds of user devices 106 could provide responses that are put into a data stream on the messaging queue 412. An internal processing subscriber 402-408 could receive the data stream and process it to determine the difficulty of one or several data packets provided to one or several users and supply this information back onto the messaging queue 412 for possible use by other internal and external processing subscribers.

As mentioned above, the CC interface 338 allows the CDN 110 to query historical messaging queue 412 information. An archive data agent 336 listens to the messaging queue 412 to store data streams in a historical database 334. The historical database 334 may store data streams for varying amounts of time and may not store all data streams. Different data streams may be stored for different amounts of time.

With regards to the components 402-48, the content management server(s) 102 may include various server hardware and software components that manage the content resources within the content distribution network 100 and provide interactive and adaptive content to users on various user devices 106. For example, content management server (s) 102 may provide instructions to and receive information from the other devices within the content distribution network 100, in order to manage and transmit content resources, user data, and server or client applications executing within the network 100.

A content management server 102 may include a packet selection system 402. The packet selection system 402 may be implemented using dedicated hardware within the content distribution network 100 (e.g., a packet selection server 402), or using designated hardware and software resources within a shared content management server 102. In some embodiments, the packet selection system 402 may adjust the selection and adaptive capabilities of content resources to match the needs and desires of the users receiving the content. For example, the packet selection system 402 may query various data stores and servers 104 to retrieve user information, such as user preferences and characteristics (e.g., from a user profile data store 301), user access restrictions to content recourses (e.g., from a content access data store 306), previous user results and content evaluations (e.g., from an evaluation data store 308), and the like. Based on the retrieved information from data stores 104 and other data sources, the packet selection system 402 may modify content resources for individual users.

In some embodiments, the packet selection system 402 can include a recommendation engine, also referred to herein as an adaptive recommendation engine. In some embodiments, the recommendation engine can select one or several pieces of content, also referred to herein as data packets, for providing to a user. These data packets can be selected based on, for example, the information retrieved from the database server 104 including, for example, the user profile database 301, the content library database 303, the model database 309, or the like. In some embodiments, these one or several data packets can be adaptively selected and/or selected according to one or several selection rules. In one embodiment, for example, the recommendation engine can retrieve information from the user profile database 301 identifying, for example, a skill level of the user. The recommendation engine can further retrieve information from the content library database 303 identifying, for example, potential data packets for providing to the user and the difficulty of those data packets and/or the skill level associated with those data packets.

The recommendation engine can identify one or several potential data packets for providing and/or one or several data packets for providing to the user based on, for example, one or several rules, models, predictions, or the like. The recommendation engine can use the skill level of the user to generate a prediction of the likelihood of one or several users providing a desired response to some or all of the potential data packets. In some embodiments, the recommendation engine can pair one or several data packets with selection criteria that may be used to determine which packet should be delivered to a student-user based on one or several received responses from that student-user. In some embodiments, one or several data packets can be eliminated from the pool of potential data packets if the prediction indicates either too high a likelihood of a desired response or too low a likelihood of a desired response. In some embodiments, the recommendation engine can then apply one or several selection criteria to the remaining potential data packets to select a data packet for providing to the user. These one or several selection criteria can be based on, for example, criteria relating to a desired estimated time for receipt of response to the data packet, one or several content parameters, one or several assignment parameters, or the like.

A content management server 102 also may include a summary model system 404. The summary model system 404 may be implemented using dedicated hardware within the content distribution network 100 (e.g., a summary model server 404), or using designated hardware and software resources within a shared content management server 102. In some embodiments, the summary model system 404 may monitor the progress of users through various types of content resources and groups, such as media compilations, courses, or curriculums in training or educational contexts, interactive gaming environments, and the like. For example, the summary model system 404 may query one or more databases and/or data store servers 104 to retrieve user data such as associated content compilations or programs, content completion status, user goals, results, and the like.

A content management server 102 also may include a response system 406, which can include, in some embodiments, a response processor. The response system 406 may be implemented using dedicated hardware within the content distribution network 100 (e.g., a response server 406), or using designated hardware and software resources within a shared content management server 102. The response system 406 may be configured to receive and analyze information from user devices 106. For example, various ratings of content resources submitted by users may be compiled and analyzed, and then stored in a data store (e.g., a content library data store 303 and/or evaluation data store 308) associated with the content. In some embodiments, the response server 406 may analyze the information to determine the effectiveness or appropriateness of content resources with, for example, a subject matter, an age group, a skill level, or the like. In some embodiments, the response system 406 may provide updates to the packet selection system 402 or the summary model system 404, with the attributes of one or more content resources or groups of resources within the network 100. The response system 406 also may receive and analyze user evaluation data from user devices 106, supervisor devices 110, and administrator servers 116, etc. For instance, response system 406 may receive, aggregate, and analyze user evaluation data for different types of users (e.g., end users, supervisors, administrators, etc.) in different contexts (e.g., media consumer ratings, trainee or student comprehension levels, teacher effectiveness levels, gamer skill levels, etc.).

In some embodiments, the response system 406 can be further configured to receive one or several responses from the user and analyze these one or several responses. In some embodiments, for example, the response system 406 can be configured to translate the one or several responses into one or several observables. As used herein, an observable is a characterization of a received response. In some embodiments, the translation of the one or several response into one or several observables can include determining whether the one or several response are correct responses, also referred to herein as desired responses, or are incorrect responses, also referred to herein as undesired responses. In some embodiments, the translation of the one or several response into one or several observables can include characterizing the degree to which one or several response are desired responses and/or undesired responses. In some embodiments, one or several values can be generated by the response system 406 to reflect user performance in responding to the one or several data packets. In some embodiments, these one or several values can comprise one or several scores for one or several responses and/or data packets.

A content management server 102 also may include a presentation system 408. The presentation system 408 may be implemented using dedicated hardware within the content distribution network 100 (e.g., a presentation server 408), or using designated hardware and software resources within a shared content management server 102. The presentation system 408 can include a presentation engine that can be, for example, a software module running on the content delivery system.

The presentation system 408, also referred to herein as the presentation module or the presentation engine, may receive content resources from the packet selection system 402 and/or from the summary model system 404, and provide the resources to user devices 106. The presentation system 408 may determine the appropriate presentation format for the content resources based on the user characteristics and preferences, and/or the device capabilities of user devices 106. If needed, the presentation system 408 may convert the content resources to the appropriate presentation format and/or compress the content before transmission. In some embodiments, the presentation system 408 may also determine the appropriate transmission media and communication protocols for transmission of the content resources.

In some embodiments, the presentation system 408 may include specialized security and integration hardware 410, along with corresponding software components to implement the appropriate security features content transmission and storage, to provide the supported network and client access models, and to support the performance and scalability requirements of the network 100. The security and integration layer 410 may include some or all of the security and integration components 208 discussed above in FIG. 2, and may control the transmission of content resources and other data, as well as the receipt of requests and content interactions, to and from the user devices 106, supervisor devices 110, administrator servers 116, and other devices in the network 100.

Figure 5:
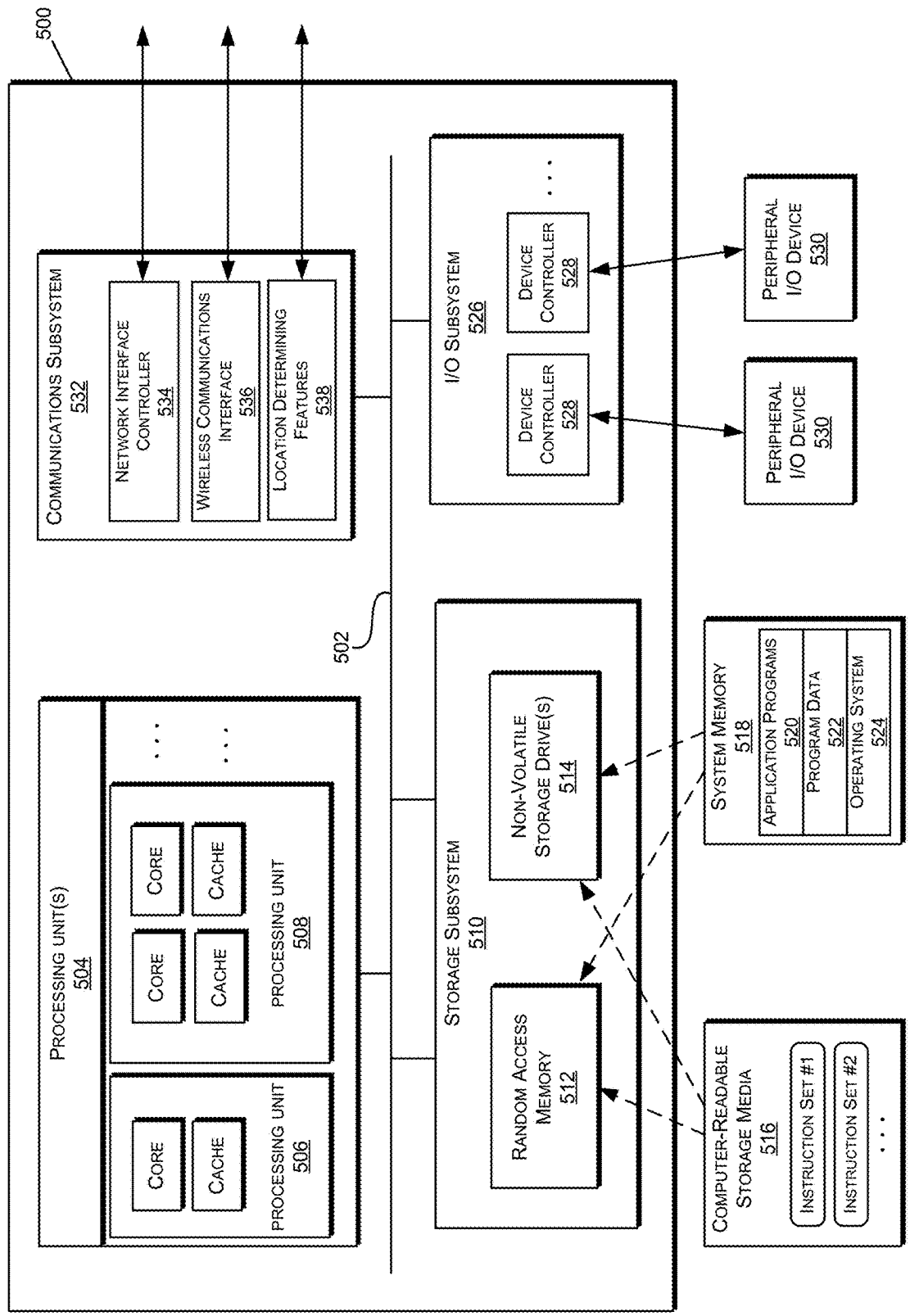
FIG. 5 is a block diagram illustrating the physical and logical components of a special-purpose computer device within a content distribution network.

With reference now to FIG. 5, a block diagram of an illustrative computer system is shown. The system 500 may correspond to any of the computing devices or servers of the content distribution network 100 described above, or any other computing devices described herein, and specifically can include, for example, one or several of the user devices 106, the supervisor device 110, and/or any of the servers 102, 104, 108, 112, 114, 116. In this example, computer system 500 includes processing units 504 that communicate with a number of peripheral subsystems via a bus subsystem 502. These peripheral subsystems include, for example, a storage subsystem 510, an I/O subsystem 526, and a communications subsystem 532.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which may be implemented as one or more integrated circuits (e.g., a conventional microprocessor or microcontroller), controls the operation of computer system 500. One or more processors, including single core and/or multicore processors, may be included in processing unit 504. As shown in the figure, processing unit 504 may be implemented as one or more independent processing units 506 and/or 508 with single or multicore processors and processor caches included in each processing unit. In other embodiments, processing unit 504 may also be implemented as a quad-core processing unit or larger multicore designs (e.g., hexa-core processors, octo-core processors, ten-core processors, or greater.

Processing unit 504 may execute a variety of software processes embodied in program code, and may maintain multiple concurrently executing programs or processes. At any given time, some or all of the program code to be executed can be resident in processor(s) 504 and/or in storage subsystem 510. In some embodiments, computer system 500 may include one or more specialized processors, such as digital signal processors (DSPs), outboard processors, graphics processors, application-specific processors, and/or the like.

I/O subsystem 526 may include device controllers 528 for one or more user interface input devices and/or user interface output devices 530. User interface input and output devices 530 may be integral with the computer system 500 (e.g., integrated audio/video systems, and/or touchscreen displays), or may be separate peripheral devices which are attachable/detachable from the computer system 500. The I/O subsystem 526 may provide one or several outputs to a user by converting one or several electrical signals to user perceptible and/or interpretable form, and may receive one or several inputs from the user by generating one or several electrical signals based on one or several user-caused interactions with the I/O subsystem such as the depressing of a key or button, the moving of a mouse, the interaction with a touchscreen or trackpad, the interaction of a sound wave with a microphone, or the like.

Input devices 530 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 530 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 530 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 530 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, light-emitting diode (LED) displays, projection devices, touch screens, and the like. In general, use of the term "output device" is intended to include all possible types of devices and mechanisms for outputting information from computer system 500 to a user or other computer. For example, output devices 530 may include, without limitation, a variety of display devices that visually convey text, graphics, and audio/video information such as monitors, printers, speakers, headphones, automotive navigation systems, plotters, voice output devices, and modems.

Computer system 500 may comprise one or more storage subsystems 510, comprising hardware and software components used for storing data and program instructions, such as system memory 518 and computer-readable storage media 516. The system memory 518 and/or computer-readable storage media 516 may store program instructions that are loadable and executable on processing units 504, as well as data generated during the execution of these programs.

Depending on the configuration and type of computer system 500, system memory 518 may be stored in volatile memory (such as random access memory (RAM) 512) and/or in non-volatile storage drives 514 (such as read-only memory (ROM), flash memory, etc.). The RAM 512 may contain data and/or program modules that are immediately accessible to and/or presently being operated and executed by processing units 504. In some implementations, system memory 518 may include multiple different types of memory, such as static random access memory (SRAM) or dynamic random access memory (DRAM). In some implementations, a basic input/output system (BIOS), containing the basic routines that help to transfer information between elements within computer system 500, such as during start-up, may typically be stored in the non-volatile storage drives 514. By way of example, and not limitation, system memory 518 may include application programs 520, such as client applications, Web browsers, mid-tier applications, server applications, etc., program data 522, and an operating system 524.

Storage subsystem 510 also may provide one or more tangible computer-readable storage media 516 for storing the basic programming and data constructs that provide the functionality of some embodiments. Software (programs, code modules, instructions) that when executed by a processor provide the functionality described herein may be stored in storage subsystem 510. These software modules or instructions may be executed by processing units 504. Storage subsystem 510 may also provide a repository for storing data used in accordance with the present invention.

Storage subsystem 300 may also include a computer-readable storage media reader that can further be connected to computer-readable storage media 516. Together and, optionally, in combination with system memory 518, computer-readable storage media 516 may comprehensively represent remote, local, fixed, and/or removable storage devices plus storage media for temporarily and/or more permanently containing, storing, transmitting, and retrieving computer-readable information.

Computer-readable storage media 516 containing program code, or portions of program code, may include any appropriate media known or used in the art, including storage media and communication media, such as, but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 500.

By way of example, computer-readable storage media 516 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 516 may include, but is not limited to, Zip® drives, flash memory cards, universal serial bus (USB) flash drives, secure digital (SD) cards, DVD disks, digital video tape, and the like. Computer-readable storage media 516 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Communications subsystem 532 may provide a communication interface from computer system 500 and external computing devices via one or more communication networks, including local area networks (LANs), wide area networks (WANs) (e.g., the Internet), and various wireless telecommunications networks. As illustrated in FIG. 5, the communications subsystem 532 may include, for example, one or more network interface controllers (NICs) 534, such as Ethernet cards, Asynchronous Transfer Mode NICs, Token Ring NICs, and the like, as well as one or more wireless communications interfaces 536, such as wireless network interface controllers (WNICs), wireless network adapters, and the like. As illustrated in FIG. 5, the communications subsystem 532 may include, for example, one or more location determining features 538 such as one or several navigation system features and/or receivers, and the like. Additionally and/or alternatively, the communications subsystem 532 may include one or more modems (telephone, satellite, cable, ISDN), synchronous or asynchronous digital subscriber line (DSL) units, FireWire® interfaces, USB® interfaces, and the like. Communications subsystem 536 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 532 may be detachable components coupled to the computer system 500 via a computer network, a FireWire® bus, or the like, and/or may be physically integrated onto a motherboard of the computer system 500. Communications subsystem 532 also may be implemented in whole or in part by software.

In some embodiments, communications subsystem 532 may also receive input communication in the form of structured and/or unstructured data feeds, event streams, event updates, and the like, on behalf of one or more users who may use or access computer system 500. For example, communications subsystem 532 may be configured to receive data feeds in real-time from users of social networks and/or other communication services, web feeds such as Rich Site Summary (RSS) feeds, and/or real-time updates from one or more third party information sources (e.g., data aggregators 313). Additionally, communications subsystem 532 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 532 may output such structured and/or unstructured data feeds, event streams, event updates, and the like to one or more data stores 104 that may be in communication with one or more streaming data source computers coupled to computer system 500.

Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 6:
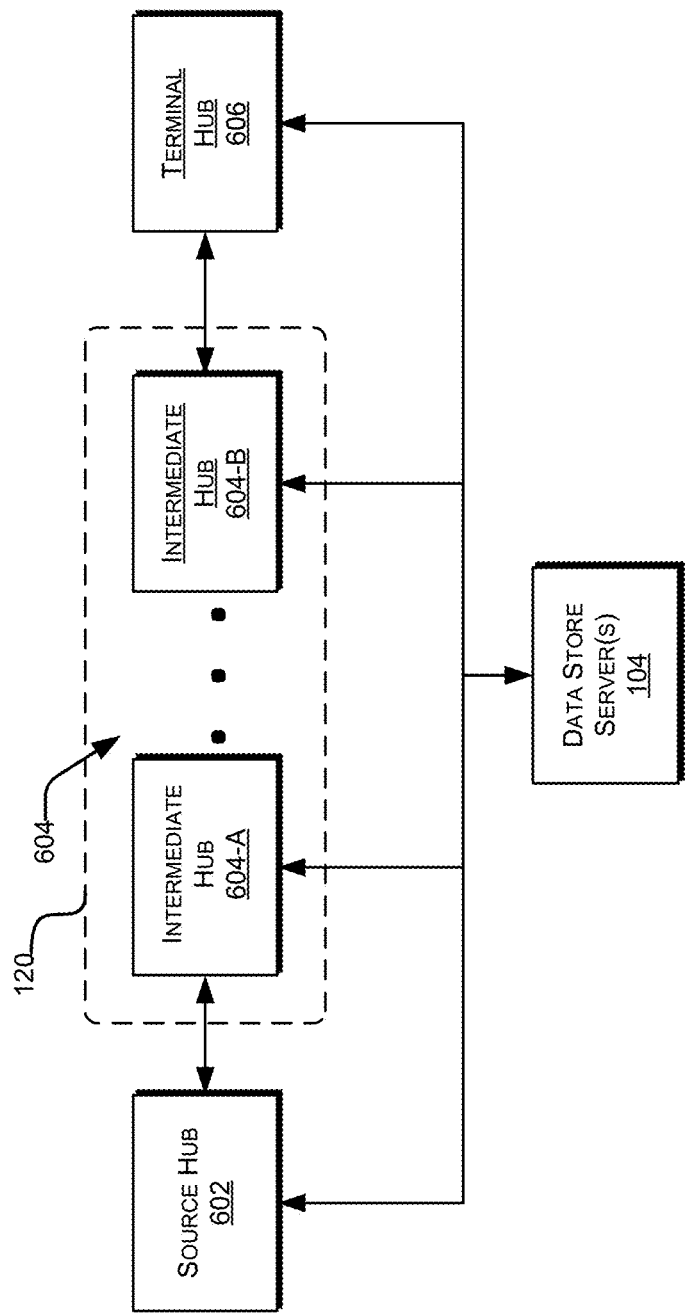
FIG. 6 is a block diagram illustrating one embodiment of the communication network.

With reference now to FIG. 6, a block diagram illustrating one embodiment of the communication network is shown. Specifically, FIG. 6 depicts one hardware configuration in which messages are exchanged between a source hub 602 and a terminal hub 606 via the communication network 120 that can include one or several intermediate hubs 604. In some embodiments, the source hub 602 can be any one or several components of the content distribution network generating and initiating the sending of a message, and the terminal hub 606 can be any one or several components of the content distribution network 100 receiving and not re-sending the message. In some embodiments, for example, the source hub 602 can be one or several of the user device 106, the supervisor device 110, and/or the server 102, and the terminal hub 606 can likewise be one or several of the user device 106, the supervisor device 110, and/or the server 102. In some embodiments, the intermediate hubs 604 can include any computing device that receives the message and resends the message to a next node.

As seen in FIG. 6, in some embodiments, each of the hubs 602, 604, 606 can be communicatingly connected with the data store 104. In such an embodiments, some or all of the hubs 602, 604, 606 can send information to the data store 104 identifying a received message and/or any sent or resent message. This information can, in some embodiments, be used to determine the completeness of any sent and/or received messages and/or to verify the accuracy and completeness of any message received by the terminal hub 606.

In some embodiments, the communication network 120 can be formed by the intermediate hubs 604. In some embodiments, the communication network 120 can comprise a single intermediate hub 604, and in some embodiments, the communication network 120 can comprise a plurality of intermediate hubs. In one embodiment, for example, and as depicted in FIG. 6, the communication network 120 includes a first intermediate hub 604-A and a second intermediate hub 604-B.

Figure 7:
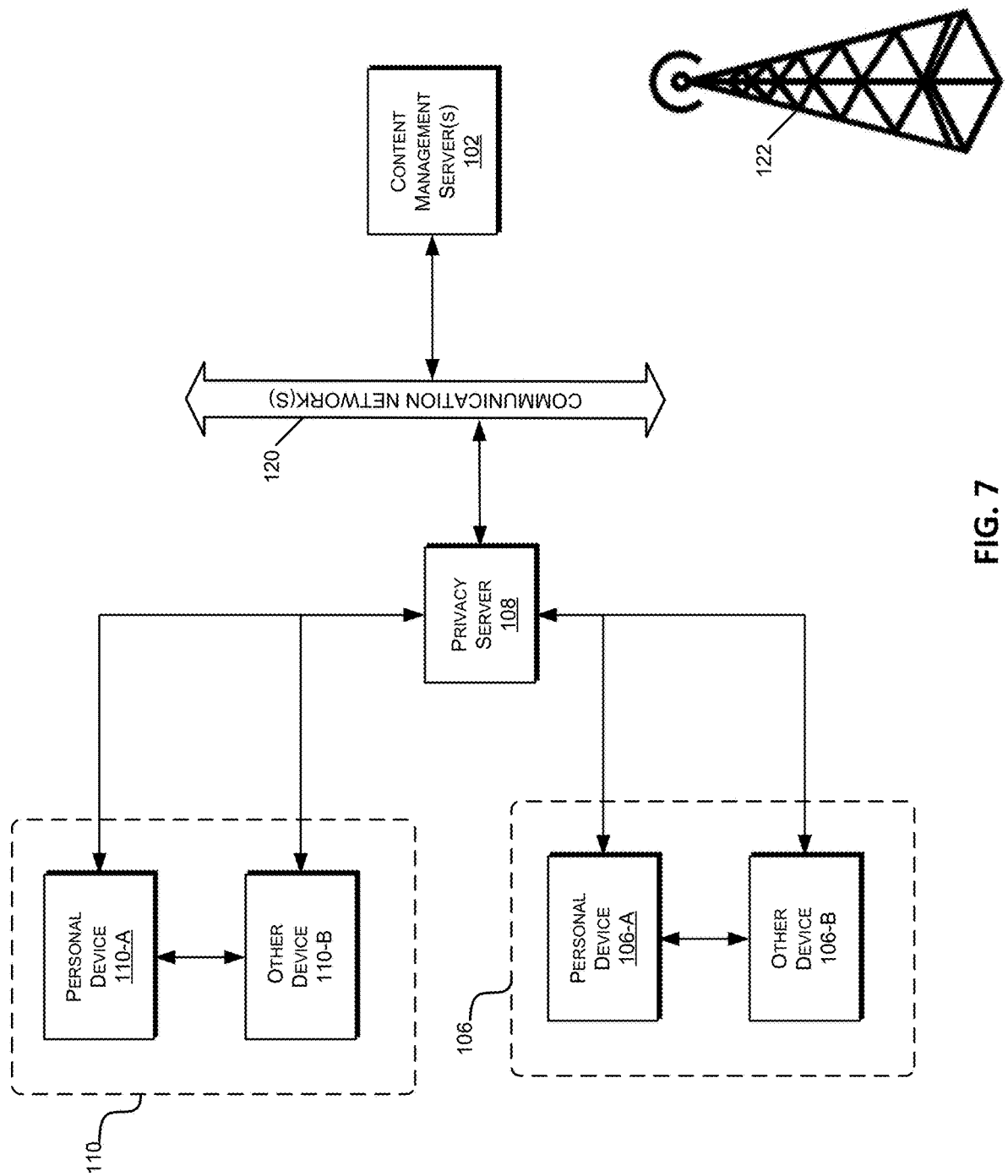
FIG. 7 is a block diagram illustrating one embodiment of user device and supervisor device communication.

With reference now to FIG. 7, a block diagram illustrating one embodiment of user device 106 and supervisor device 110 communication is shown. In some embodiments, for example, a user may have multiple devices that can connect with the content distribution network 100 to send or receive information. In some embodiments, for example, a user may have a personal device such as a mobile device, a Smartphone, a tablet, a Smartwatch, a laptop, a PC, or the like. In some embodiments, the other device can be any computing device in addition to the personal device. This other device can include, for example, a laptop, a PC, a Smartphone, a tablet, a Smartwatch, or the like. In some embodiments, the other device differs from the personal device in that the personal device is registered as such within the content distribution network 100 and the other device is not registered as a personal device within the content distribution network 100.

Specifically with respect to FIG. 7, the user device 106 can include a personal user device 106-A and one or several other user devices 106-B. In some embodiments, one or both of the personal user device 106-A and the one or several other user devices 106-B can be communicatingly connected to the content management server 102 and/or to the navigation system 122. Similarly, the supervisor device 110 can include a personal supervisor device 110-A and one or several other supervisor devices 110-B. In some embodiments, one or both of the personal supervisor device 110-A and the one or several other supervisor devices 110-B can be communicatingly connected to the content management server 102 and/or to the navigation system 122.

In some embodiments, the content distribution network can send one or more alerts to one or more user devices 106 and/or one or more supervisor devices 110 via, for example, the communication network 120. In some embodiments, the receipt of the alert can result in the launching of an application within the receiving device, and in some embodiments, the alert can include a link that, when selected, launches the application or navigates a web-browser of the device of the selector of the link to page or portal associated with the alert.

In some embodiments, for example, the providing of this alert can include the identification of one or several user devices 106 and/or student-user accounts associated with the student-user and/or one or several supervisor devices 110 and/or supervisor-user accounts associated with the supervisor-user. After these one or several devices 106, 110 and/or accounts have been identified, the providing of this alert can include determining an active device of the devices 106, 110 based on determining which of the devices 106, 110 and/or accounts are actively being used, and then providing the alert to that active device.

Specifically, if the user is actively using one of the devices 106, 110 such as the other user device 106-B and the other supervisor device 110-B, and/or accounts, the alert can be provided to the user via that other device 106-B, 110-B, and/or account that is actively being used. If the user is not actively using another device 106-B, 110-B, and/or account, a personal device 106-A, 110-A device, such as a smart phone or tablet, can be identified and the alert can be provided to this personal device 106-A, 110-A. In some embodiments, the alert can include code to direct the default device to provide an indicator of the received alert such as, for example, an aural, tactile, or visual indicator of receipt of the alert.

In some embodiments, the recipient device 106, 110 of the alert can provide an indication of receipt of the alert. In some embodiments, the presentation of the alert can include the control of the I/O subsystem 526 to, for example, provide an aural, tactile, and/or visual indicator of the alert and/or of the receipt of the alert. In some embodiments, this can include controlling a screen of the supervisor device 110 to display the alert, data contained in alert and/or an indicator of the alert.

Figure 8:
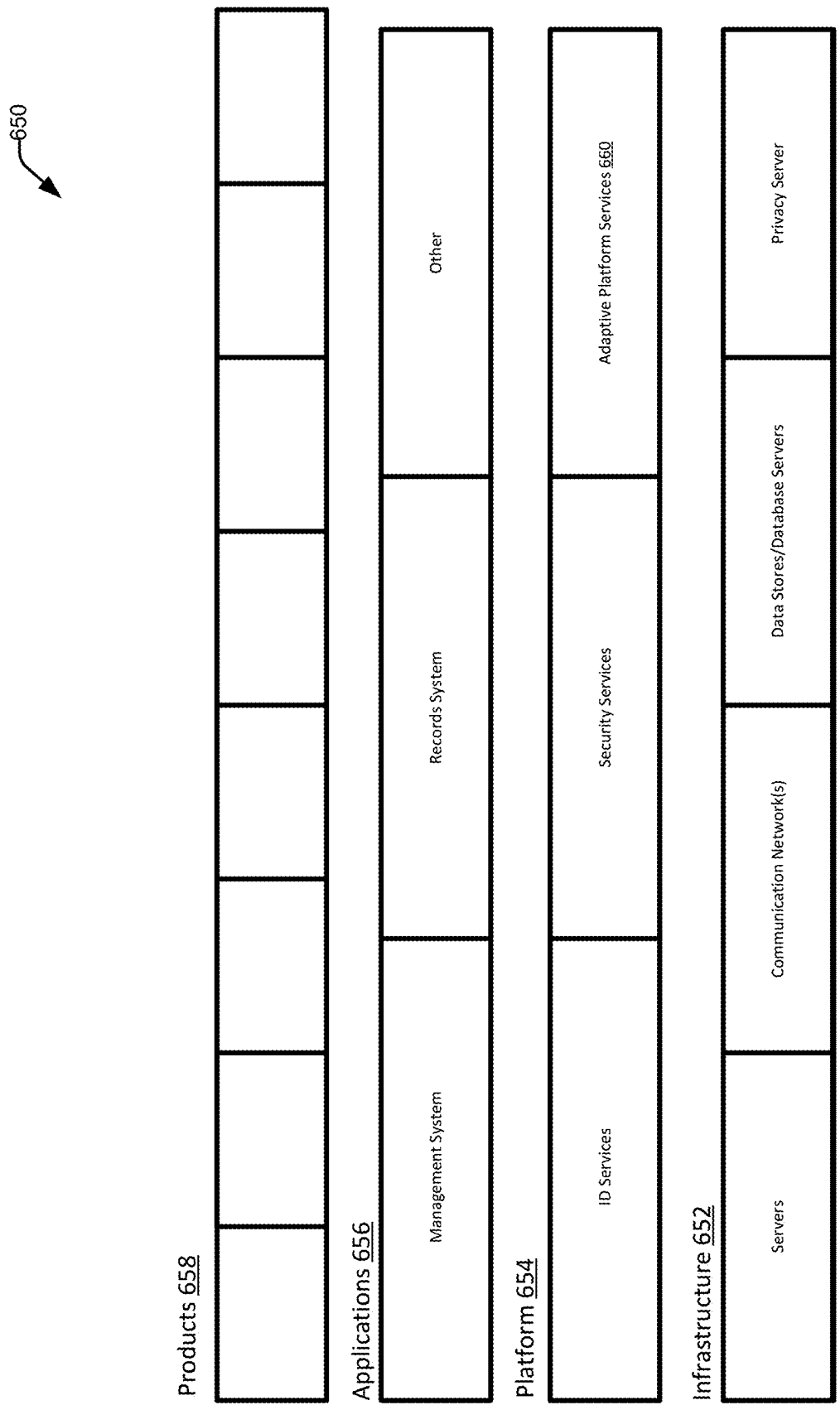
FIG. 8 is a schematic illustration of one embodiment of a computing stack.

With reference now to FIG. 8, a schematic illustration of one embodiment of an application stack, and particularly of a stack 650 is shown. In some embodiments, the content distribution network 100 can comprise a portion of the stack 650 that can include an infrastructure layer 652, a platform layer 654, an applications layer 656, and a products layer 658. In some embodiments, the stack 650 can comprise some or all of the layers, hardware, and/or software to provide one or several desired functionalities and/or productions.

As depicted in FIG. 8, the infrastructure layer 652 can include one or several servers, communication networks, data stores, privacy servers, and the like. In some embodiments, the infrastructure layer can further include one or several user devices 106 and/or supervisor devices 110 connected as part of the content distribution network.

The platform layer can include one or several platform software programs, modules, and/or capabilities. These can include, for example, identification services, security services, and/or adaptive platform services 660. In some embodiments, the identification services can, for example, identify one or several users, components of the content distribution network 100, or the like. The security services can monitor the content distribution network for one or several security threats, breaches, viruses, malware, or the like. The adaptive platform services 660 can receive information from one or several components of the content distribution network 100 and can provide predictions, models, recommendations, or the like based on that received information. The functionality of the adaptive platform services 660 will be discussed in greater detail in FIGS. 9A-9C, below.

The applications layer 656 can include software or software modules upon or in which one or several product softwares or product software modules can operate. In some embodiments, the applications layer 656 can include, for example, a management system, record system, or the like. In some embodiments, the management system can include, for example, a Learning Management System (LMS), a Content Management System (CMS), or the like. The management system can be configured to control the delivery of one or several resources to a user and/or to receive one or several responses from the user. In some embodiments, the records system can include, for example, a virtual gradebook, a virtual counselor, or the like.

The products layer can include one or several software products and/or software module products. These software products and/or software module products can provide one or several services and/or functionalities to one or several users of the software products and/or software module products.

Figure 9A:
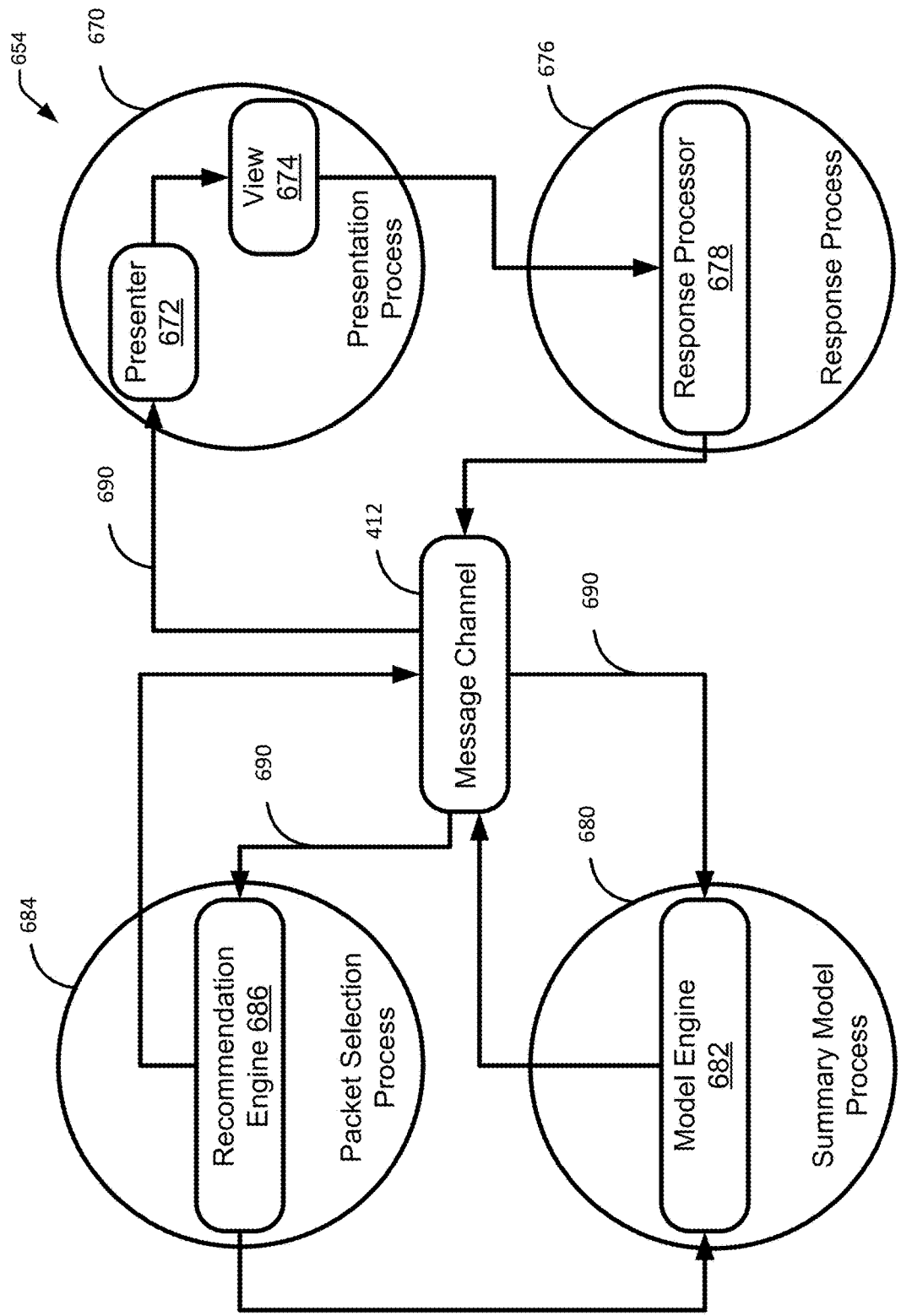
FIG. 9A is a schematic illustration of one embodiment of communication and processing flow of modules within the content distribution network.
Figure 9B:
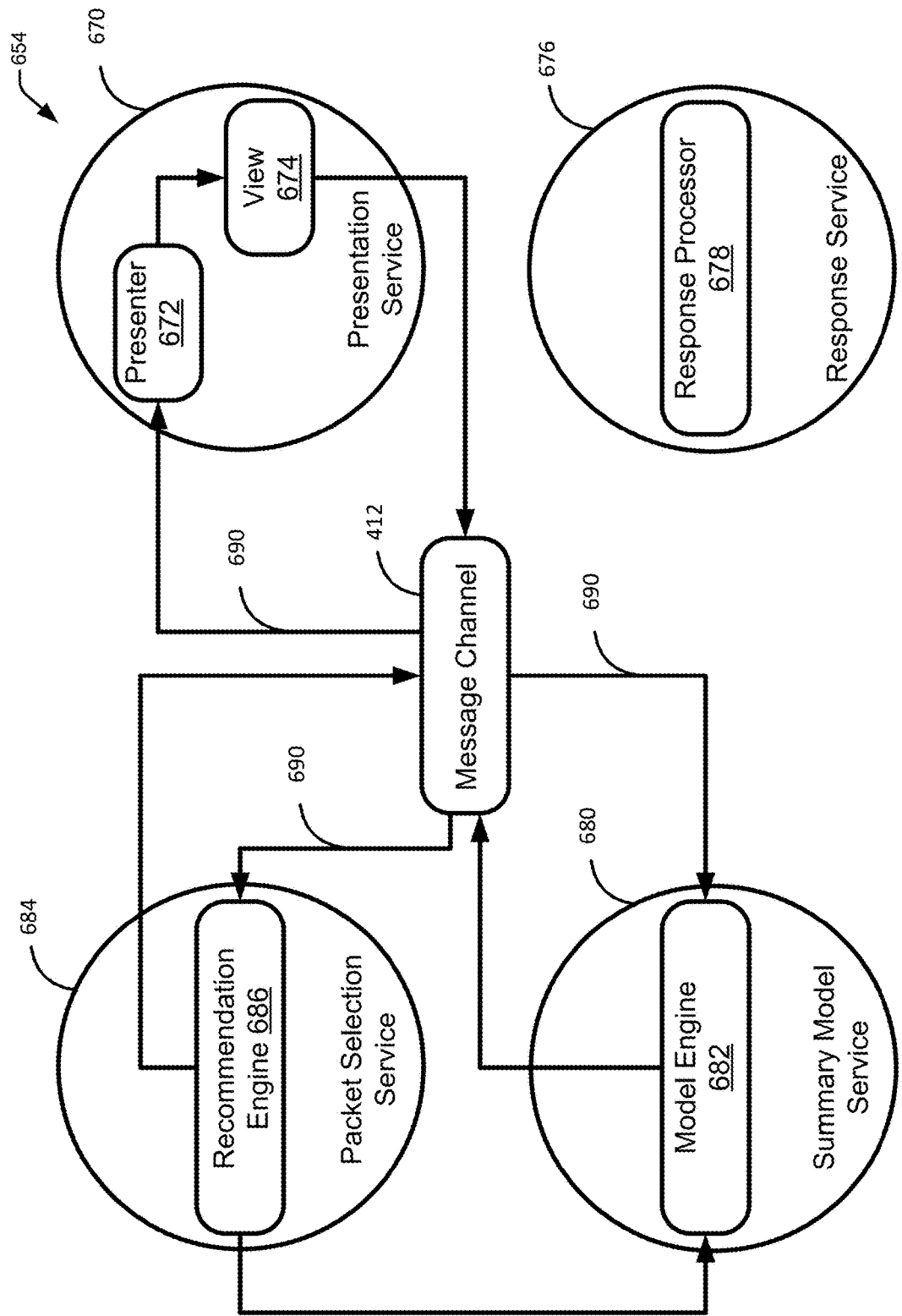
FIG. 9B is a schematic illustration of one embodiment of communication and processing flow of modules within the content distribution network.
Figure 9C:
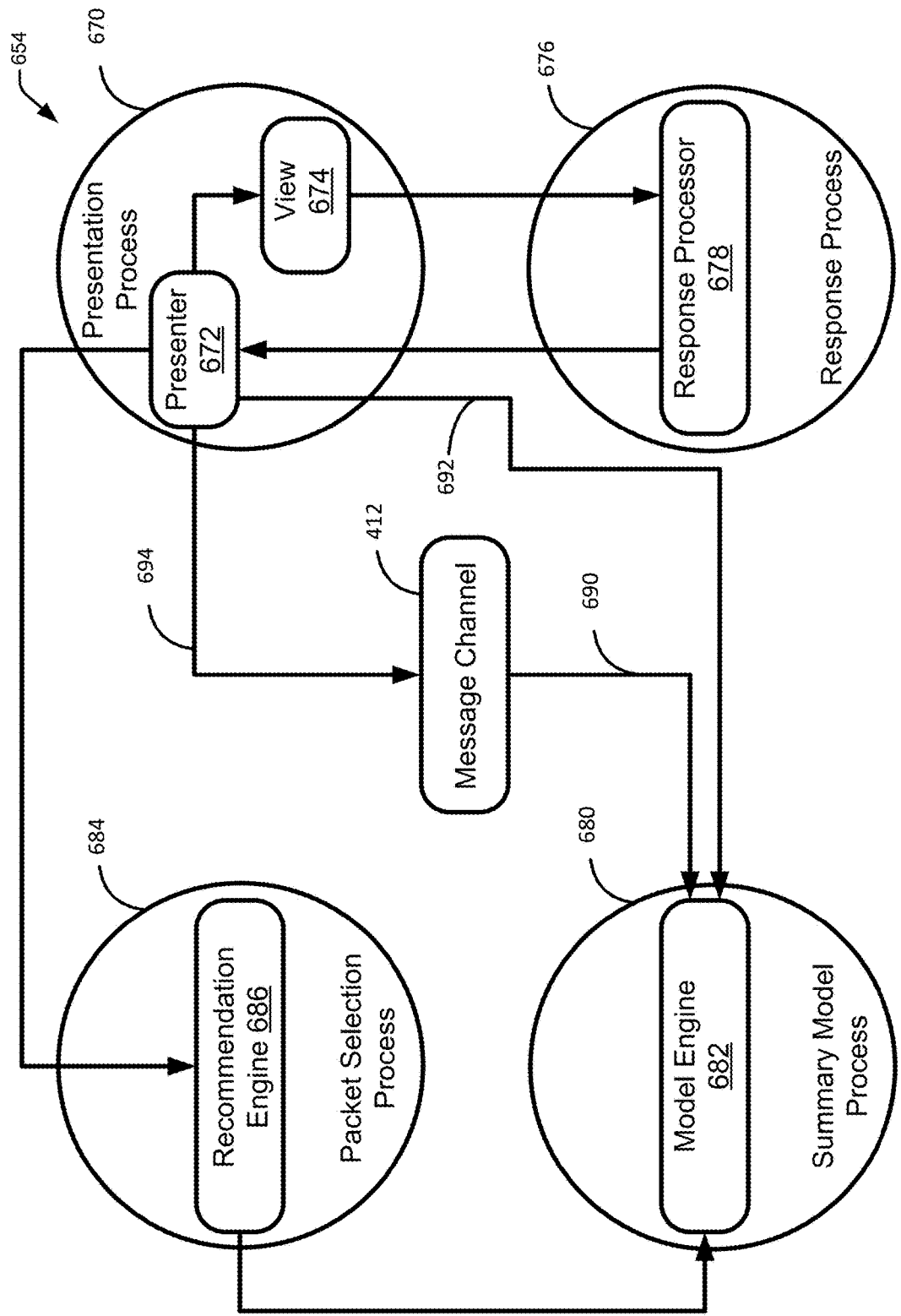
FIG. 9C is a schematic illustration of one embodiment of communication and processing flow of modules within the content distribution network.

With reference now to FIG. 9A-9C, schematic illustrations of embodiments of communication and processing flow of modules within the content distribution network 100 are shown. In some embodiments, the communication and processing can be performed in portions of the platform layer 654 and/or applications layer 656. FIG. 9A depicts a first embodiment of such communications or processing that can be in the platform layer 654 and/or applications layer 656 via the message channel 412.

The platform layer 654 and/or applications layer 656 can include a plurality of modules that can be embodied in software or hardware. In some embodiments, some or all of the modules can be embodied in hardware and/or software at a single location, and in some embodiments, some or all of these modules can be embodied in hardware and/or software at multiple locations. These modules can perform one or several processes including, for example, a presentation process 670, a response process 676, a summary model process 680, and a packet selection process 684.

The presentation process 670 can, in some embodiments, include one or several method and/or steps to deliver content to one or several user devices 106 and/or supervisor devices 110. The presentation process 670 can be performed by a presenter module 672 and a view module 674. The presenter module 672 can be a hardware or software module of the content distribution network 100, and specifically of the server 102. In some embodiments, the presenter module 672 can include one or several portions, features, and/or functionalities that are located on the server 102 and/or one or several portions, features, and/or functionalities that are located on the user device 106. In some embodiments, the presenter module 672 can be embodied in the presentation system 408.

The presenter module 672 can control the providing of content to one or several user devices 106 and/or supervisor devices 110. Specifically, the presenter module 672 can control the generation of one or several messages to provide content to one or several desired user devices 106 and/or supervisor devices 110. The presenter module 672 can further control the providing of these one or several messages to the desired one or several desired user devices 106 and/or supervisor devices 110. Thus, in some embodiments, the presenter module 672 can control one or several features of the communications subsystem 532 to generate and send one or several electrical signals comprising content to one or several user devices 106 and/or supervisor devices 110.

In some embodiments, the presenter module 672 can control and/or manage a portion of the presentation functions of the presentation process 670, and can specifically manage an "outer loop" of presentation functions. As used herein, the outer loop refers to tasks relating to the tracking of a user's progress through all or a portion of a group of data packets. In some embodiments, this can include the identification of one or several completed data packets or nodes and/or the non-adaptive selection of one or several next data packets or nodes according to, for example, one or several fixed rules. Such non-adaptive selection does not rely on the use of predictive models, but rather on rules identifying next data packets based on data relating to the completion of one or several previously completed data packets or assessments and/or whether one or several previously completed data packets were successfully completed.

In some embodiments, and due to the management of the outer loop of presentation functions including the non-adaptive selection of one or several next data packets, nodes, or tasks by the presenter module, the presenter module can function as a recommendation engine referred to herein as a first recommendation engine or a rules-based recommendation engine. In some embodiments, the first recommendation engine can be configured to select a next node for a user based on one or all of: the user's current location in the content network; potential next nodes; the user's history including the user's previous responses; and one or several guard conditions associated with the potential next nodes. In some embodiments, a guard condition defines one or several prerequisites for entry into, or exit from, a node.

In some embodiments, the presenter module 672 can include a portion located on the server 102 and/or a portion located on the user device 106. In some embodiments, the portion of the presenter module 672 located on the server 102 can receive data packet information and provide a subset of the received data packet information to the portion of the presenter module 672 located on the user device 106. In some embodiments, this segregation of functions and/or capabilities can prevent solution data from being located on the user device 106 and from being potentially accessible by the user of the user device 106.

In some embodiments, the portion of the presenter module 672 located on the user device 106 can be further configured to receive the subset of the data packet information from the portion of the presenter module 672 located on the server 102 and provide that subset of the data packet information to the view module 674. In some embodiments, the portion of the presenter module 672 located on the user device 106 can be further configured to receive a content request from the view module 674 and to provide that content request to the portion of the presenter module 674 located on the server 102.

The view module 674 can be a hardware or software module of some or all of the user devices 106 and/or supervisor devices 110 of the content distribution network 100. The view module 674 can receive one or several electrical signals and/or communications from the presenter module 672 and can provide the content received in those one or several electrical signals and/or communications to the user of the user device 106 and/or supervisor device 110 via, for example, the I/O subsystem 526.

In some embodiments, the view module 674 can control and/or monitor an "inner loop" of presentation functions. As used herein, the inner loop refers to tasks relating to the tracking and/or management of a user's progress through a data packet. This can specifically relate to the tracking and/or management of a user's progression through one or several pieces of content, questions, assessments, and/or the like of a data packet. In some embodiments, this can further include the selection of one or several next pieces of content, next questions, next assessments, and/or the like of the data packet for presentation and/or providing to the user of the user device 106.

In some embodiments, one or both of the presenter module 672 and the view module 674 can comprise one or several presentation engines. In some embodiments, these one or several presentation engines can comprise different capabilities and/or functions. In some embodiments, one of the presentation engines can be configured to track the progress of a user through a single data packet, task, content item, or the like, and in some embodiments, one of the presentation engines can track the progress of a user through a series of data packets, tasks, content items, or the like.

The response process 676 can comprise one or several methods and/or steps to evaluate a response. In some embodiments, this can include, for example, determining whether the response comprises a desired response and/or an undesired response. In some embodiments, the response process 676 can include one or several methods and/or steps to determine the correctness and/or incorrectness of one or several received responses. In some embodiments, this can include, for example, determining the correctness and/or incorrectness of a multiple choice response, a true/false response, a short answer response, an essay response, or the like. In some embodiments, the response processor can employ, for example, natural language processing, semantic analysis, or the like in determining the correctness or incorrectness of the received responses.

In some embodiments, the response process 676 can be performed by a response processor 678. The response processor 678 can be a hardware or software module of the content distribution network 100, and specifically of the server 102. In some embodiments, the response processor 678 can be embodied in the response system 406. In some embodiments, the response processor 678 can be communicatingly connected to one or more of the modules of the presentation process 670 such as, for example, the presenter module 672 and/or the view module 674. In some embodiments, the response processor 678 can be communicatingly connected with, for example, the message channel 412 and/or other components and/or modules of the content distribution network 100.

The summary model process 680 can comprise one or several methods and/or steps to generate and/or update one or several models. In some embodiments, this can include, for example, implementing information received either directly or indirectly from the response processor 678 to update one or several models. In some embodiments, the summary model process 680 can include the update of a model relating to one or several user attributes such as, for example, a user skill model, a user knowledge model, a learning style model, or the like. In some embodiments, the summary model process 680 can include the update of a model relating to one or several content attributes including attributes relating to a single content item and/or data packet and/or attributes relating to a plurality of content items and/or data packets. In some embodiments, these models can relate to an attribute of the one or several data packets such as, for example, difficulty, discrimination, required time, or the like.

In some embodiments, the summary model process 680 can be performed by the model engine 682. In some embodiments, the model engine 682 can be a hardware or software module of the content distribution network 100, and specifically of the server 102. In some embodiments, the model engine 682 can be embodied in the summary model system 404.

In some embodiments, the model engine 682 can be communicatingly connected to one or more of the modules of the presentation process 760 such as, for example, the presenter module 672 and/or the view module 674, can be connected to the response processor 678 and/or the recommendation. In some embodiments, the model engine 682 can be communicatingly connected to the message channel 412 and/or other components and/or modules of the content distribution network 100.

The packet selection process 684 can comprise one or several steps and/or methods to identify and/or select a data packet for presentation to a user. In some embodiments, this data packet can comprise a plurality of data packets. In some embodiments, this data packet can be selected according to one or several models updated as part of the summary model process 680. In some embodiments, this data packet can be selected according to one or several rules, probabilities, models, or the like. In some embodiments, the one or several data packets can be selected by the combination of a plurality of models updated in the summary model process 680 by the model engine 682. In some embodiments, these one or several data packets can be selected by a recommendation engine 686. The recommendation engine 686 can be a hardware or software module of the content distribution network 100, and specifically of the server 102. In some embodiments, the recommendation engine 686 can be embodied in the packet selection system 402. In some embodiments, the recommendation engine 686 can be communicatingly connected to one or more of the modules of the presentation process 670, the response process 676, and/or the summary model process 680 either directly and/or indirectly via, for example, the message channel.

In some embodiments, and as depicted in FIG. 9A, a presenter module 672 can receive a data packet for presentation to a user device 106. This data packet can be received, either directly or indirectly, from a recommendation engine 686. In some embodiments, for example, the presenter module 672 can receive a data packet for providing to a user device 106 from the recommendation engine 686, and in some embodiments, the presenter module 672 can receive an identifier of a data packet for providing to a user device 106 via a view module 674. This can be received from the recommendation engine 686 via a message channel 412. Specifically, in some embodiments, the recommendation engine 686 can provide data to the message channel 412 indicating the identification and/or selection of a data packet for providing to a user via a user device 106. In some embodiments, this data indicating the identification and/or selection of the data packet can identify the data packet and/or can identify the intended recipient of the data packet.

The message channel 412 can output this received data in the form of a data stream 690 which can be received by, for example, the presenter module 672, the model engine 682, and/or the recommendation engine 686. In some embodiments, some or all of: the presenter module 672, the model engine 682, and/or the recommendation engine 686 can be configured to parse and/or filter the data stream 690 to identify data and/or events relevant to their operation. Thus, for example, the presenter module 672 can be configured to parse the data stream for information and/or events relevant to the operation of the presenter module 672.

In some embodiments, the presenter module 672 can, extract the data packet from the data stream 690 and/or extract data identifying the data packet and/or indicating the selecting of a data packet from the data stream. In the event that data identifying the data packet is extracted from the data stream 690, the presenter module 672 can request and receive the data packet from the database server 104, and specifically from the content library database 303. In embodiments in which data indicating the selection of a data packet is extracted from the data stream 690, the presenter module 672 can request and receive identification of the data packet from the recommendation engine 686 and then request and receive the data packet from the database server 104, and specifically from the content library database 303, and in some embodiments in which data indicating the selection of a data packet is extracted from the data stream 690, the presenter module 672 can request and receive the data packet from the recommendation engine 686.

The presenter module can then, provide the data packet and/or portions of the data packet to the view module 674. In some embodiments, for example, the presenter module 672 can retrieve one or several rules and/or conditions that can be, for example, associated with the data packet and/or stored in the database server 104. In some embodiments, these rules and/or conditions can identify portions of a data packet for providing to the view module 674 and/or portions of a data packet to not provide to the view module 674. In some embodiments, for example, sensitive portions of a data packet, such as, for example, solution information to any questions associated with a data packet, is not provided to the view module 674 to prevent the possibility of undesired access to those sensitive portions of the data packet. Thus, in some embodiments, the one or several rules and/or conditions can identify portions of the data packet for providing to the view module 674 and/or portions of the data packet for not providing to the view module.

In some embodiments, the presenter module 672 can, according to the one or more rules and/or conditions, generate and transmit an electronic message containing all or portions of the data packet to the view module 674. The view module 674 can receive these all or portions of the data packet and can provide all or portions of this information to the user of the user device 106 associated with the view module 674 via, for example, the I/O subsystem 526. In some embodiments, as part of the providing of all or portions of the data packet to the user of the view module 674, one or several user responses can be received by the view module 674. In some embodiments, these one or several user responses can be received via the I/O subsystem 526 of the user device 106.

After one or several user responses have been received, the view module 674 can provide the one or several user responses to the response processor 678. In some embodiments, these one or several responses can be directly provided to the response processor 678, and in some embodiments, these one or several responses can be provided indirectly to the response processor 678 via the message channel 412.

After the response processor 678 receives the one or several responses, the response processor 678 can determine whether the responses are desired responses and/or the degree to which the received responses are desired responses. In some embodiments, the response processor can make this determination via, for example, use of one or several techniques, including, for example, natural language processing (NLP), semantic analysis, or the like.

In some embodiments, the response processor can determine whether a response is a desired response and/or the degree to which a response is a desired response with comparative data which can be associated with the data packet. In some embodiments, this comparative data can comprise, for example, an indication of a desired response and/or an indication of one or several undesired responses, a response key, a response rubric comprising one or several criterion for determining the degree to which a response is a desired response, or the like. In some embodiments, the comparative data can be received as a portion of and/or associated with a data packet. In some embodiments, the comparative data can be received by the response processor 678 from the presenter module 672 and/or from the message channel 412. In some embodiments, the response data received from the view module 674 can comprise data identifying the user and/or the data packet or portion of the data packet with which the response is associated. In some embodiments in which the response processor 678 merely receives data identifying the data packet and/or portion of the data packet associated with the one or several responses, the response processor 678 can request and/or receive comparative data from the database server 104, and specifically from the content library database 303 of the database server 104.

After the comparative data has been received, the response processor 678 determines whether the one or several responses comprise desired responses and/or the degree to which the one or several responses comprise desired responses. The response processor can then provide the data characterizing whether the one or several responses comprises desired responses and/or the degree to which the one or several responses comprise desired responses to the message channel 412. The message channel can, as discussed above, include the output of the response processor 678 in the data stream 690 which can be constantly output by the message channel 412.

In some embodiments, the model engine 682 can subscribe to the data stream 690 of the message channel 412 and can thus receive the data stream 690 of the message channel 412 as indicated in FIG. 9A. The model engine 682 can monitor the data stream 690 to identify data and/or events relevant to the operation of the model engine. In some embodiments, the model engine 682 can monitor the data stream 690 to identify data and/or events relevant to the determination of whether a response is a desired response and/or the degree to which a response is a desired response.

When a relevant event and/or relevant data is identified by the model engine, the model engine 682 can take the identified relevant event and/or relevant data and modify one or several models. In some embodiments, this can include updating and/or modifying one or several models relevant to the user who provided the responses, updating and/or modifying one or several models relevant to the data packet associated with the responses, and/or the like. In some embodiments, these models can be retrieved from the database server 104, and in some embodiments, can be retrieved from the model data source 309 of the database server 104.

After the models have been updated, the updated models can be stored in the database server 104. In some embodiments, the model engine 682 can send data indicative of the event of the completion of the model update to the message channel 412. The message channel 412 can incorporate this information into the data stream 690 which can be received by the recommendation engine 686. The recommendation engine 686 can monitor the data stream 690 to identify data and/or events relevant to the operation of the recommendation engine 686. In some embodiments, the recommendation engine 686 can monitor the data stream 690 to identify data and/or events relevant to the updating of one or several models by the model engine 682.

When the recommendation engine 686 identifies information in the data stream 690 indicating the completion of the summary model process 680 for models relevant to the user providing the response and/or for models relevant to the data packet provided to the user, the recommendation engine 686 can identify and/or select a next data packet for providing to the user and/or to the presentation process 470. In some embodiments, this selection of the next data packet can be performed according to one or several rules and/or conditions. After the next data packet has been selected, the recommendation engine 686 can provide information to the model engine 682 identifying the next selected data packet and/or to the message channel 412 indicating the event of the selection of the next content item. After the message channel 412 receives information identifying the selection of the next content item and/or receives the next content item, the message channel 412 can include this information in the data stream 690 and the process discussed with respect to FIG. 9A can be repeated.

With reference now to FIG. 9B, a schematic illustration of a second embodiment of communication or processing that can be in the platform layer 654 and/or applications layer 656 via the message channel 412 is shown. In the embodiment depicted in FIG. 9B, the data packet provided to the presenter module 672 and then to the view module 674 does not include a prompt for a user response and/or does not result in the receipt of a user response. As no response is received, when the data packet is completed, nothing is provided to the response processor 678, but rather data indicating the completion of the data packet is provided from one of the view module 674 and/or the presenter module 672 to the message channel 412. The data is then included in the data stream 690 and is received by the model engine 682 which uses the data to update one or several models. After the model engine 682 has updated the one or several models, the model engine 682 provides data indicating the completion of the model updates to the message channel 412. The message channel 412 then includes the data indicating the completion of the model updates in the data stream 690 and the recommendation engine 686, which can subscribe to the data stream 690, can extract the data indicating the completion of the model updates from the data stream 690. The recommendation engine 686 can then identify a next one or several data packets for providing to the presenter module 672, and the recommendation engine 686 can then, either directly or indirectly, provide the next one or several data packets to the presenter module 672.

With reference now to FIG. 9C, a schematic illustration of an embodiment of dual communication, or hybrid communication, in the platform layer 654 and/or applications layer 656 is shown. Specifically, in this embodiment, some communication is synchronous with the completion of one or several tasks and some communication is asynchronous. Thus, in the embodiment depicted in FIG. 9C, the presenter module 672 communicates synchronously with the model engine 682 via a direct communication 692 and communicates asynchronously with the model engine 682 via the message channel 412.

Specifically, and with reference to FIG. 9C, the presenter module 672 can receive and/or select a data packet for presentation to the user device 106 via the view module 674. In some embodiments, the presenter module 672 can identify all or portions of the data packet that can be provided to the view module 674 and portions of the data packet for retaining form the view module 674. In some embodiments, the presenter module can provide all or portions of the data packet to the view module 674. In some embodiments, and in response to the receipt of all or portions of the data packet, the view module 674 can provide a confirmation of receipt of the all or portions of the data packet and can provide those all or portions of the data packet to the user via the user device 106. In some embodiments, the view module 674 can provide those all or portions of the data packet to the user device 106 while controlling the inner loop of the presentation of the data packet to the user via the user device 106.

After those all or portions of the data packet have been provided to the user device 106, a response indicative of the completion of one or several tasks associated with the data packet can be received by the view module 674 from the user device 106, and specifically from the I/O subsystem 526 of the user device 106. In response to this receive, the view module 674 can provide an indication of this completion status to the presenter module 672 and/or can provide the response to the response processor 678.

After the response has been received by the response processor 678, the response processor 678 can determine whether the received response is a desired response. In some embodiments, this can include, for example, determining whether the response comprises a correct answer and/or the degree to which the response comprises a correct answer.

After the response processor has determined whether the received response is a desired response, the response processor 678 can provide an indicator of the result of the determination of whether the received response is a desired response to the presenter module 672. In response to the receipt of the indicator of whether the result of the determination of whether the received response is a desired response, the presenter module 672 can synchronously communicate with the model engine 682 via a direct communication 692 and can asynchronously communicate with model engine 682 via the message channel 412. In some embodiments, the synchronous communication can advantageously include two-way communication between the model engine 682 and the presenter module 672 such that the model engine 682 can provide an indication to the presenter module 672 when model updating is completed by the model engine.

After the model engine 682 has received one or both of the synchronous and asynchronous communications, the model engine 682 can update one or several models relating to, for example, the user, the data packet, or the like. After the model engine 682 has completed the updating of the one or several models, the model engine 682 can send a communication to the presenter module 672 indicating the completion of the updated one or several modules.

After the presenter module 672 receives the communication indicating the completion of the updating of the one or several models, the presenter module 672 can send a communication to the recommendation engine 686 requesting identification of a next data packet. As discussed above, the recommendation engine 686 can then retrieve the updated model and retrieve the user information. With the updated models and the user information, the recommendation engine can identify a next data packet for providing to the user, and can provide the data packet to the presenter module 672. In some embodiments, the recommendation engine 686 can further provide an indication of the next data packet to the model engine 682, which can use this information relating to the next data packet to update one or several models, either immediately, or after receiving a communication from the presenter module 672 subsequent to the determination of whether a received response for that data packet is a desired response.

Figure 9D:
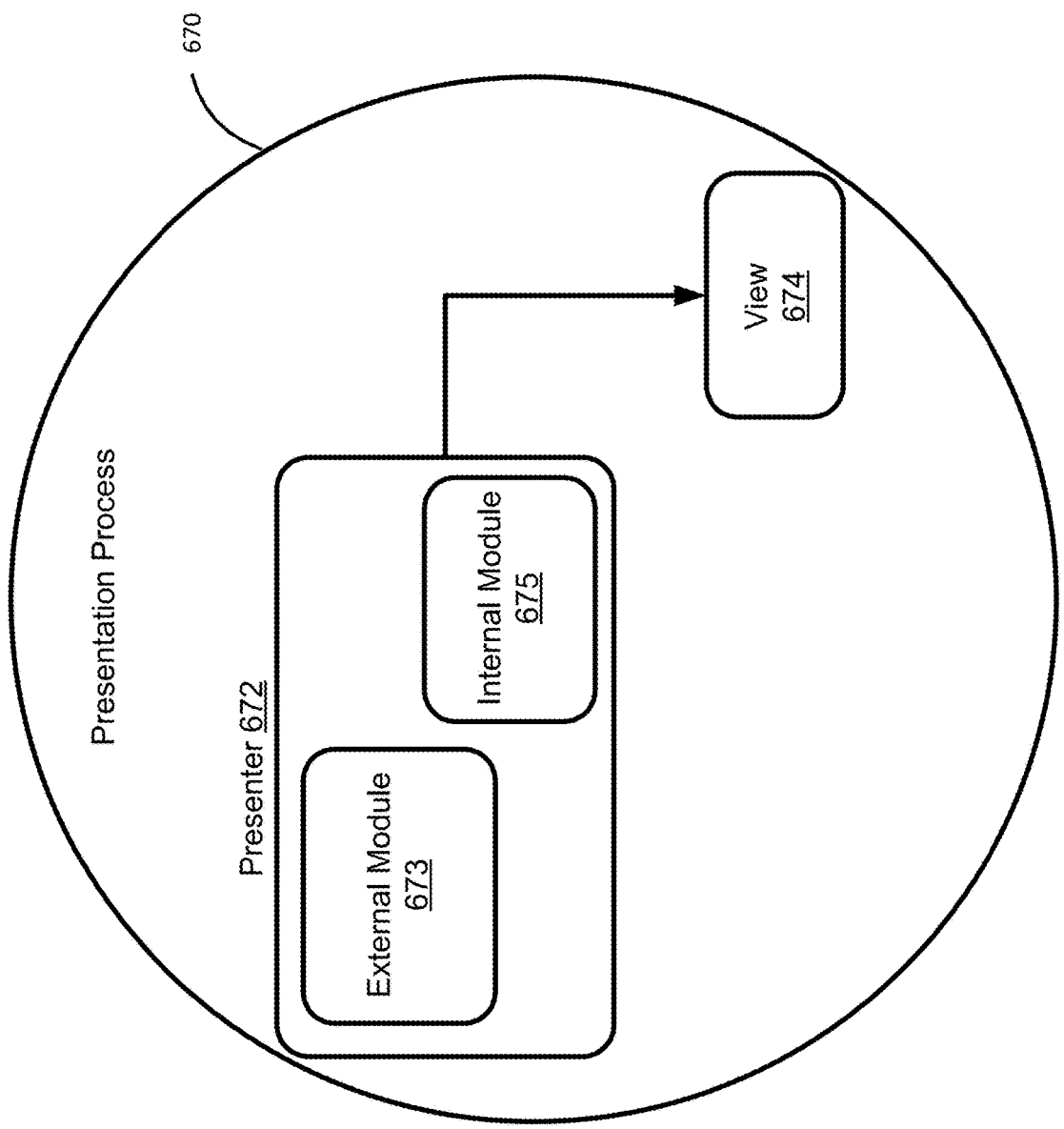
FIG. 9D is a schematic illustration of one embodiment of communication and processing flow of modules within the content distribution network.

With reference now to FIG. 9D, a schematic illustration of one embodiment of the presentation process 670 is shown. Specifically, FIG. 9D depicts multiple portions of the presenter module 672, namely, the external portion 673 and the internal portion 675. In some embodiments, the external portion 673 of the presenter module 672 can be located in the server, and in some embodiments, the internal portion 675 of the presenter module 672 can be located in the user device 106. In some embodiments, the external portion 673 of the presenter module can be configured to communicate and/or exchange data with the internal portion 675 of the presenter module 672 as discussed herein. In some embodiments, for example, the external portion 673 of the presenter module 672 can receive a data packet and can parse the data packet into portions for providing to the internal portion 675 of the presenter module 672 and portions for not providing to the internal portion 675 of the presenter module 672. In some embodiments, the external portion 673 of the presenter module 672 can receive a request for additional data and/or an additional data packet from the internal portion 675 of the presenter module 672. In such an embodiment, the external portion 673 of the presenter module 672 can identify and retrieve the requested data and/or the additional data packet from, for example, the database server 104 and more specifically from the content library database 104.

Figure 10A:
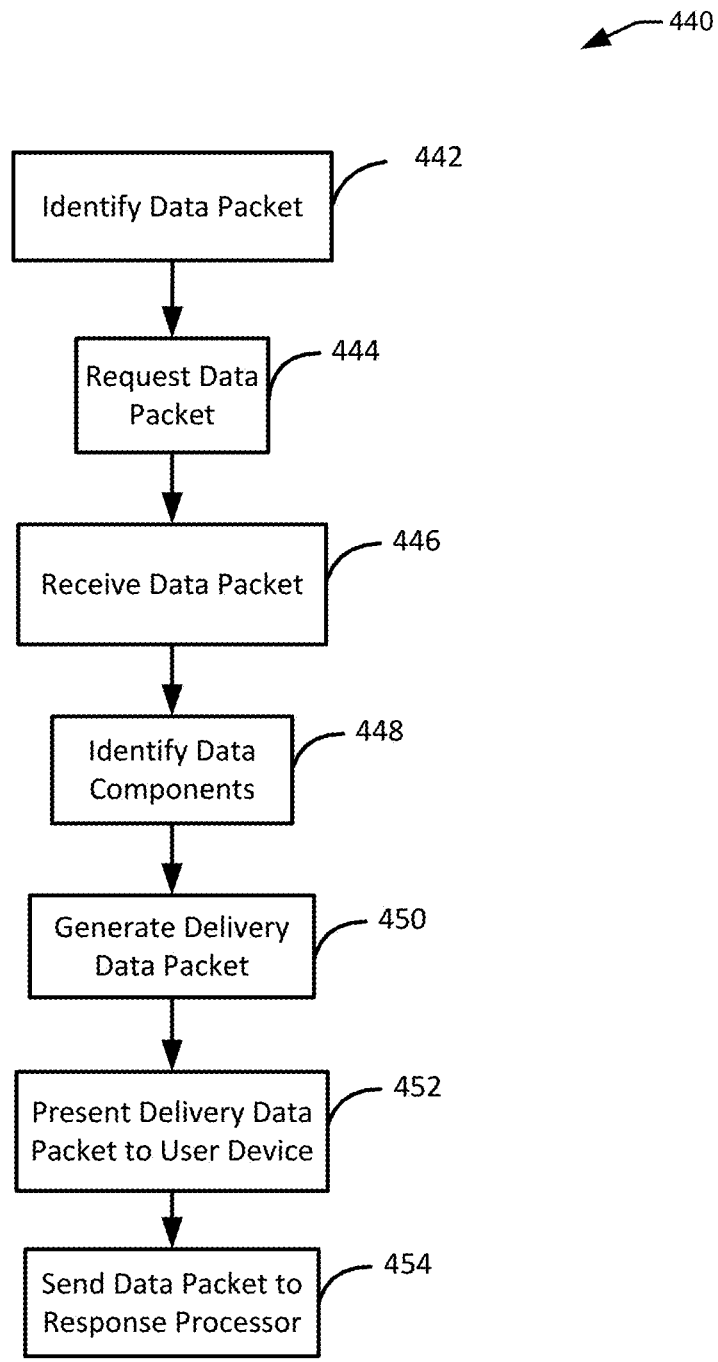
FIG. 10A is a flowchart illustrating one embodiment of a process for data management.

With reference now to FIG. 10A, a flowchart illustrating one embodiment of a process 440 for data management is shown. In some embodiments, the process 440 can be performed by the content management server 102, and more specifically by the presentation system 408 and/or by the presentation module or presentation engine. In some embodiments, the process 440 can be performed as part of the presentation process 670.

The process 440 begins at block 442, wherein a data packet is identified. In some embodiments, the data packet can be a data packet for providing to a student-user. In some embodiments, the data packet can be identified based on a communication received either directly or indirectly from the recommendation engine 686.

After the data packet has been identified, the process 440 proceeds to block 444, wherein the data packet is requested. In some embodiments, this can include the requesting of information relating to the data packet such as the data forming the data packet. In some embodiments, this information can be requested from, for example, the content library database 303. After the data packet has been requested, the process 440 proceeds to block 446, wherein the data packet is received. In some embodiments, the data packet can be received by the presentation system 408 from, for example, the content library database 303.

After the data packet has been received, the process 440 proceeds to block 448, wherein one or several data components are identified. In some embodiments, for example, the data packet can include one or several data components which can, for example, contain different data. In some embodiments, one of these data components, referred to herein as a presentation component, can include content for providing to the student user, which content can include one or several requests and/or questions and/or the like. In some embodiments, one of these data components, referred to herein as a response component, can include data used in evaluating one or several responses received from the user device 106 in response to the data packet, and specifically in response to the presentation component and/or the one or several requests and/or questions of the presentation component. Thus, in some embodiments, the response component of the data packet can be used to ascertain whether the user has provided a desired response or an undesired response.

After the data components have been identified, the process 440 proceeds to block 450, wherein a delivery data packet is identified. In some embodiments, the delivery data packet can include the one or several data components of the data packets for delivery to a user such as the student-user via the user device 106. In some embodiments, the delivery packet can include the presentation component, and in some embodiments, the delivery packet can exclude the response packet. After the delivery data packet has been generated, the process 440 proceeds to block 452, wherein the delivery data packet is provided to the user device 106 and more specifically to the view module 674. In some embodiments, this can include providing the delivery data packet to the user device 106 via, for example, the communication network 120.

After the delivery data packet has been provided to the user device 106, the process 440 proceeds to block 454, wherein the data packet and/or one or several components thereof is sent to and/or provided to the response processor 678. In some embodiments, this sending of the data packet and/or one or several components thereof to the response processor can include receiving a response from the student-user, and sending the response to the student-user to the response processor simultaneous with the sending of the data packet and/or one or several components thereof to the response processor. In some embodiments, for example, this can include providing the response component to the response processor. In some embodiments, the response component can be provided to the response processor from the presentation system 408.

Figure 10B:
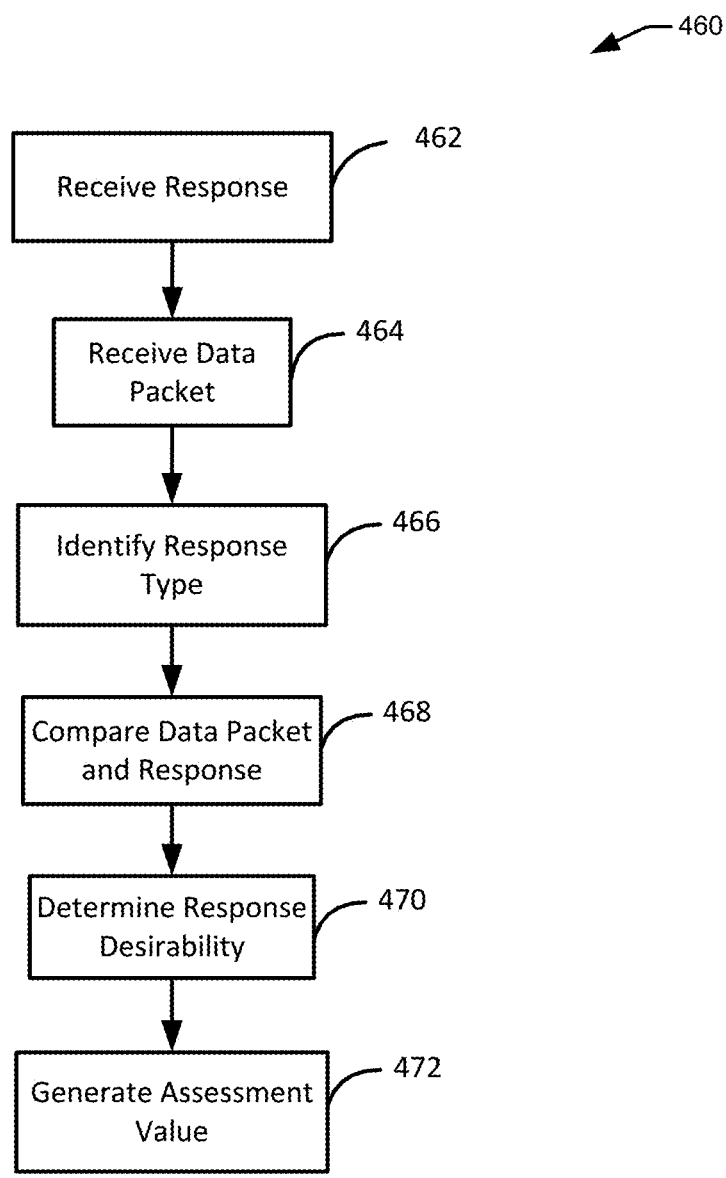
FIG. 10B is a flowchart illustrating one embodiment of a process for evaluating a response.

With reference now to FIG. 10B, a flowchart illustrating one embodiment of a process 460 for evaluating a response is shown. In some embodiments, the process can be performed as a part of the response process 676 and can be performed by, for example, the response system 406 and/or by the response processor 678. In some embodiments, the process 460 can be performed by the response system 406 in response to the receipt of a response, either directly or indirectly, from the user device 106 or from the view module 674.

The process 460 begins at block 462, wherein a response is received from, for example, the user device 106 via, for example, the communication network 120. After the response has been received, the process 460 proceeds to block 464, wherein the data packet associated with the response is received. In some embodiments, this can include receiving all or one or several components of the data packet such as, for example, the response component of the data packet. In some embodiments, the data packet can be received by the response processor from the presentation engine.

After the data packet has been received, the process 460 proceeds to block 466, wherein the response type is identified. In some embodiments, this identification can be performed based on data, such as metadata associated with the response. In other embodiments, this identification can be performed based on data packet information such as the response component.

In some embodiments, the response type can identify one or several attributes of the one or several requests and/or questions of the data packet such as, for example, the request and/or question type. In some embodiments, this can include identifying some or all of the one or several requests and/or questions as true/false, multiple choice, short answer, essay, or the like.

After the response type has been identified, the process 460 proceeds to block 468, wherein the data packet and the response are compared to determine whether the response comprises a desired response and/or an undesired response. In some embodiments, this can include comparing the received response and the data packet to determine if the received response matches all or portions of the response component of the data packet, to determine the degree to which the received response matches all or portions of the response component, to determine the degree to which the received response embodies one or several qualities identified in the response component of the data packet, or the like. In some embodiments, this can include classifying the response according to one or several rules. In some embodiments, these rules can be used to classify the response as either desired or undesired. In some embodiments, these rules can be used to identify one or several errors and/or misconceptions evidenced in the response. In some embodiments, this can include, for example: use of natural language processing software and/or algorithms; use of one or several digital thesauruses; use of lemmatization software, dictionaries, and/or algorithms; or the like.

After the data packet and the response have been compared, the process 460 proceeds to block 470 wherein response desirability is determined. In some embodiments this can include, based on the result of the comparison of the data packet and the response, whether the response is a desired response or is an undesired response. In some embodiments, this can further include quantifying the degree to which the response is a desired response. This determination can include, for example, determining if the response is a correct response, an incorrect response, a partially correct response, or the like. In some embodiments, the determination of response desirability can include the generation of a value characterizing the response desirability and the storing of this value in one of the databases 104 such as, for example, the user profile database 301. After the response desirability has been determined, the process 460 proceeds to block 472, wherein an assessment value is generated. In some embodiments, the assessment value can be an aggregate value characterizing response desirability for one or more of a plurality of responses. This assessment value can be stored in one of the databases 104 such as the user profile database 301.

In some embodiments, content provisioning performed in accordance with the processes of FIGS. 11 through 14 can provide significant benefits over current content provisioning with a computer, especially over current content provisioning with a computer in an educational environment. In some embodiments, content provisioning as described in FIGS. 11 through 14 can be based on real-time and dynamic prioritization that can be based on models of one or several user attributes such as user skill level, models of one or several task attributes, such as task difficulty levels, or the like. This provides the significant benefit of accurately selecting content most suited for delivery which increases the efficiency with which content is provided to the user.

Figure 11:
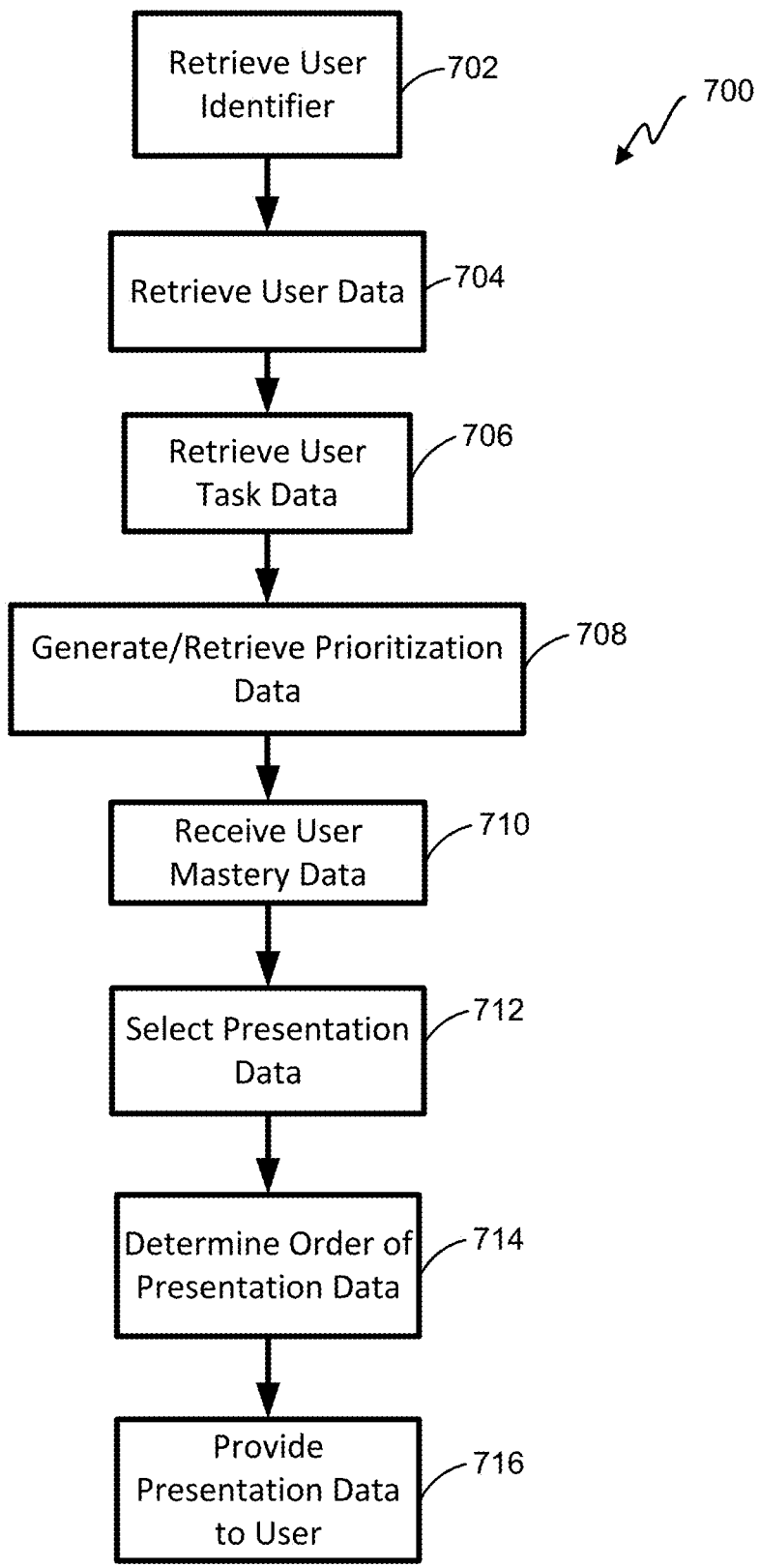
FIG. 11 is a flowchart illustrating one embodiment of a process for automated content delivery.

With reference now to FIG. 11, a flowchart illustrating one embodiment of a process 700 for automated content delivery is shown. The process 700 can be performed by all or components of the content distribution network 100 including by, for example, one or several servers 102. In some embodiments, these one or several servers 102 can comprise one or several remote resources such as can occur via cloud computing or distributed processing. The process 700 begins at block 702 wherein a user identifier is received and/or retrieved. In some embodiments, the user identifier can be received from the user device 106 and/or from the supervisor device 110. In some embodiments, for example, the user identifier can be provided to the user device 106 and/or supervisor device 110 via the I/O subsystem 526 and can be communicated to the server 102 via the communications subsystem 532 and the communication network 120. In some embodiments, the user identifier can comprise a user ID, password, a username, or the like.

After the user identifier has been received, the process 700 proceeds to block 704 wherein user data is retrieved. In some embodiments, this can include, for example, identifying the user associated with the user identifier, and retrieving user data associated with that user from one of the data stores 104, and specifically, in some embodiments, from the user profile data store 301.

After the user data has been retrieved, the process 700 proceeds to block 706 wherein user task data is retrieved and/or received. In some embodiments, the user task data can specify one or several tasks for the user to begin and/or complete. In some embodiments, the user task data can identify one or several skills, skill levels, or the like for the successful completion of the one or several tasks. In some embodiments, these one or several skills, skill levels, or the like can correspond to: skills required to successfully complete the task; a difficulty or difficulty level of the task; or the like. In some embodiments, such one or several tasks can correspond to a single data packet and in some embodiments, such one or several tasks can correspond to a plurality of data packets.

In some embodiments, one or several tasks can be determined by the server 102 by retrieving information from the content library data store 303, the prioritization database 311, and/or the calendar database 312 identifying one or several tasks such as, for example, a calendar, a schedule, and/or syllabus. In some embodiments, this information can be retrieved from the content library database 303, the prioritization database 311, and/or the calendar database 312 based on one or several user inputs identifying one or several tasks or objectives. In some embodiments, the server 102 can determine the user's progress through the calendar, schedule, and/or syllabus and can identify one or several current incomplete tasks and/or the next one or several tasks. In some embodiments, this can include identifying a temporal window and/or time period such as, for example, the next day, the next week, the next one or several months, or the like, and identifying the one or several incomplete and/or next tasks within that time period. In some embodiments, the server 102 can then retrieve data relevant to those determined one or several tasks, which data can identify, for example, one or several content objects relevant to and/or the related to those one or several tasks. In some embodiments, these one or several content objects relevant and/or related to the one or several tasks or data associated with those one or several content objects can comprise the user task data.

In some embodiments, the retrieval of user task data can further include identifying one or several skills and/or skill levels relevant to the identified one or several tasks. In some embodiments, for example, these relevant skills and/or skill levels can be determined based on the one or several content items relevant to and/or related to the one or several tasks. In some embodiments, these relevant skills and/or skill levels can be determined based on information associated with the one or several tasks such as, for example, task metadata.

After the user task data has been retrieved, the process 700 proceeds to block 708, wherein prioritization data is generated and/or retrieved. In some embodiments, the prioritization data can identify an ordering of tasks based on a prioritization of those tasks. The prioritization data can be, in some embodiments, retrieved from the prioritization database 311 and/or from the user profile database 301. In some embodiments, for example, prioritization data for a user can be stored in the user profile database 301 after the prioritization data has been generated. In some embodiments, it can be determined whether there has been any change to any parameter contributing to the prioritization data, and specifically to the identified one or several tasks, to the user data and/or to the model relating to one or several user attributes such as, for example, a user skill model, a user knowledge model, a learning style model, or the like. If there has been no change to any parameter contributing to the prioritization data, then the previously stored prioritization data can be retrieved.

If there has been a change to any parameter contributing to the prioritization data and/or if there is no previously stored prioritization data, then the prioritization data can be generated. In some embodiments, the prioritization data can be generated by any of the components of the content distribution network 100 including, for example, server 102, user device 106, and/or the supervisor device 110. The generation of the prioritization data will be discussed at greater length below.

In some embodiments, and as a result of the generation and/or retrieval of the prioritization data, one or several of the tasks can be selected. In some embodiments, for example, the one of the tasks associated with the highest priority and/or prioritization by the prioritization data can be selected. In some embodiments the selection of these one or several tasks can include the comparison of prioritization data for some or all of the tasks to identify the task with the highest priority and/or the highest prioritization and/or the rank ordering of the tasks according to priority and/or prioritization.

After the prioritization data has been retrieved and/or generated, the process 700 proceeds to block 710 wherein user mastery data is received and/or retrieved. In some embodiments, this mastery data can identify one or several skills and/or skill levels of the user. In some embodiments, the identified one or several skills and/or skill levels can correspond to the one or several skills and/or skill levels associated with the task data identified and/or determined and block 706. In some embodiment, the master data can be retrieved from the database server 104, and specifically can be retrieved from the user profile data store 301.

After the mastery data has been received and/or retrieved, the process 700 proceeds to block 712 wherein content is selected for providing to the user and/or retrieved from the database server 104. In some embodiments, this content can comprise one or several data packets, presentation data, or the like. In some embodiments, the selected content can be associated with the task having the highest priority and/or the highest prioritization. The content can be selected and/or retrieved from the content library database 303. In some embodiments, the content can be selected to maximize user preparation for the task identified and block 706, and specifically to increase the user's one or several skills and/or skill levels that most greatly differ from the one or several skills and/or skill levels associated with the task.

After the content has been selected, the process 700 proceeds to block 714, wherein the order of content presentation is determined. In some embodiments, the order of content presentation can comprise an order in which selected content is presented to the user and/or a frequency with which the selected content is presented to the user. In some embodiments, the frequency with which one or several of the selected content is repeatedly presented to the user can include a desired time interval between repeated presentations of all or portions of the selected content.

In some embodiments, the order of presentation of the content and/or the frequency with which some or all of the selected content is presented can be based on one or several attributes of the user such as, for example, one or several skills or skill levels, or the like. In some embodiments, the order of presentation can vary during the time that the content is being presented to the user, and particularly the order of presentation and/or the frequency of presentation can vary based on responses received from the user in response during the presentation of content to the user. In some embodiments, for example, the user skill and/or skill level can change based on one or several responses provided by the user, and thus the order of presentation and/or the frequency of presentation can change in response to this changed skill and/or skill level.

In some embodiments, the order and/or frequency of the presentation of the content can be controlled according to an ordering algorithm. In some embodiments, this can include, for example, a Leitner Box algorithm. In some embodiments, for example, each piece of presented content can be arranged into one or several sets or groups based on, for example, a user skill or skill level relevant to that content. In some embodiments, for example, each of the pieces of content can be arranged into one or several sets or groups based on user response data for that content, and specifically whether the user correctly or incorrectly responded to that content and/or the frequency of user correct or incorrect responses to that content.

In some embodiments, and before content is provided to a user, the content can be placed in one of the one or several sets based on the user skill level relevant to that content. In some embodiments, and as that content is provided to the user and responses to that content are received, the content can be moved to a different one of the one or several sets of content aggregations. In some embodiments, for example, if the user incorrectly responds to the content, then the content can be demoted to a "lower" set of content based either on the incorrect response or the decrease in the user skill level resulting from the incorrect response. Similarly, in some embodiments, for example, if the user correctly responds to the content, then the content can be promoted to a "higher" set of content based either on the correct response or the increase in the user skill level resulting from the correct response. In some embodiments, each of these sets can be associated with a frequency of presentation to the user such that "lower" sets are more frequently presented to the user and "higher" sets are less frequently presented to the user.

In some embodiments, the order and frequency algorithm can include one or several rules that can, in some circumstances limit the frequency that one or several pieces of content can be presented. In some embodiments, for example, the order and frequency algorithm can include one or several threshold values specifying a maximum allowable frequency and/or a minimum allowable amount of time between repeat presentations of a piece of content. In some embodiments, when a piece of content is selected for repeat presentation, the order and frequency algorithm can retrieve one or several threshold and data identifying the frequency of presentation of the selected piece of content and/or the time of the last presentation of the piece of content. The order and frequency algorithm can compare the retrieved one or several thresholds and data identifying the frequency of presentation of the selected piece of content and/or the time of the last presentation of the piece of content to determine if the repeat presentation of the selected piece of content is allowed. If the repeat presentation of the piece of content is allowed, then that piece of content can be selected for presentation.

If the repeat presentation of the piece of content is not allowed, the order and frequency algorithm can retrieve one or several rules to select an alternative piece of content for presentation. In some embodiments these rules can specify the selecting of a new piece of content for presentation from the same set of pieces of content from which the previously selected piece of content was selected. If none of the pieces of content in the same set of pieces of content from which the previously selected piece of content was selected are allowed for presentation, then the rules can specify the selection of a piece of content from a "lower" set of content. These steps can be repeated until an allowable piece of content and/or until allowable content is identified and/or until it is determined that no content and/or piece of content is allowable for presentation. In the event that no content and/or piece of content is allowable for presentation, then the piece of content and/or content closest to being allowable for presentation can be selected and/or a piece of content and/or content can be selected at random.

After the order and/or frequency of the presentation data has been determined, the process 700 proceeds to block 716, wherein the content is provided to the user. In some embodiments, the content can be provided to the user by the generation and sending of one or several electrical signals comprising the content. In some embodiments, these one or several electrical signals can be generated by the server 102 and can be sent to the user device via, for example, the communication network 120 and the communication subsystem 532. In some embodiments, these electrical signals can be sent in the form of the communication such as an alert as discussed above. In some embodiments, the steps of blocks 714 and 716 can be performed before any content is presented to the user, and can also be performed before each piece of content is presented to the user.

Figure 12:
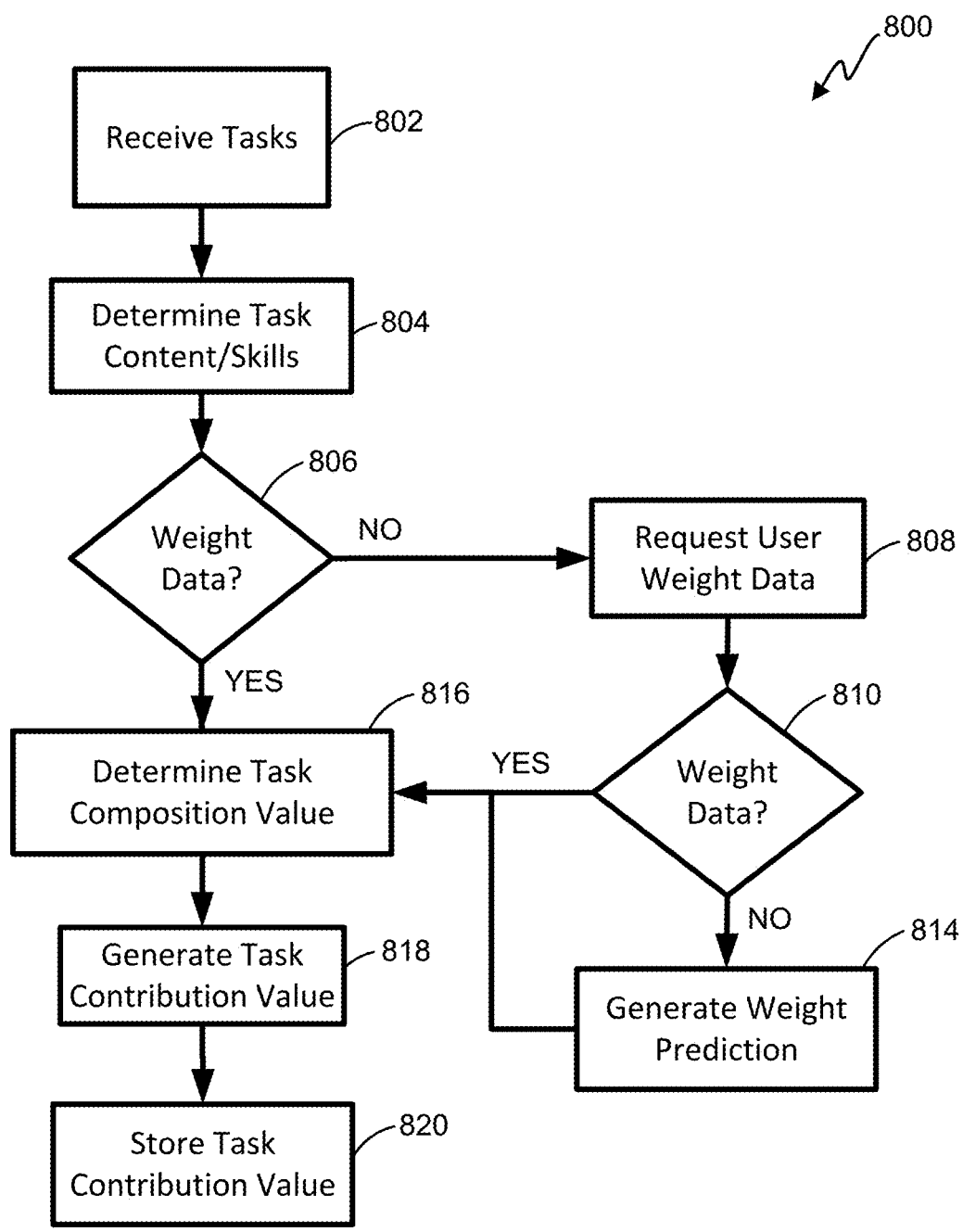
FIG. 12 is a flowchart illustrating one embodiment of a process for generating prioritization data.

With reference now to FIG. 12, a flowchart illustrating one embodiment of a process 800 for generating prioritization data is shown. In some embodiments, the steps of process 800 can be performed as a part of, or in the place of the step of block 708 of FIG. 11. The process 800 can be performed by all or components of the content distribution network 100 including by, for example, one or several servers 102. In some embodiments, these one or several servers 102 can comprise one or several remote resources such as can occur via cloud computing or distributed processing.

The process 800 begins at block 802 wherein one or several tasks are received and/or retrieved. In some embodiments, these one or several tasks are identified by applying a temporal window and/or time period to the tasks via data received from the content library database 303, the prioritization database 311, and/or the calendar database 312. This application of the temporal window and/or the time period to the tasks can identify one or several tasks within the time period and/or within the temporal window. In some embodiments, the time period and/or the temporal window can extend from a present time to a desired point in the future. In some embodiments, data associated with the tasks identified as within the time period and/or within the temporal window can be retrieved from the database server 104, and specifically from the content library database 303 and/or the prioritization database 311.

After the tasks have been received, the process 800 proceeds to block 804, wherein task content and/or task skills for the tasks identified and received and/or retrieved in block 802 are determined. In some embodiments, this can include the identifying of the content associated with some or all of the tasks received and/or retrieved in block 802 and identifying the skill levels and/or difficulty levels of this content. In some embodiments, the identifying of the skill levels and/or difficulty levels of the content can include the retrieval of data identifying the skill levels and/or difficulty levels of the content from the content library database 303.

After the tasks content and/or skills have been determined, the process 800 proceeds to block 806, wherein it is determined if weight data associated with the tasks identified in block 802 has been received and/or stored. In some embodiments, weight data can identify a relative and/or absolute value of an associated task. In some embodiments, this weight data can identify a value of the associated task by identifying and/or characterizing the contribution of the associated task to the achievement of some outcome. In embodiments in which this outcome is a grade, the weight data can identify the percent and/or portion of that grade that is the result of the task.

In some embodiments, the weight data can be received by the content distribution network from one or several users via one or several user devices 106 and/or via one or several supervisor devices 110. In some embodiments, the weight data can be provided by the creator of the task and can be provided to the content distribution network 100 at the time of the creation of the task and/or subsequent to the creation of the task. The weight data can be stored in the prioritization database 311.

If it is determined that the weight data has not been received, then the process 800 proceeds to block 808, wherein a request for user weight data is generated and sent. In some embodiments, the request for weight data can be generated by the server 102 and can be sent to the author of the task via, for example, the supervisor device 110 and/or can be sent to the user associated with the user identifier received in block 702 of FIG. 11.

After the weight data has been requested, the process 800 proceeds to decision state 810, wherein it is determined if the requested weight data has been received. In some embodiments, the process 800 can proceed to decision state 810 after the passing of a predetermined length of time. If it is determined that the weight data has not been received, then the process 800 proceeds to block 814, wherein a weight prediction, or in other words, wherein predicted weight data is generated. In some embodiments, the predicted weight data can be generated based on one or several attributes of the task and/or one or several attributes of other tasks associated with the task. In some embodiments, for example, the number of tasks associated with the task in a course can affect the predicted weight such that the predicted weight of the task can decrease as the number of tasks associated in a course increases.

In some embodiments, the predicted weight can be determined based on an evaluation of other documents and/or content associated with the task such as, for example, a syllabus or schedule associated with the task. In some embodiments, these documents and/or content associated with the task can be analyzed to retrieve indicators of the weight of the task. In some embodiments, this analysis can include the Natural Language Processing of all or portions of the content and/or documents associated with the task to identify whether one or several words indicative of weight are associated with the task. In some embodiments, these words can include, for example, "practice", "review", "test", "quiz", "assignment", "final", or the like.

Returning again to decision states 806 or 810, if it is determined that the weight data has been received, then the process 800 proceeds to block 816, wherein the task composition value is determined and/or identified. In some embodiments, the task composition value can identify and/or characterize the content associated with the task, and specifically the data packets associated with the task. In some embodiments, for example, the composition value can identify the contribution of one or several categories of content to the task. In some embodiments, this can include identifying the percent of the task based on the one or several categories of content and/or on the one or several sub-tasks of the task. The composition value can be retrieved from the prioritization database 311 and can be received from the author of the task at the time of the creation of the task and/or subsequent to the creation of the task. In some embodiments, the composition value can be stored in the prioritization database 311 after being received from a user, and specifically from the author of the task.

After the composition value has been determined and/or retrieved, the process 800 proceeds to block 818 wherein a task contribution value is generated. In some embodiments, the task contribution value can be generated for each of the one or several content categories and/or sub-tasks in task. The contribution value can be generated by applying the weight data to the composition value. In embodiments in which the weight data specifies the weight of the task as a percent of an outcome such as, for example, the percent of a grade, the contribution value can be generated by multiplying the weight of the tasks by the composition value to determine the relative importance of each of the content categories and/or sub-tasks to the completion of the task and/or as compared to other tasks. In some embodiments, a task contribution value can be generated for each of the content categories and/or sub-tasks in the task, and in some embodiments, these contribution values for the content categories and/or sub-tasks can be combined, in some embodiments via aggregation and/or addition to form a contribution value for the entire task.

After the contribution value has been generated, the process 800 proceeds to block 820, wherein the task contribution value is stored. In some embodiments, the task contribution value can be stored in the database server 104, and specifically in the prioritization database 311. In some embodiments, the process 800 can be repeated until a contribution value has been generated for some or all of the tasks identified in block 802. At which point, the contribution values can be used to identify one or several tasks of the highest priority and/or having the highest prioritization.

Figure 13:
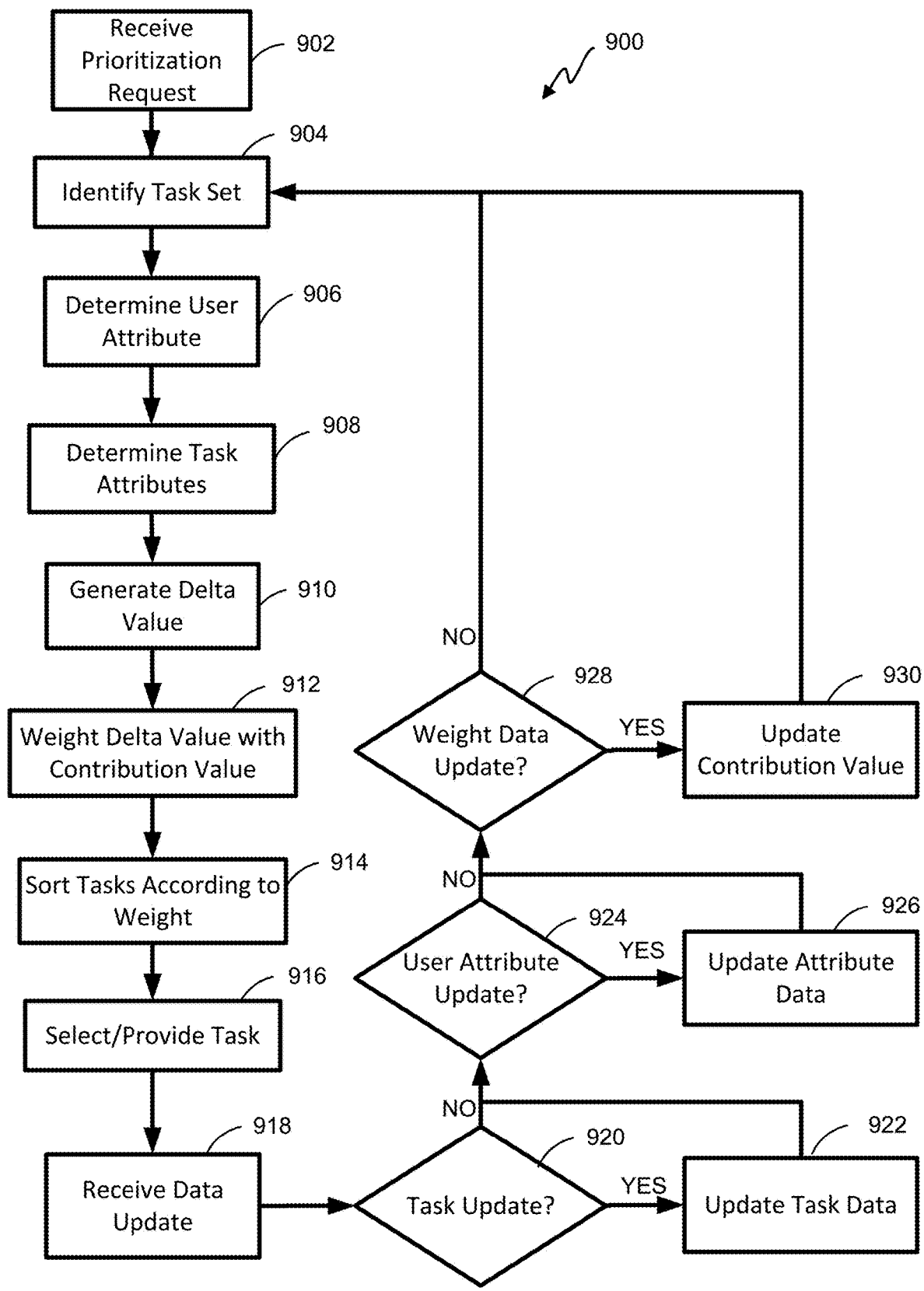
FIG. 13 is a flowchart illustrating one embodiment of a process for dynamic task prioritization.

With reference now to FIG. 13, a flowchart illustrating one embodiment of a process 800 for dynamic task prioritization is shown. In some embodiments, the steps of process 900 can be performed as a part of, or in the place of the step of block 708 of FIG. 11. The process 900 can be performed by all or components of the content distribution network 100 including by, for example, one or several servers 102. In some embodiments, these one or several servers 102 can comprise one or several remote resources such as can occur via cloud computing or distributed processing.

The process 900 begins at block 902, wherein a prioritization request is received. In some embodiments, the prioritization request can be received by the server 102 from one of the user devices 106. In some embodiments, for example, the user of the user device can provide an indication of a need for content, which indication can trigger the sending of a prioritization request. In some embodiments, for example, the automatic prioritization of content for delivery can facilitate in maximizing user performance and maximum throughput of delivered content received by the user.

In some embodiments, the receipt of the prioritization request can further include receipt of information identifying one or several attributes of the user device such as, for example, one or several attributes of the I/O subsystem 526 of the user device 106. These attributes can include, for example, the size, resolution, and/or color capabilities of any screen, monitor, display, or the like associated with the user device 106, available data input features of the user device 106 such as, for example, a touch screen, keyboard, mouse, a keypad, microphone, or the like. In some embodiments, information identifying one or several attributes of the user device can further include information identifying one or several task types, tasks, content types, or the like compatible with the user device 106. In some embodiments, device attitude information of the user can be stored in the user profile database 301.

After the prioritization request has been received, the process 900 proceeds to block 904, wherein a task set is identified. In some embodiments, the task set can be the group of tasks for which prioritization data is generated. In some embodiments, the task set can be identified by applying a temporal window and/or time period to the user's tasks. In some embodiments, this applying a temporal window and/or time period to the user's tasks can be via data received from the content library database 303, the prioritization database 311, and/or the calendar database 312. This application of the temporal window and/or the time period to the tasks can identify one or several tasks within the time period and/or within the temporal window, which one or several tasks can form the task set. In some embodiments, the time period and/or the temporal window can extend from a present time to a desired point in the future. In some embodiments, data associated with the tasks identified as within the time period and/or within the temporal window can be retrieved from the database server 104, and specifically from the content library database 303 and/or the prioritization database 311.

In some embodiments, the identification of the task set can be based on the compatibility of tasks, task type, content, content type, or the like with the user device 106 based on information identifying one or several attributes of the user device. In such an embodiment, tasks, task types, content, content types, or the like that are incompatible with the user device 106 from which the prioritization request is received can be excluded from the task set After the task set has been identified, the process 900 proceeds to block 906, wherein one or several user attributes are determined. In some embodiments, the determination of these one or several user attributes can include the retrieval of data relevant to these user attributes from the database server 104, and specifically from the user profile database 301. In some embodiments, these user attributes can be specific and/or related to the tasks of the task set identified in block 904. These user attributes can include, for example, one or several skill levels. In some embodiments, for example, a skill level relevant to one, some of, or each of the tasks in the task set can be identified.

After the one or several user attributes have been determined, the process 900 proceeds to block 908 wherein one or several tasks attributes are determined. In some embodiments, the determination of these task attributes can include the retrieval of data relevant to the tasks in the task set from the database server 104, and specifically from the content library database 303. In some embodiments these one or several task attributes can identify one or several skill levels and/or difficulties of the tasks in the task set, which skill levels and/or difficulties can be based on the sub-tasks, content, and/or content categories forming the tasks in the task set. In some embodiments, for example, data indicative of a difficulty level can be retrieved from the database server 104 for one, some of, or for each of the tasks in the task set.

After the task attributes have been determined, the process 900 proceeds to block 910, wherein a delta value is generated. In some embodiments, the delta value can be based on a comparison of one or several user attributes determined in block 906 and one or several task attributes determined in block 908. In some embodiments, the delta value can characterize the difference between a user skill level determined in block 906 and the difficulty level of a task determined in block 908. In some embodiments, a delta value can be calculated and/or generated for one, some of, or each of the tasks in the set of tasks. The delta value can be generated by a component of the content distribution network 100 including, for example, the server 102.

After the delta value has been generated, the process 900 proceeds to block 912 wherein the delta value is weighted, or in embodiments in which multiple delta values are generated, wherein the delta values are weighted. In some embodiments, the delta values can be weighted according to the contribution value to thereby refine prioritization data according to user skill level. In some embodiments, for example, a delta value is selected in the contribution value for the task for which the delta value is generated is selected. The delta value is then weighted by the contribution value which waiting can comprise, in some embodiments, the multiplication of the delta value by the contribution value, and the weighted delta value is stored in the database server 104 and specifically in, for example, the prioritization database 311. This process can be repeated until some or all of the delta values associated with the tasks in the set of tasks have been weighted. The weighting of the delta values can be performed by a component of the content distribution network 100 such as the server 102.

After the delta values have been weighted, the process 900 proceeds to block 914 wherein the tasks of the set of tasks are sorted according to their weighted delta values. In some embodiments, this can result in a sorting of tasks according to priority and/or prioritization. Specifically, in some embodiments, the weighting of the delta value by the contribution value will provide an indication of the one or several tasks most urgently requiring user action due to the importance of the task is manifested in the contribution value and/or student shortcomings with regard to that task as indicated in the delta value relevant to that task. In some embodiments, the task can be sorted according to their weight using any desired sorting algorithm.

After the tasks have been sorted, the process 900 proceeds to block 916 wherein one or several tasks and/or content relevant to one or several tasks is selected and/or provided to the user via the user device 106. In some embodiments, one or several tasks can be selected that have the highest priority and/or the highest prioritization. In some embodiments, this can be according to the sorting of tasks as performed in block 914. After one or several tasks have been selected, content from those one or several tasks can be identified and content can be selected for providing to the user according to steps 710 through 716 of FIG. 11. In some embodiments, content can be provided to the user according to one or several user attributes.

After the one or several tasks and the relevant content have been selected, the one or several tasks and relevant content can be provided to the user. In some embodiments this can include generating electrical signals and transmitting electrical signals from, for example, the server 102 to the user device 106. In some embodiments, these electrical signals can contain and/or encode the one or several tasks and/or relevant content for providing to the user via the user device 106.

After the one or several tasks have been selected and/or provided to the user, the process 900 proceeds to block 918 wherein a data update is received. In some embodiments, the data update can comprise information indicating a change in the data stored in the database server. This can include, for example, a change and/or update to one or several user attributes. In some embodiments, for example, as the user interacts with the content distribution network 100 user attributes such as the user skill level can change based on content provided to the user and/or responses received from the user. In some embodiments, the data update can comprise information relating to a change in one or several user tasks. In some embodiments, for example, one or several new task can be associated with the user and/or one or several tasks can be removed from association with the user. Similarly, in some embodiments, weight data can change over a period of time. In some embodiments, for example, the author of the task may change the weight data associated with that task. The data update can be received by the server 102.

After the data update has been received, the process 900 proceeds to decision state 920 wherein it is determined if the received data update is a task update. In some embodiments, this can include determining if the received data update adds one or several tasks to, or removes one or several tasks from association with the user. If it is determined that the data update is a task update, then the process 900 proceeds block 922 and updates the task data associated with the user.

After the task data associated with the user has been updated, or returning to decision state 920, if it is determined that the data update is not a task update, the process 900 proceeds to block 924 wherein it is determined if the data update is the user attribute update. In some embodiments, this can include determining whether the data update changes one or several user attributes that can be, for example, stored in the user profile database 301. If it is determined that the received data update is a user attribute update, and the process 900 proceeds to block 926 and the attribute data is updated in, for example, the user profile database 301.

After the attribute data has been updated, or returning again to decision state 924, if it is determined that the received data update is not a user attribute update, then the process 900 proceeds to decision state 928 wherein it is determined if the received data update is a weight data update. In some embodiments, weight data updates can include a change to the weighting of one or several tasks associated with the user. If it is determined that the received data update is a weight data update, than the process 900 proceeds block 930 when the contribution value is updated according to block 818 of FIG. 12.

After the contribution value has been updated, a returning again to decision state 928, if it is determined the received data update is not a weight data update, then the process 900 returns to block 904 and continues as outlined above or until the user terminates connection with the content distribution network 100 and/or terminates requests for receipt of content from the content distribution network 100.

Figure 14:
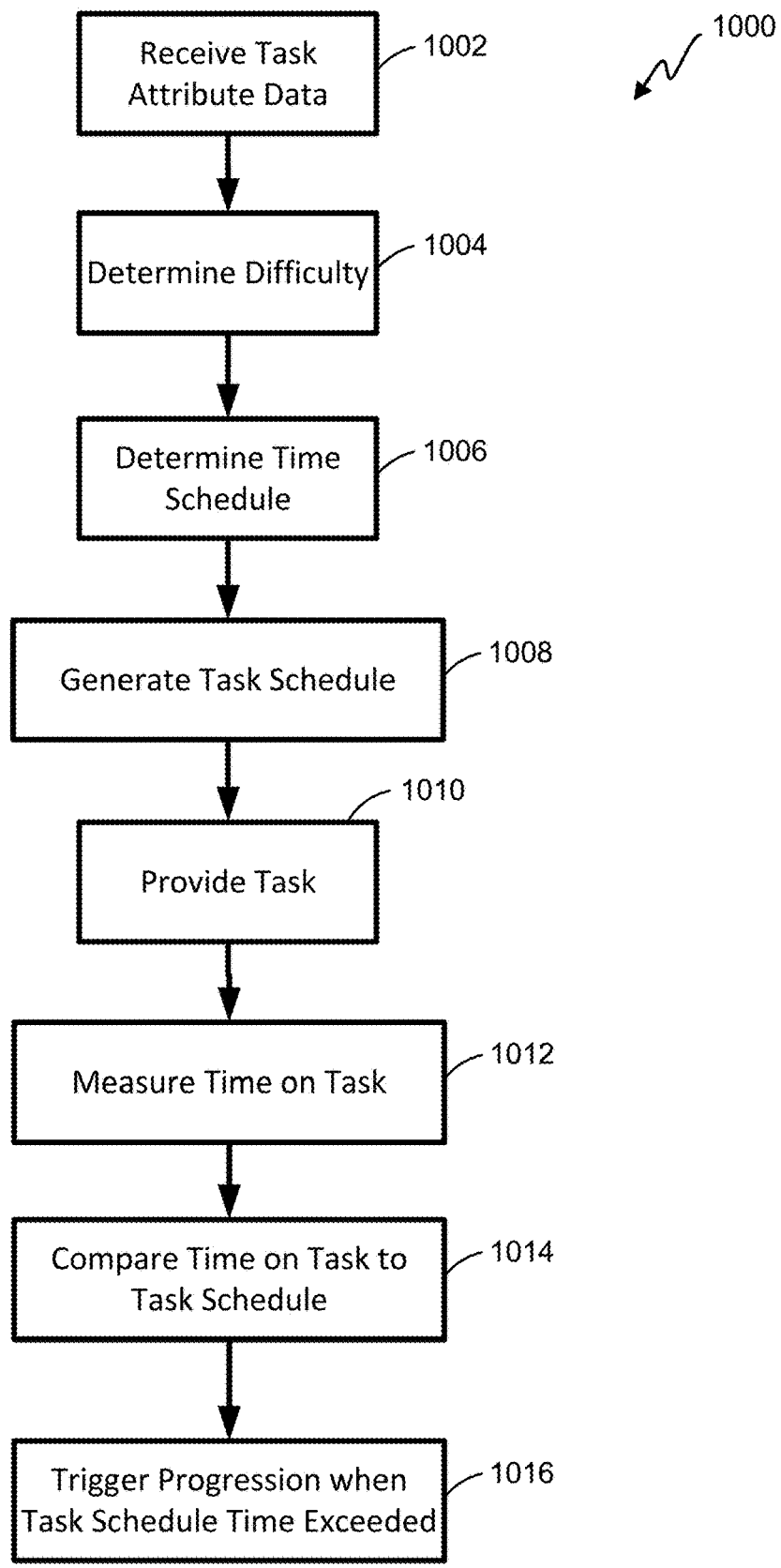
FIG. 14 is a flowchart illustrating one embodiment of a process for temporally managing content delivery.

With reference now to FIG. 14, a flowchart illustrating one embodiment of a process 1000 for temporally managing content delivery is shown. The process 1000 can be performed by the content distribution network 100 and/or the components thereof including, for example, the server 102. The process 1000 begins at block 1002 wherein task attribute data is received and/or retrieved for one or several tasks. In some embodiments, the task attribute data can be received and/or retrieved from the database server 104 and specifically from the content library database.

After the task attribute data has been received and/or retrieved, the process 1000 proceeds to block 1004 wherein a difficulty level is determined of the one or several tasks for which the task attribute data was received. In some embodiments, this can include extracting task difficulty information from the task attribute data. This extraction and/or determination can be performed by the server 102.

After the difficulty level of the one or several tasks has been determined, the process 1000 proceeds to block 1006 wherein a time schedule is determined. In some embodiments, the time schedule can comprise the desired and/or optimal time schedule for the presentation of content to the user. The time schedule can be based on information stored in the user profile database 301 which information can describe one or several user attributes. These one or several user attributes can include, for example, a user learning style, one or several values characterizing the ability of the user to focus, or the like. In some embodiments, determining the time schedule can include retrieving the user attribute data from the user profile database 301. In some embodiments, the time schedule can be determined by the server 102.

After the time schedule has been determined, the process 1000 proceeds to block 1008 wherein a task schedule is generated. In some embodiments, the task schedule can characterize the timing and/or order of content presentation to the user. In some embodiments, the task schedule can define one or several content delivery periods that can include, for example, a review portion, a new content delivery portion, a practice portion, or the like. In some embodiments, each of these one or several content delivery periods can be associated with a time and/or an amount of time to be spent on that content delivery. In some embodiments, the generation of the task schedule can correspond to the steps of block 710 to 716 of FIG. 11. The test schedule can be generated by the server 102.

After the task schedule has been generated, the process 1000 proceeds to block 1010 wherein the task is provided to the user via the user device 106. In some embodiments, the task can be provided to the user in a single event and/or transmission, and in some embodiments, the task can be provided to the user via a series of events and/or transmissions. In some embodiments in which the task comprises a plurality of data packets, the providing of the task of the user can comprise sequential and/or ordered providing of the data packets to the user according to the task schedule.

After the task has been provided to the user, the process 1000 proceeds to block 1012 wherein a time on task is measured. In some embodiments, for example, the amount of time spent by the user on the task can be measured. In some embodiments, this can be accomplished via the triggering of a clock and/or timer and the time of the providing of the task. In some embodiments, the clock and/or timer can be located in the user device 106 within the server. In embodiments in which the clock and/or timer's location is in the user device 106, the clock and/or timer can be triggered via the receipt of one or several data packets of the task and information regarding the amount of passed time and/or the amount of time spent by the user on the task can be periodically sent from the user device 106 to the server 102 in such an embodiment, the receipt of the information regarding the amount of passed time and/or the amount of time spent by the user on the task can correspond to the measuring of time on task.

After the time on task is then measured and/or well, task is being measured, the process 1000 proceeds block 1014 when the time on task is compared to the task schedule. In some embodiments, this can include determining whether the time on task meets and/or exceeds one or several time thresholds specified in the past schedule. In some embodiments, this comparison can be performed by the server 102. After the time on task has been compared to the task schedule, the process 1000 proceeds block 1016 wherein progression of content delivery is triggered when time on task exceeds one or several of the thresholds in the past schedule. In some embodiments, this can include progressing from one of the content delivery periods to another of the content delivery periods such as, for example, progressing from the review portion to the new content delivery portion, the practice portion, or the like. In some embodiments, if all the portions have been completed, then the trigger progression can result in the termination of the providing of the task and of the process 1000.

Figure 15:
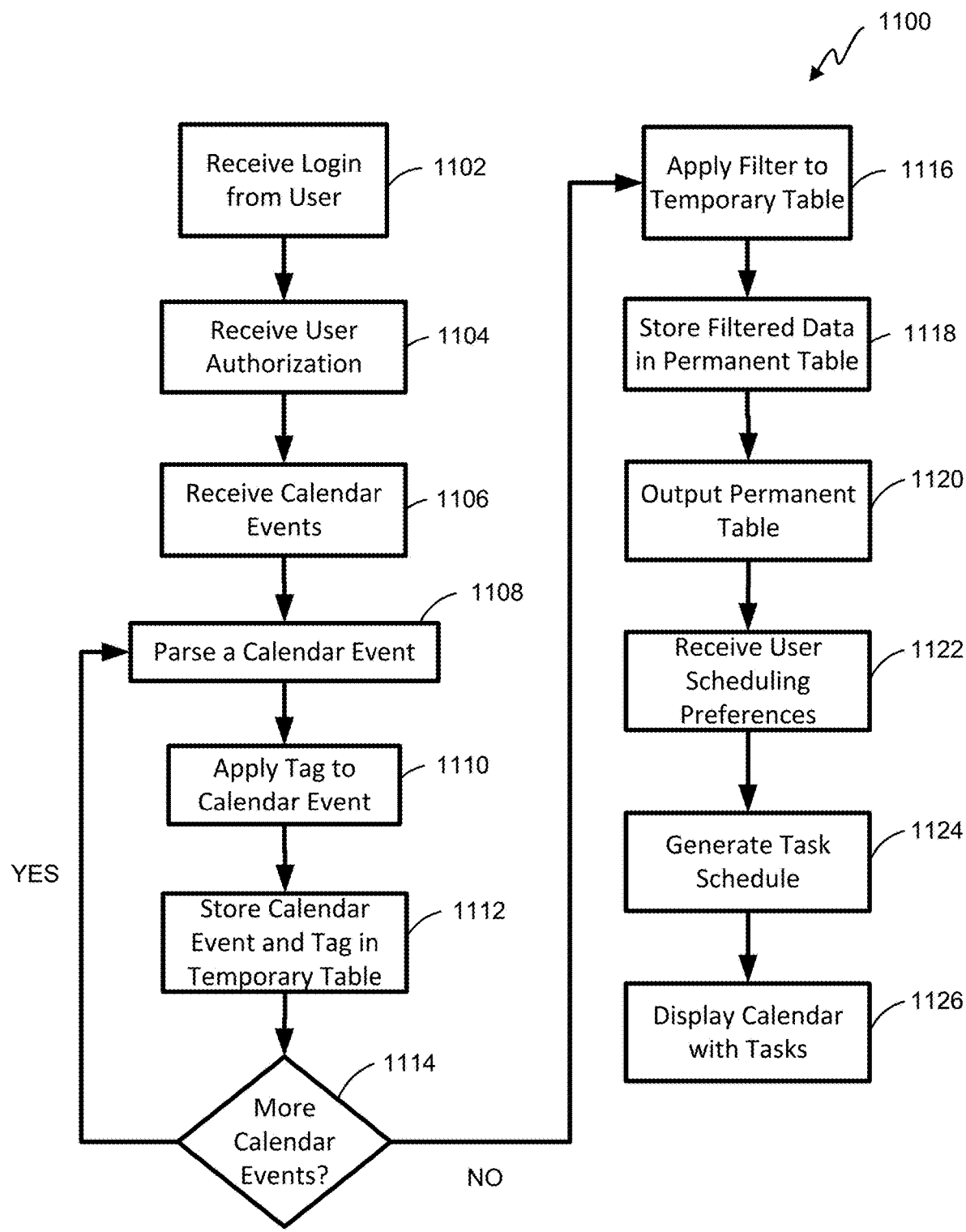
FIG. 15 is a flowchart illustrating one embodiment of a process for temporally managing content delivery.

With reference now to FIG. 15, a flowchart illustrating one embodiment of a process 1100 for temporally managing content delivery is shown. The process 1100 can be performed by the content distribution network 100 and/or the components thereof including, for example, the server 102. The process 1100 begins at block 1102 wherein login information is received from a user. The login information may be received from a user device, such as user device 106. The login information may include a username and a password. The received login information may be compared to stored login information for the user. The stored login information may be retrieved from the content access data store 306. If the received login information matches the stored login information, the identity of the user may be confirmed.

After the login information has been received from the user, the process 1100 may proceed to block 1104 wherein an authorization to access at least one calendar of the user is received from the user. The authorization may be received from a user device, such as user device 106. The calendars may include personal calendars of the user and/or calendars generated for the user. The calendars that are generated from the user may be stored in the calendar data store 312, and may include calendar events such as test dates and/or exam dates for the user.

After the authorization has been received from the user, the process 1100 may proceed to block 1106 wherein calendar events for the user are received. The calendar events may be received from various devices and/or servers, such as user device 106 and/or server 102. The calendar events may include personal events of the user and/or dates associated with a course of study for the user, such as test dates and/or exam dates. Each of the calendar events may include information such as a date, a start time, an end time, a location, and/or a label including a description of the calendar event.

After the calendar events have been received, the process 1100 may proceed to block 1108 wherein one of the calendar events is parsed. The calendar event may be parsed into words or phrases that allow the server 102 to identify a category of the calendar event. For example, options for the category may include test, exam, or other. The other category may include any personal events of the user.

After the calendar event has been parsed, the process 1100 may proceed to block 1110 wherein a tag is applied to the calendar event. The tag may be based on the category of the calendar event. For example, any calendar events within the other category may have a private tag applied. Optionally, the user may be prompted to select which of the calendar events within the other category should have the private tag applied. A public tag may be applied to any calendar events that are not selected by the user to have the private tag applied. The public tag may also be applied to any calendar events that are parsed into the test or exam categories.

After the calendar event has been tagged, the process 1100 may proceed to block 1112 wherein the calendar event and the tag for the calendar event are stored in a temporary table. For example, the temporary table may be in a memory subsystem of the server 102. The temporary table may be structured such that each of the calendar events is a separate entry.

After the calendar event and the tag have been stored in the temporary table, the process 1100 may proceed to block 1114 wherein it is determined whether there are any additional calendar events for the user that have not yet been parsed. If it is determined that there are additional calendar events at block 1114, blocks 1108 through 1112 may be repeated for each of the additional calendar events.

If it is determined that there are no additional calendar events at block 1114, the process 1100 may proceed to block 1116 wherein a filter is applied to the temporary table. The filter may remove labels from any calendar events having a specific tag, such as the private tag. The calendar events having the specific tag remain in the temporary table, along with the information about their dates, start times, and end times; however, any identifying information about these calendar events is removed.

After the filter has been applied to the temporary table, the process 1100 may proceed to block 1118 wherein the filtered data is stored in a permanent table. For example, the permanent table may be in a memory subsystem of the server 102. The permanent table may be structured such that each of the calendar events is a separate entry.

After the filtered data has been stored in the permanent table, the process 1100 may proceed to block 1120 wherein the permanent table is output. For example, the permanent table may be output to the user device 106. Alternatively or in addition, the permanent table may be output to another server.

After the permanent table has been output, the process 1100 may proceed to block 1122 wherein scheduling preferences of the user are received. The scheduling preferences may be received from the user device 106. Alternatively or in addition, the scheduling preferences may be received from the user profile data store 301. For example, the scheduling preferences may include specific days of week or times of the day when the user would prefer to study for a test or an exam. The scheduling preferences may also include a duration for which the user would like to study in a single session. Optionally, a time schedule may be generated for the user based on the scheduling preferences and the information stored in the user profile data store 301, as described above with regard to block 1006.

After the scheduling preferences of the user have been received, the process 1100 may proceed to block 1124 wherein a task schedule is generated for the user. The task schedule may be generated based on the plurality of calendar events that are stored in the permanent table, the mastery level of the user, and the scheduling preferences of the user. For example, the task schedule may be generated in accordance with block 1008 as described above.

After the task schedule has been generated, the process 1100 may proceed to block 1126 wherein a calendar including the tasks is displayed to the user. The calendar may be displayed on user device 106. The calendar may include the calendar events of the user, as well as the tasks from the task schedule. Any calendar events that are tagged as private may be displayed without a label describing the calendar event.

For example, if a calendar event is tagged as private, it may be displayed as a block of time during which the user is busy or unavailable, and it may include a non-descriptive label such as "private event."

Figure 16:
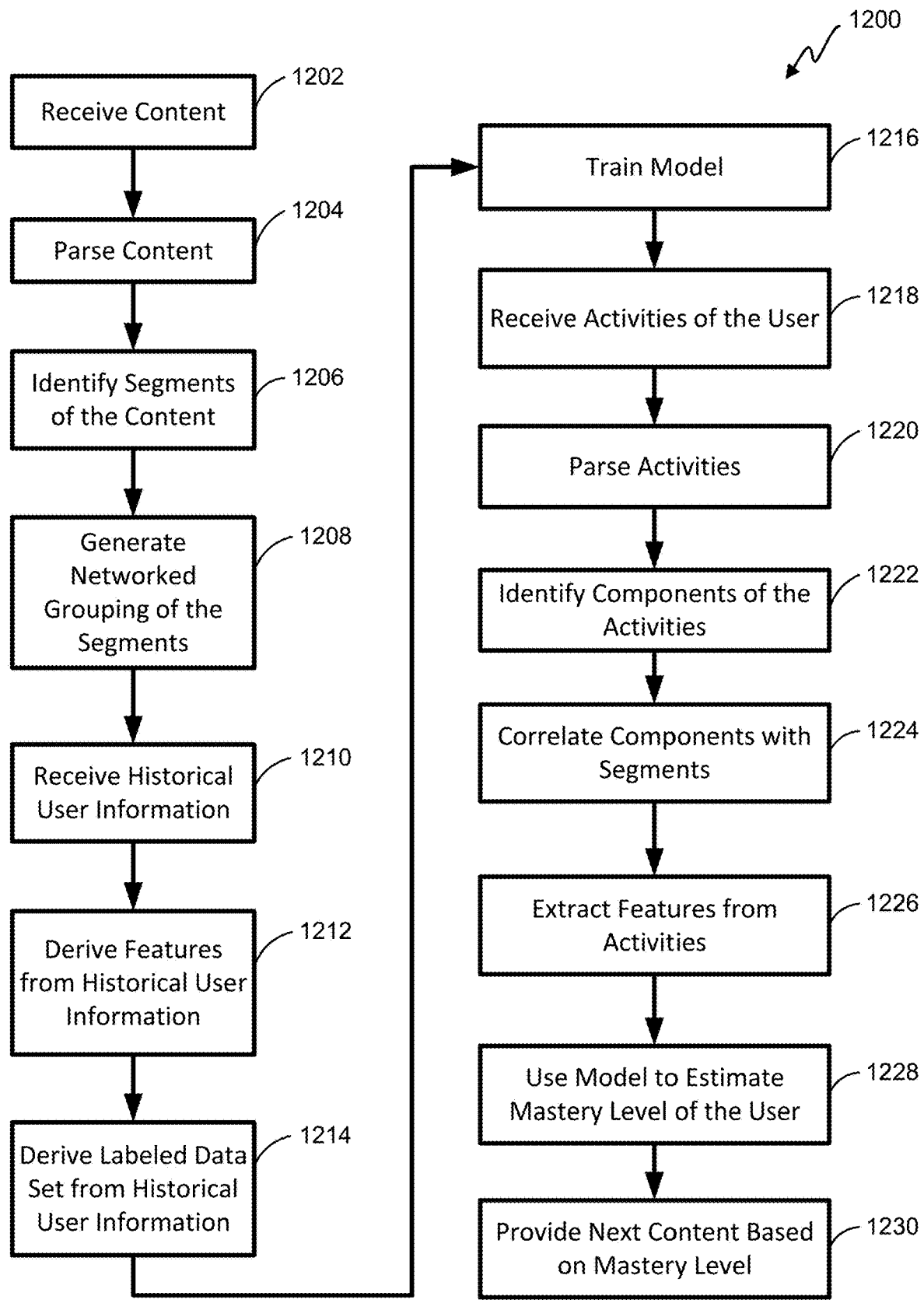
FIG. 16 is a flowchart illustrating one embodiment of a process for estimating a mastery level.

With reference now to FIG. 16, a flowchart illustrating one embodiment of a process 1200 for estimating a mastery level is shown. The process 1200 can be performed by the content distribution network 100 and/or the components thereof including, for example, the server 102. The process 1200 begins at block 1202 wherein content corresponding to at least one source document is received. The content may be retrieved from the content library data store 303. Some examples of source documents include textbooks and medical terminology books. The source documents may be scans of physical documents or electronic documents.

After the content has been received, the process 1200 may proceed to block 1204 wherein the content is parsed. For example, the content may be divided into portions of words, words, phrases, sentences, paragraphs, images, video, and/or sections of the content. The parsing of the content may be performed by any suitable method, such as dependency parsing or constituency parsing. These methods may use various natural language processing approaches, such as artificial neural networks. The parsing may include a plurality of layers, such as adjectives and sentences, such that one word may appear in more than one layer.

After the content has been parsed, the process 1200 may proceed to block 1206 wherein segments are identified from the parsed content. For example, the segments may include portions of words, words, phrases, sentences, paragraphs, images, video, and/or sections of the content. The segments may be identified based on a goal of using the segments to estimate the mastery of a user on various levels. Meaningful segments may be segregated from non-meaningful segments in any suitable manner. For example, segments that are found in a glossary or an index of a source document may be considered to be meaningful, while segments consisting of very common words (such as "the") may be considered to be non-meaningful. Tags may be associated with the segments to indicate the relevance of the segments and/or to provide an indication of one or several attributes of the segments. These attributes can include, for example, an identification of a content independent attribute of the segment such as identifying one or several parts of speech of the segment, a type of phrase (e.g. noun-phrase or prepositional phrase), or the like. In some embodiments, the tag can identify a content related attribute of the segment such as, for example, content to which the segment is related and/or content contained in the segment.

After the segments have been identified, the process 1200 may proceed to block 1208 wherein a networked grouping of the segments is generated. In some embodiments, for example, segments can be grouped together into one or several groups, and these one or several groups can be connected into hierarchical relationships. In some embodiments, the connection of these groups can result in the creation of an acyclic directed network of the segments and/or of the groups of segments. In such an embodiment, the network can comprises a plurality of interconnected nodes, which nodes can be the segments and/or the groups of segments. These nodes can be connected by a plurality of edges, each edge extending between a pair of nodes. In some embodiments, these edges can identify the hierarchical relationship between pairs of nodes, identifying one node in pair of nodes as a parent node and the other node in the pair as the child node. In some embodiments, these edges can further identify the relatedness between a pair of nodes.

The hierarchy and/or grouping of the nodes can be based on a structure of the source document. This structure can be a structure identified in the source document or a structure extracted from the source document. This structure can include, for example, a table of contents, chapters, sections, sub-sections, paragraph order, HTML tags, coded identifiers, pagination, website architecture, source content arrangement, or the like. In one embodiment, for example in which the source document is an HTML document is has associated HTML tags, the hierarchy may be based on HTML tags in a source document, which HTML tags may indicate chapters or sections of the source document.

The networked grouping may be generated by grouping the segments. In some embodiments, these groupings can be formed based on relatedness between the segments. In some embodiments, this relatedness can be determined based on the content of the segments and/or based on the connection between segments and the structure of the source document. In some embodiments, for example, one or several groupings can be formed based on the occurrence of the segments in common portions of the source document, which portions can be defined by the structure of the source document. In some embodiments, for example, the groupings may include unique words or phrases that are the most meaningful in each chapter or section of the source document.

In some embodiments, the groupings may be ordered by starting with a first portion of the source document, such as, for example, the first chapter, and progressing through the portions of the source document, which can include subsequent chapters. For example, the third chapter may be a prerequisite for the fifth chapter. The ordering may be based on the table of contents or the paragraph structure of the source document. The networked grouping may be stored in the system memory 518.

After the networked grouping has been generated, the process 1200 may proceed to block 1210 wherein historical user information is received and/or retrieved. The historical user information can relate to users who have interacted with the source content and/or with related content. In some embodiments, the historical user information can be received and/or retrieved from the database server 104, and specifically from the user profile data store 301. As discussed in further detail below, in order to train and evaluate a model, the historical user information may be divided into a training data set and a test data set.

After the historical user information has been received, the process 1200 may proceed to block 1212 wherein features are derived from the historical user information. A feature can be any attribute of the historical user information. In some embodiments, a feature can be an individual measurable property or characteristic of a phenomenon being observed. Exemplary features can include, for example, amount of content consumed, time-on-task, and/or skill level. These features can include, for example, human identified features and/or computer generated features.

After the features have been identified, the process 1200 may proceed to block 1212 wherein a labeled data set is derived from the historical user information. The labeled data set may include a plurality of labels that correspond to outcomes. In some embodiments, for example, these labels can identify content, content portions, and/or questions as mastered and/or unmastered. Similarly, in some embodiments, these labels can identify one or several responses as correct or incorrect.

After the labeled data set has been derived, the process 1200 may proceed to block 1216 wherein a model is trained with all or portions of the historical user information. In some embodiments, this can include dividing the historical user information, and specifically the features identified from the historical user information and the data labelled set, into one or several training data sets and one or several test data sets. In some embodiments, all or portions of the training features and the labeled training data, and specifically one or several training data sets, are input into the model, and the model is adjusted until the correct training outcomes are generated for the training features. In some embodiments, a single model may be trained, and in some embodiments, a plurality of models may be trained. In embodiments in which a plurality of models are trained, each model may correspond to a portion of the source content, and, in some embodiments, each of the trained models may correspond to a unique portion of the source content. In some embodiments, each model may be trained to estimate the mastery of the user with regards to one or several skills and/or with regards to one or several portions of the source content. The model may be based on any artificial intelligence model, such as, for example, a random forest classifier.

The test data set may be used to evaluate the accuracy of a model, and the test data set can comprises a subset of the features and labelled data set generated from the historical user information. The accuracy of the model may be evaluated by comparing the predicted outcomes with the test outcomes. Any models that do not achieve a minimum level of accuracy may be retrained or discarded.

After one or several models have been trained, the process 1200 may proceed to block 1218 wherein activities of a user are received. For example, the activities may be received from the user device 106. Some examples of activities include playing games, watching videos, and solving problems. The activities may include user responses and metadata characterizing the user responses.

After the activities have been received, the process 1200 may proceed to block 1222 wherein the activities are parsed. For example, the activities may be divided into portions of words, words, phrases, sentences, paragraphs, images, video, and/or sections of the activities. The parsing of the activities may be performed by any suitable method, such as dependency parsing or constituency parsing. These methods may use various natural language processing approaches, such as artificial neural networks.

After the activities have been parsed, the process 1200 may proceed to block 1222 wherein components of the activities are identified. The components may be tagged as meaningful or non-meaningful. Further, the components may be tagged as relevant to determining a mastery level of the user for a skill or a plurality of skills.

After the components of the activities have been identified, the process 1200 may proceed to block 1224 wherein the components of the activities are correlated with the segments of the content. For example, it may be determined where each component of the activities falls within the networked grouping of the segments of the content. This determination may be based on the tags of the components of the activities and the segments of the content.

After the components of the activities have been correlated with the segments of the content, the process 1200 may proceed to block 1226 where features are extracted from the activities. These features extracted from the activities can overlap with some or all of the features used to train the one or several models in block 1216. The features may be chosen based on the skill for which the mastery level of the user is being estimated. The features can be extracted by the server 102, and specifically by the summary model system 404.

After the features have been extracted from the activities, the process 1200 may proceed to block 1228 wherein one of the models trained in block 1216 is used to estimate a mastery level of the user based on the generated features. In some embodiments, this mastery level can be determined with respect to one or several portions of the source content, one or several content items, one or several learning objectives, or the like. In some embodiments, determination of the mastery level can comprise inputting the features into the model and receiving an output from the model identifying mastery.

In some embodiments, the mastery level can be determined for different dimensions, such as a portion of a word, a word, a phrase, a chapter, a section, etc. The dimensions may be based on the table of contents of the source document. For example, the table of contents may break the source document into sections or chapters, and the mastery level may be estimated for each of the sections or chapters.

In some embodiments, a plurality of estimates of the mastery level may be combined to give a single estimate of the mastery level. For example, one of the models trained in block 1216 may be used to estimate the mastery level of the user for a word that appears in the first chapter, and another one of the models trained in block 1216 may be used to estimate the mastery level of the user for the same word that appears in the third chapter. These individual estimates may then be combined to give a single estimate of the mastery level, such as by finding an average or a weighted average of the individual estimates. Similarly, an individual mastery level may be estimated for each problem in a section, and these individual estimates may then be combined to give a single estimate of the mastery level for the section.

Once the mastery level has been estimated, the mastery level may be used to update the information about the user in the user profile database 301. For example, the skill level of the user may be updated. This information may be used to provide next content to the user, as discussed in further detail below.

After the mastery level of the user has been estimated, the process 1200 may proceed to block 1230 where next content is provided to the user based on the estimated mastery level. For example, if the user has not mastered a skill, the next content may provide remedial content to help the user with that skill. Alternatively, if the user has mastered a skill, the next content may provide more advanced material that builds on the skill.

In some embodiments, the content distribution network can send one or more alerts to the user device 106 and/or one or more supervisor devices 110 via, for example, the communication network 120. For example, the alerts may include the estimated mastery level of the user and/or the next content to be provided to the user.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps, and means described above may be done in various ways. For example, these techniques, blocks, steps, and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system comprising:
   memory comprising:
   a content database comprising content, associated with a course, a class, or a group within the course or the class, for delivery to a user;
   a task database comprising data identifying a plurality of tasks; and
   a user profile database comprising information identifying one of several attributes of the user;
   a user device comprising:
   a first network interface configured to exchange data via a communication network; and
   a first I/O subsystem configured to convert electrical signals to user interpretable outputs via a user interface; and
   one or several servers, wherein the one or several servers are configured to:
   receive content corresponding to at least one source document comprising a textbook created in, or scanned into electronic format;
   parse the content;
   identify segments, comprising a plurality of words or phrases within a glossary or an index of the textbook, from the parsed content;
   generate a networked grouping of the segments, comprising the words or phrases that are common within a table of contents, a chapter, a section, or a subsection within the textbook;
   receive historical user information about a plurality of users from the user profile database;
   train a model by using the historical user information, wherein the historical user information includes interaction data associated with interactions between the plurality of users and content in the content database, the interaction data including at least one of an amount of content consumed, time spent interacting with the content, and a skill level associated with a user in the plurality of users of the content;
   receive activities of the user, wherein the activities are associated with new interactions between the user and content in the content database;
   parse the activities of the user;
   identify components from the parsed activities;
   correlate the components in the parsed activities of the user with the segments identified in the parsed content;
   extract features from the activities of the user based on the correlation; and
   use the trained model to estimate a mastery level, associated with the segments from the parsed content or a task in the plurality of tasks, of the user based on the features.

2. The system of claim 1, wherein the segments comprise at least one of portions of words, words, phrases, sentences, paragraphs, images, video, or sections of the content.

3. The system of claim 1, wherein the one or several servers are further configured to generate the networked grouping of the segments based on a table of contents of the at least one source document or HTML tags of the at least one source document.

4. The system of claim 1, wherein the networked grouping comprises an acyclic directed network of the segments.

5. The system of claim 1, wherein the one or several servers are further configured to train the model by:

deriving features from the historical user information;

deriving a labeled data set from the historical user information, wherein labels of the labeled data set correspond to outcomes associated with the features;

inputting a first portion of the features and a first portion of the labeled data set into the model; and adjusting the model until correct outcomes are generated for the first portion of the features.

6. The system of claim 5, wherein the one or several servers are further configured to train the model by:

inputting a second portion of the features and a second portion of the labeled data set into the model;

using the model to generate predicted outcomes based on the second portion of the features; and evaluating the model by comparing the predicted outcomes with outcomes associated with the second portion of the features.

7. The system of claim 1, wherein the model is a random forest classifier.

8. The system of claim 1, wherein the one or several servers are further configured to train a plurality of models corresponding to different segments of the parsed content.

9. The system of claim 1, wherein the mastery level of the user is estimated for each of a plurality of skills.

10. The system of claim 1, wherein the features are extracted based on a position of a correlated segment within the networked grouping.

11. A method comprising:

receiving content, associated with a course, a class, or a group within the course or the class, corresponding to at least one source document comprising a textbook created in, or scanned into electronic format;

parsing the content;

identifying segments, comprising a plurality of words or phrases within a glossary or an index of the textbook, from the parsed content;

generating a networked grouping of the segments, comprising the words or phrases that are common within a table of contents, a chapter, a section, or a sub-section within the textbook;

receiving historical user information about a plurality of users;

training a model by using the historical user information, wherein the historical user information includes interaction data associated with interactions between the plurality of users and content in the content database, the interaction data including at least one of an amount of content consumed, time spent interacting with the content, and a skill level associated with a user in the plurality of users of the content;

receiving activities of a user, wherein the activities are associated with new interactions between the user and content in the content database;

parsing the activities of the user;

identifying components from the parsed activities;

correlating the components in the parsed activities of the user with the segments identified in the parsed content;

extracting features from the activities of the user based on the correlation; and using the trained model to estimate a mastery level, associated with the segments from the parsed content or a task in the plurality of tasks, of the user based on the features.

12. The method of claim 11, wherein the segments comprise at least one of portions of words, words, phrases, sentences, paragraphs, images, video, or sections of the content.

13. The method of claim 11, wherein the networked grouping of the segments is generated based on a table of contents of the at least one source document or HTML, tags of the at least one source document.

14. The method of claim 11, wherein the networked grouping comprises an acyclic directed network of the segments.

15. The method of claim 11, wherein training the model comprises:

deriving features from the historical user information;

deriving a labeled data set from the historical user information, wherein labels of the labeled data set correspond to outcomes associated with the features;

inputting a first portion of the features into the model; and adjusting the model until correct outcomes are generated for the first portion of features.

16. The method of claim 15, wherein training the model further comprises:

inputting a second portion of the features and a second portion of the labeled data set into the model;

using the model to generate predicted outcomes based on the second portion of the features; and evaluating the model by comparing the predicted outcomes with outcomes associated with the second portion of the features.

17. The method of claim 11, wherein the model is a random forest classifier.

18. The method of claim 11, further comprising training a plurality of models corresponding to different segments of the parsed content.

19. The method of claim 11, wherein the mastery level of the user is estimated for each of a plurality of skills.

20. The method of claim 11, wherein the features are extracted based on a position of a correlated segment within the networked grouping.

* * * * *